US011870749B2

(12) United States Patent
Green et al.

(10) Patent No.: US 11,870,749 B2
(45) Date of Patent: *Jan. 9, 2024

(54) METHODS AND SYSTEM FOR DISTRIBUTING INFORMATION VIA MULTIPLE FORMS OF DELIVERY SERVICES

(71) Applicant: Greenfly, Inc., Santa Monica, CA (US)

(72) Inventors: Shawn David Green, Corona del Mar, CA (US); Daniel Brian Kirschner, Santa Monica, CA (US)

(73) Assignee: Greenfly, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,870

(22) Filed: Aug. 10, 2022

(65) Prior Publication Data
US 2023/0208798 A1 Jun. 29, 2023

Related U.S. Application Data

(63) Continuation of application No. 17/304,682, filed on Jun. 24, 2021, now Pat. No. 11,425,083, which is a
(Continued)

(51) Int. Cl.
*H04L 51/52* (2022.01)
*H04L 67/306* (2022.01)
*H04N 21/475* (2011.01)
*G06Q 50/00* (2012.01)
*H04N 21/4788* (2011.01)
(Continued)

(52) U.S. Cl.
CPC .............. *H04L 51/52* (2022.05); *G06F 16/40* (2019.01); *G06F 16/435* (2019.01);
(Continued)

(58) Field of Classification Search
CPC .... G06Q 50/01; G06Q 30/02; G06Q 30/0241; G06Q 30/0201; G06Q 30/0267;
(Continued)

(56) References Cited

U.S. PATENT DOCUMENTS 6,938,005 B2   8/2005   Iverson et al.
7,577,979 B2   8/2009   Feinleib et al.
(Continued)

OTHER PUBLICATIONS

Extended European Search Report received in European Patent Application No. EP17756987, dated Sep. 15, 2019.
(Continued)

*Primary Examiner* — Greg C Bengzon
(74) *Attorney, Agent, or Firm* — Knobbe, Martens, Olson & Bear LLP

(57) ABSTRACT

A content distribution facilitation system is described comprising configured servers and a network interface configured to interface with a plurality of terminals in a client server relationship and optionally with a cloud-based storage system. A request from a first source for content comprising content criteria is received, the content criteria comprising content subject matter. At least a portion of the content request content criteria is transmitted to a selected content contributor. If recorded content is received from the first content contributor, the first source is provided with access to the received recorded content. The recorded content may be transmitted via one or more networks to one or more destination devices. Optionally, a voice analysis and/or facial recognition engine are utilized to determine if the recorded content is from the first content contributor.

17 Claims, 43 Drawing Sheets

Related U.S. Application Data continuation of application No. 16/789,345, filed on Feb. 12, 2020, now Pat. No. 11,057,337, which is a continuation of application No. 16/195,627, filed on Nov. 19, 2018, now Pat. No. 10,574,622, which is a continuation of application No. 15/960,423, filed on Apr. 23, 2018, now Pat. No. 10,154,001, which is a continuation of application No. 15/944,674, filed on Apr. 3, 2018, now abandoned, which is a continuation of application No. 15/278,801, filed on Sep. 28, 2016, now Pat. No. 9,942,189, which is a continuation of application No. 15/050,204, filed on Feb. 22, 2016, now Pat. No. 9,461,958, which is a continuation-in-part of application No. 14/690,292, filed on Apr. 17, 2015, now Pat. No. 9,348,823, which is a continuation of application No. 14/299,977, filed on Jun. 9, 2014, now Pat. No. 9,015,251, which is a continuation of application No. 14/052,626, filed on Oct. 11, 2013, now Pat. No. 8,782,140.

(60) Provisional application No. 62/119,418, filed on Feb. 23, 2015, provisional application No. 61/779,096, filed on Mar. 13, 2013.

(51) Int. Cl.

| | | |
|---|---|---|
| *G06F 16/435* | (2019.01) | |
| *G06F 16/438* | (2019.01) | |
| *G06F 16/9535* | (2019.01) | |
| *H04N 21/4784* | (2011.01) | |
| *G06F 16/40* | (2019.01) | |
| *G10L 17/00* | (2013.01) | |
| *G06V 40/16* | (2022.01) | |
| *H04L 65/612* | (2022.01) | |
| *H04L 67/50* | (2022.01) | |
| *G06F 16/483* | (2019.01) | |
| *G06F 16/9538* | (2019.01) | |
| *G10L 17/06* | (2013.01) | |
| *G10L 17/16* | (2013.01) | |
| *G10L 17/22* | (2013.01) | |
| *G06Q 50/10* | (2012.01) | |
| *G06Q 10/101* | (2023.01) | |
| *H04L 67/06* | (2022.01) | |

(52) U.S. Cl.
CPC .......... *G06F 16/437* (2019.01); *G06F 16/438* (2019.01); *G06F 16/483* (2019.01); *G06F 16/9535* (2019.01); *G06F 16/9538* (2019.01); *G06Q 50/01* (2013.01); *G06V 40/166* (2022.01); *G06V 40/172* (2022.01); *G10L 17/00* (2013.01); *G10L 17/06* (2013.01); *G10L 17/16* (2013.01); *G10L 17/22* (2013.01); *H04L 65/612* (2022.05); *H04L 67/306* (2013.01); *H04L 67/535* (2022.05); *H04N 21/4756* (2013.01); *H04N 21/4758* (2013.01); *H04N 21/4784* (2013.01); *H04N 21/4788* (2013.01); *G06Q 10/101* (2013.01); *G06Q 50/10* (2013.01); *H04L 67/06* (2013.01)

(58) Field of Classification Search
CPC .............. G06Q 10/10; G06Q 30/0207; G06Q 30/0245; G06Q 30/0252; G06Q 30/0269; G06Q 30/0643; H04L 51/32; H04L 67/02; H04L 67/18; H04L 12/1813; H04L 12/1822; H04L 51/046; H04L 51/063; H04L 51/10; H04L 65/40; H04L 67/04; H04L 67/06; H04L 67/1097; H04L 67/16; H04L 67/26; H04L 67/306; H04L 67/32; H04L 67/325; H04N 21/21805; H04N 21/252; H04N 21/2743; H04N 21/41407; H04N 21/47205; H04N 21/854; H04N 21/8545; H04N 21/25891; H04N 21/44222; H04N 21/4751; H04N 21/4758; H04N 21/6582; H04N 21/812; H04N 21/8456; H04N 21/2187; H04N 21/25808; H04N 21/2668; H04N 21/4126; H04N 21/42203; H04N 21/4222; H04N 21/42221; H04N 21/437; H04N 21/44204; H04N 21/44218; H04N 21/4788; H04N 21/482; H04N 21/4821; H04N 21/6125; H04N 21/6175; H04N 21/6587; H04N 21/2385; H04N 21/242; H04N 21/251; H04N 21/254; H04N 21/2541; H04N 21/2543; H04N 21/25866; H04N 21/26241; H04N 21/26258; H04N 21/26616; H04N 21/2665; H04N 21/278; H04N 21/42204; H04N 21/4223; H04N 21/4331; H04N 21/4532; H04N 21/454; H04N 21/458; H04N 21/47202; H04N 21/4756; H04N 21/47815; H04N 21/4784; H04N 21/4826; H04N 21/4828; H04N 21/6334; H04N 21/6543; H04N 21/84; H04N 21/8586; H04N 5/2228; H04N 5/772; G06F 3/0482; G06F 16/435; G06F 16/951; G06F 3/04817; G06F 3/04842; G06F 3/04845; H04W 4/029; H04W 4/21; H04W 12/06; H04W 4/80; H04H 20/38; H04H 60/06; H04H 60/31; H04H 60/33; H04H 60/46; H04H 60/51; H04H 60/52; H04H 60/66; H04H 60/82

See application file for complete search history.

(56) References Cited

U.S. PATENT DOCUMENTS

| | | |
|---|---|---|
| 7,757,254 B2 | 7/2010 | Shoff et al. |
| 7,809,603 B2 | 10/2010 | Steelberg et al. |
| 8,024,467 B2 | 9/2011 | Humphrey et al. |
| 8,032,470 B1 | 10/2011 | Heidenreich |
| 8,539,542 B1 | 9/2013 | Elhag |
| 8,607,295 B2 | 12/2013 | Bhatia et al. |
| 8,612,243 B2 | 12/2013 | McGill et al. |
| 8,693,848 B1 | 4/2014 | Pacor |
| 8,782,140 B1 | 7/2014 | Green |
| 8,817,065 B1 | 8/2014 | Mo |
| 8,819,719 B1 | 8/2014 | Chen et al. |
| 8,943,140 B1 | 1/2015 | Kothari |
| 9,015,251 B2 | 4/2015 | Green |
| 9,063,972 B1 | 6/2015 | Marra |
| 9,071,579 B1 | 6/2015 | Bender |
| 9,081,823 B2 | 7/2015 | Luo |
| 9,104,892 B2 | 8/2015 | Le Chevalier |
| 9,280,610 B2 | 3/2016 | Gruber |
| 9,300,620 B2 | 3/2016 | Bradley |
| 9,348,823 B2 | 5/2016 | Green |
| 9,355,387 B1 | 5/2016 | Dixon |
| 9,461,958 B1 | 10/2016 | Green |
| 9,544,379 B2 | 1/2017 | Gauglitz |
| 9,762,629 B1 | 9/2017 | Bhargava |
| 9,942,189 B2 | 4/2018 | Green |
| 10,051,103 B1 | 8/2018 | Gordon |
| 10,083,469 B1 | 9/2018 | Traina |
| 10,154,001 B2 | 12/2018 | Green |
| 10,257,301 B1 | 4/2019 | Giordano |
| 10,380,168 B2 | 8/2019 | Green |
| 10,440,169 B1 | 10/2019 | Gordon |
| 10,554,696 B2 | 2/2020 | Singh |
| 10,574,622 B2 | 2/2020 | Green |

(56) References Cited

U.S. PATENT DOCUMENTS

| | | |
|---|---|---|
| 10,599,285 B2 | 3/2020 | Roos |
| 10,693,956 B1 | 6/2020 | Green |
| 10,909,586 B2 | 2/2021 | Avedissian |
| 11,057,337 B2 | 7/2021 | Green |
| 11,157,541 B2 | 10/2021 | Green |
| 11,240,299 B2 | 2/2022 | Green |
| 2001/0032189 A1* | 10/2001 | Powell ............... H04L 63/126 705/310 |
| 2002/0016969 A1 | 2/2002 | Kimble |
| 2002/0073177 A1 | 6/2002 | Clark et al. |
| 2003/0229900 A1 | 12/2003 | Reisman |
| 2006/0174316 A1 | 8/2006 | Gregorian et al. |
| 2006/0253542 A1 | 11/2006 | McCausland et al. |
| 2007/0038931 A1* | 2/2007 | Allaire ............... G06Q 30/0239 715/208 |
| 2007/0089151 A1 | 4/2007 | Moore et al. |
| 2007/0162566 A1 | 7/2007 | Desai et al. |
| 2008/0092181 A1* | 4/2008 | Britt ................ H04N 21/482 348/E7.071 |
| 2008/0103906 A1 | 5/2008 | Singh |
| 2008/0120324 A1 | 5/2008 | Davis |
| 2008/0147741 A1 | 6/2008 | Gonen |
| 2008/0177752 A1 | 7/2008 | Kulkarni et al. |
| 2008/0209480 A1 | 8/2008 | Eide et al. |
| 2008/0244681 A1 | 10/2008 | Gossweiler et al. |
| 2008/0247543 A1 | 10/2008 | Mick et al. |
| 2009/0044235 A1 | 2/2009 | Davidson |
| 2009/0060289 A1 | 3/2009 | Shah et al. |
| 2009/0089294 A1 | 4/2009 | Davis et al. |
| 2009/0094039 A1* | 4/2009 | MacDonald ........... G11B 27/11 709/201 |
| 2009/0148124 A1 | 6/2009 | Athsani |
| 2009/0172129 A1 | 7/2009 | Singh et al. |
| 2009/0204885 A1 | 8/2009 | Ellsworth et al. |
| 2009/0210291 A1 | 8/2009 | Safar |
| 2009/0210808 A1 | 8/2009 | West |
| 2009/0328087 A1 | 12/2009 | Higgins et al. |
| 2010/0088394 A1 | 4/2010 | Barbieri et al. |
| 2010/0293598 A1 | 11/2010 | Collart et al. |
| 2011/0004831 A1 | 1/2011 | Steinberg |
| 2011/0035503 A1 | 2/2011 | Zaid et al. |
| 2011/0082808 A1 | 4/2011 | Beykpour et al. |
| 2011/0106835 A1 | 5/2011 | Lauridsen |
| 2011/0126148 A1 | 5/2011 | Krishnara |
| 2011/0173214 A1 | 7/2011 | Karim |
| 2011/0225239 A1 | 9/2011 | Kansai |
| 2011/0225508 A1 | 9/2011 | Steelberg et al. |
| 2011/0264521 A1 | 10/2011 | Straka |
| 2011/0264599 A1 | 10/2011 | Dalton |
| 2011/0276423 A1 | 11/2011 | Davidson |
| 2011/0289157 A1 | 11/2011 | Pirnazar |
| 2011/0311205 A1 | 12/2011 | McClanahan |
| 2012/0004956 A1 | 1/2012 | Huston |
| 2012/0005209 A1 | 1/2012 | Rinearson |
| 2012/0042263 A1 | 2/2012 | Rapaport |
| 2012/0072835 A1 | 3/2012 | Gross |
| 2012/0096041 A1 | 4/2012 | Rao |
| 2012/0123811 A1 | 5/2012 | Socolof |
| 2012/0130807 A1 | 5/2012 | Steelberg et al. |
| 2012/0185238 A1 | 7/2012 | Bhatti |
| 2012/0192225 A1 | 7/2012 | Harwell et al. |
| 2012/0192239 A1 | 7/2012 | Harwell |
| 2012/0233000 A1 | 9/2012 | Fisher |
| 2012/0233646 A1 | 9/2012 | Coniglio et al. |
| 2012/0236201 A1 | 9/2012 | Larsen |
| 2012/0245952 A1 | 9/2012 | Halterman |
| 2012/0254301 A1 | 10/2012 | Fiero |
| 2012/0272164 A1 | 10/2012 | Polonsky |
| 2012/0304237 A1 | 11/2012 | Harwell et al. |
| 2012/0316962 A1 | 12/2012 | Rathod |
| 2012/0317227 A1 | 12/2012 | Bettinger |
| 2013/0014136 A1 | 1/2013 | Bhatia |
| 2013/0080565 A1 | 3/2013 | van Coppenolle |
| 2013/0086185 A1* | 4/2013 | Desmarais ............ H04L 51/52 709/206 |
| 2013/0086631 A1 | 4/2013 | Archer et al. |
| 2013/0132847 A1 | 5/2013 | Chen |
| 2013/0151970 A1 | 6/2013 | Achour |
| 2013/0159295 A1 | 6/2013 | Gross |
| 2013/0166649 A1 | 6/2013 | Atzmon |
| 2013/0198655 A1 | 8/2013 | Whitnah |
| 2013/0226675 A1 | 8/2013 | Senra |
| 2013/0226708 A1 | 8/2013 | Good et al. |
| 2013/0226758 A1 | 8/2013 | Reitan |
| 2013/0227384 A1 | 8/2013 | Good et al. |
| 2013/0227596 A1 | 8/2013 | Pettis et al. |
| 2013/0238444 A1 | 9/2013 | Munaco |
| 2013/0254804 A1 | 9/2013 | Diaz Perez |
| 2013/0268828 A1 | 10/2013 | Bucchieri |
| 2013/0282839 A1 | 10/2013 | Alcala |
| 2013/0283301 A1 | 10/2013 | Avedissian |
| 2013/0304527 A1 | 11/2013 | Santos, III |
| 2013/0304575 A1 | 11/2013 | Fetyko |
| 2013/0304620 A1 | 11/2013 | Vasquez |
| 2013/0311906 A1 | 11/2013 | Mackin |
| 2013/0312049 A1 | 11/2013 | Niyogi et al. |
| 2013/0321388 A1 | 12/2013 | Locke |
| 2013/0332213 A1 | 12/2013 | Heggen |
| 2013/0332523 A1 | 12/2013 | Luu |
| 2013/0332603 A1 | 12/2013 | Hutten |
| 2013/0346172 A1 | 12/2013 | Wu |
| 2014/0013228 A1 | 1/2014 | Hutten |
| 2014/0019882 A1 | 1/2014 | Chew |
| 2014/0047074 A1* | 2/2014 | Chung ................ H04W 4/21 709/219 |
| 2014/0082645 A1 | 3/2014 | Stern |
| 2014/0095637 A1 | 4/2014 | Cropper |
| 2014/0108372 A1 | 4/2014 | Oh |
| 2014/0108547 A1 | 4/2014 | Rao |
| 2014/0129963 A1 | 5/2014 | Portale |
| 2014/0136554 A1 | 5/2014 | Moradi |
| 2014/0137144 A1 | 5/2014 | Jarvenpaa |
| 2014/0150029 A1 | 5/2014 | Avedissian |
| 2014/0171039 A1 | 6/2014 | Bjontegard |
| 2014/0173644 A1 | 6/2014 | Ball |
| 2014/0173648 A1 | 6/2014 | Ball |
| 2014/0181120 A1 | 6/2014 | Sullivan |
| 2014/0181196 A1 | 6/2014 | Sullivan |
| 2014/0186004 A1 | 7/2014 | Hamer |
| 2014/0188681 A1 | 7/2014 | Shahghasemi |
| 2014/0188741 A1 | 7/2014 | Lustberg |
| 2014/0192199 A1 | 7/2014 | Tan et al. |
| 2014/0195625 A1 | 7/2014 | Weldon |
| 2014/0195675 A1 | 7/2014 | Silver |
| 2014/0200974 A1 | 7/2014 | Morin |
| 2014/0211090 A1 | 7/2014 | Faratzis |
| 2014/0214522 A1 | 7/2014 | Skollar |
| 2014/0237492 A1 | 8/2014 | Jones |
| 2014/0237497 A1 | 8/2014 | Jones |
| 2014/0253727 A1 | 9/2014 | Sadrieh |
| 2014/0267562 A1 | 9/2014 | Lemmey |
| 2014/0280540 A1 | 9/2014 | Wurtele |
| 2014/0280555 A1 | 9/2014 | Tapia |
| 2014/0282016 A1 | 9/2014 | Hosier, Jr. |
| 2014/0289337 A1 | 9/2014 | Green |
| 2014/0297652 A1 | 10/2014 | Stevens |
| 2014/0313341 A1 | 10/2014 | Stribling |
| 2014/0337436 A1 | 11/2014 | Hoagland |
| 2014/0365580 A1 | 12/2014 | Azenkot |
| 2014/0372910 A1 | 12/2014 | Alford Mandzic |
| 2015/0058380 A1 | 2/2015 | Polonsky |
| 2015/0067102 A1 | 3/2015 | Tsarkova |
| 2015/0088622 A1 | 3/2015 | Ganschow |
| 2015/0134684 A1 | 5/2015 | Montana |
| 2015/0154385 A1 | 6/2015 | Chastagnol |
| 2015/0161565 A1 | 6/2015 | Kraft |
| 2015/0220526 A1 | 8/2015 | Green |
| 2015/0245097 A1 | 8/2015 | Agrawal |
| 2015/0312354 A1 | 10/2015 | Boyle |
| 2016/0006981 A1 | 1/2016 | Bauman |
| 2016/0007083 A1 | 1/2016 | Gurha |
| 2016/0042418 A1 | 2/2016 | Traina |

(56) References Cited

U.S. PATENT DOCUMENTS

| | | |
|---|---|---|
| 2016/0155475 A1 | 6/2016 | Hamer |
| 2016/0173738 A1 | 6/2016 | Jones |
| 2016/0180883 A1 | 6/2016 | Hamer |
| 2016/0343037 A1 | 11/2016 | Nicholas |
| 2017/0039867 A1 | 2/2017 | Fieldman |
| 2017/0068361 A1 | 3/2017 | Imbruce |
| 2017/0093780 A1 | 3/2017 | Lieb et al. |
| 2017/0099512 A1 | 4/2017 | Oshminer |
| 2017/0131855 A1 | 5/2017 | Svendsen |
| 2017/0134783 A1 | 5/2017 | Boyle |
| 2017/0134831 A1 | 5/2017 | Talukder |
| 2018/0040017 A1 | 2/2018 | Chung |
| 2018/0262884 A1 | 9/2018 | Hosier, Jr. |
| 2020/0125218 A1 | 4/2020 | Bender |

OTHER PUBLICATIONS

Http://www.filmindependent.org/blogs/check-out-chideo-its-a-cool-idea-for-a-good-cause/#.UI485INOAzq, "Check Out Chideo: It's a Cool Idea for a Good Cause," Sep. 2013.

Https://itunes.apple.com/us/app/chideo/id666170718?mt=8, "Chideo," Sep. 2013.

JockTalk Startup Looks to Boost Pro Athletes' Social Media Leverage, http://mashable.com/2012/04/18/jocktalk-startup/ (2012).

JockTalk, http://web.archive.org/web/20121025092745/http://www.jocktalk.com/ (Oct. 25, 2012).

Office Action received in Australian Patent Application No. 2017223169, dated Dec. 18, 2020, four pages.

PCT International Search Report and Written Opinion dated May 15, 2017, Application No. PCT/US2017/017182, 9 pp.

* cited by examiner area of expertise athlete [_____] ———————— non-athlete location country ▽ state/region ▽  city ▽ professional details sport ▽ position ▽

*FIG. 3* personal information

| first | last |

| email address |

| cell phone number | why?
| twitter username | *optional i prefer to be contacted via:

email [====]———————— cell phone profession sports [====]———————— entertainment location north america [====]———————— europe

*FIG. 5A*

REQUEST  VIDEOS (623)  SOCIAL

Create Request

YOUR REQUEST                0/140        INSTRUCTIONS FOR VIDEO        0/140

REQUEST TYPE    TIME FOR RESPONSE                              MAX RESPONSE
[Regular request ▼]  [24 hours ▼]   ☐ MAKE DEFAULT    [30 secs ▼]

Close advanced options ∧

Attach Either Link or Video (optional) ⓘ
[Attach link ▼] [http://ww.youtube.com/example]

Choose Orientation ⓘ
[landscape ▼]    ☐ Allow upload from Camera Roll ⓘ   ☐ Silo Responses ⓘ

[Cancel]  [Select Experts]

*FIG. 5B*

| | INBOX (60) | |
|---|---|---|
| Acme Sports Network | what do you think about the call... | august 20 ⊗ |
| SRN SPORTS RADIO NETWORK | what do you think about the call... | august 8 ○ |
| LEAGUE TV | what do you think about the call... | march 1 ✓ |
| THE FISHING CHANNEL | what do you think about the call... | may 15 |
| FOOTBALL COMMUNICATIONS NETWORK | what do you think about the call... | january 24 |
| Acme Sports Network | what do you think about the call... | august 20 |
| SRN SPORTS RADIO NETWORK | what do you think about the call... | august 20 |
| LEAGUE TV | what do you think about the call... | august 20 |
| THE FISHING CHANNEL | what do you think about the call... | august 20 |
| FOOTBALL COMMUNICATIONS NETWORK | what do you think about the call... | august 20 |

*FIG. 6A*

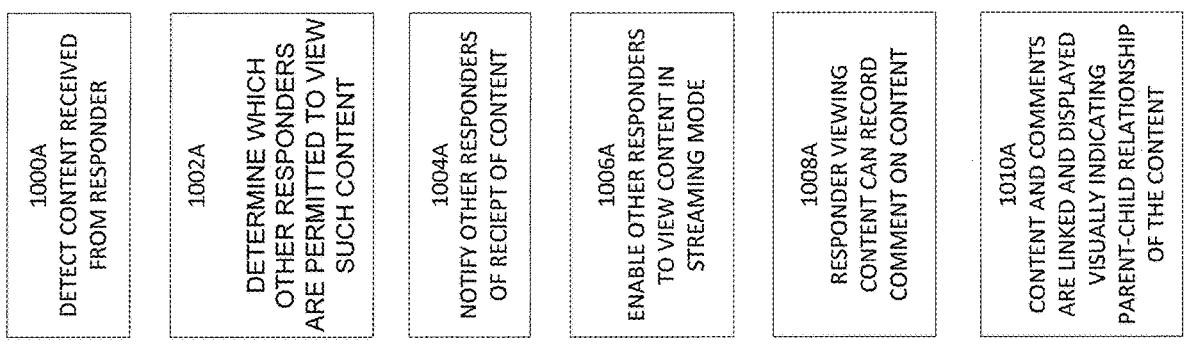

Next
Recording tips
 Speak clearly and loudly
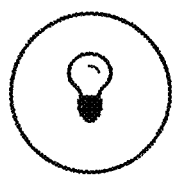 Make sure you have good lighting
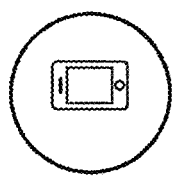 Hold your phone steady at eye level
Don't show tips again
*FIG. 13E1*

Create New List

NAME YOUR LIST

Type a title for your new list

SEARCH — search for an expert
FIELDS — All

*type in search field...*   ✓ select all   ☐ select none

| EXPERT | NETWORK | OCCUPATION | COLLEGE | DETAILS | |
|---|---|---|---|---|---|
| Tom Arnold • Entertainment | | Actor | Iowa Hawkeyes | • Actor & Comedian<br>• Best Known for roles in True Lies, Nine Months and Roseanne | Select |
| Sean Astin • Entertainment | | Actor | UCLA Bruins | • Actor & Director<br>• Best Known for leading roles Rudy and Lord of the Rings Trilogy | Select |
| Steve Atwater • Football | | Player | Arkansas Razorbacks | • Ex Pro Bowl selection<br>• 2x Super Bowl champion<br>• NFL 1990s All-Decade Team | Select |
| Rich Aurilia • Baseball | | Player | St Johns Red Storm | • 2001 MLB Star<br>• Silver Slugger Award Winner | Select |
| Steadman Bailey • Football | | Player | West Virginia Mountaineers | • First-team All-American<br>• WVU receiving yards season record<br>• WVU TD receptions season record | Select |
| Scott Bakula • Entertainment | | Actor | Kansas Jayhawks | • Leading roles in Quantum Leap, Star Trek: Enterprise and NCIS: New Orleans | Select |
| Rick Barry • Basketball | | Player | Miami Hurricanes | • 1975 NBA Champion & Finals MVP<br>• Ex NBA All-Star<br>• NBA's 50th Anniversary All-Time Team | Select |
| Kenny Battle • Basketball | | Player | Illinois Fighting Illini | • Named to University of Illinois Basketball All-Century Team<br>• Illinois Single-Season Steal Record | Select |
| Jason Bay • Baseball | | Player | Gonzaga | • 3x All-Star<br>• NL Rookie of th year | Select |

Cancel   Save List

Sidebar:
- Create Request
- My Lists (0)
- Create New List
- CBS/Turner Lists (19)
  - High profile Celebrities
  - Greenfly Experts Impression redo
  - Comedians
  - UCLA
  - Arizona Top bar: Dashboard | My Videos | Search requests

METHODS AND SYSTEM FOR DISTRIBUTING INFORMATION VIA MULTIPLE FORMS OF DELIVERY SERVICES

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

BACKGROUND OF THE INVENTION

Field of the Invention

The present invention is related to media collection, processing, and distribution.

Description of the Related Art

Social networking and microblogs enable users to quickly share information. However, conventional media, such as television, radio, and newspapers, typically lack the immediacy and interactivity offered by social networks and microblogs.

Social network platforms also suffer from certain deficiencies. For example, conventional social networks often fail to provide a well-defined and recurring system in place for users to distribute the content that they create.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain example embodiments provide a system and process that enable users to share information, content, and items. Such shared information and content may be distributed over one or more distribution channels.

Certain optional embodiments provide a system and method that enables a publisher to submit a request for content to a system, such as a content distribution facilitation system. The system may selectively transmit the request to one or more potential respondents. The potential respondents may optionally be identified by the system based at least in part on the request and/or other criteria specified by the requester, and/or potential respondents may be specifically identified by the publisher. The request may optionally specify an expiration date/time, wherein if the request is not satisfied by the specified date/time, the request may expire, and potential respondents may no longer accept the request.

One or more potential respondents may provide content in response to the request. The content may be newly created content, that is created in response to the request, and/or the content may comprise preexisting, previously recorded content. The system may receive and provide the response, optionally including the content, to the requester, or the responses may be provided directly to the requester without traversing the content distribution facilitation system.

The requester may optionally evaluate the content from some or all of the respondents and may accept one or more content items (e.g., to use and distribute via one or more avenues of distribution). The acceptance indication may optionally be provided via a user interface presented to the requester, and the acceptance indication may be received by the content distribution facilitation system. The respondent(s) whose content was accepted may optionally be notified of the acceptance via the content distribution facilitation system or otherwise (e.g., via email, a short messaging service, an instant message, a dedicated application, a webpage or otherwise). The respondent(s) whose content was accepted (sometimes referred to herein as a content contributor) may optionally be compensated (e.g., via currency or other item of value) directly by the requester and/or by the content distribution facilitation system operator.

Optionally, the requester need not have to actively accept content, but may still be permitted to use the content.

An aspect of the disclosure relates to a content management and distribution system, comprising some or all of the following: a computer system comprising one or more computing devices; a network interface; and a computer storage system comprising a non-transitory storage device, said computer storage system having stored thereon executable program instructions that direct the computer system to at least: maintain a data store comprising: profiles of a plurality of content contributors, including an identification of professions associated with at least a portion of the content contributors, wherein the identified professions for the portion of the content contributors include at least one of the following: athlete, actor, agent, athlete scout, medical expert, or celebrity, and access indicators for the content contributors indicating which content requesters may submit content requests to a given content contributor; provide an interface configured to receive a request to be provided to a given content contributor for video and audio content of the given content contributor; identify a first requester accessing the content management and distribution system; based at least on the identity of the first requester, locate in the data store content contributors that the first requester is permitted access to; provide a search user interface enabling the first requester to search for content contributors; receive a search query from the first requester via the search user interface; identify, using a search engine, matching content contributors in response to the search query; provide a listing of the matching content contributors, wherein the listing of the matching content contributors is restricted to those content contributors to whom the first requester is permitted access to; receive a request for new content from the first requester, the content request comprising: a selection of a set of content contributors from a user interface that lists, using assigned set identifiers, a plurality of content contributor sets defined by the content requester and/or one or more specifically identified content contributors; a content subject matter specification provided via the content subject matter interface, including a request for video and audio content of a content contributor discussing a first specified subject; and response deadline timing information; transmit, using the network interface, at least a portion of the content request, including the content subject matter specification and deadline timing information, to respective applications installed on mobile communication devices of the selected set of content contributors and/or of the one or more specifically identified content contributors, wherein the respective applications are configured to display the request, and at least partly in response to a given contributor providing a first input, prompt the given contributor to capture the requested video and audio content; receive an indication from one or more of the mobile communication devices of the selected set of content contributors and/or of the one or more specifically identified content contributors, that video and audio content is being provided; provide, over a network, the first requester with access to items of content captured by a respective mobile communication device from a camera from one or more content contributors in the selected set of content contributors; and provide a control enabling the first requester to selectively download one or more of the items of content to a system associated with the first requester and a control enabling the first requester to selectively cause one or more of the items of content to be transmitted to a cloud based storage destination specified by the first requester.

An aspect of the disclosure relates to a method of managing content and content requests, the method comprising some or all of the following acts: maintaining, at a content distribution facilitation system comprising specially configured servers and a network interface configured to interface with a plurality of terminals in a client server relationship and with a cloud-based storage system, a data store comprising: profiles of a plurality of content contributors, including an identification of professions associated with at least a portion of the content contributors, wherein the identified professions for the portion of the content contributors include at least one of the following: athlete, actor, agent, athlete scout, medical expert, or celebrity, and access indicators for the content contributors indicating which content requesters may submit content requests to a given content contributor; providing a content subject matter interface configured to receive a request to be provided to a given content contributor for video and audio content of the given content contributor discussing a specified subject; identifying a first requester accessing the content distribution facilitation system; based at least on the identity of the first requester, locating in the data store content contributors that the first requester is permitted access to; providing a search user interface enabling the first requester to search for content contributors; receiving a search query from the first requester via the search user interface; identifying matching content contributors in response to the search query; providing a listing of the matching content contributors, wherein the listing of the matching content contributors is restricted to those content contributors to whom the first requester is permitted access to; receiving, at a content distribution facilitation system, a request for new content from the first requester, the content request comprising: a selection of a set of content contributors previously defined by the first requester from a user interface that lists, using assigned set identifiers, a plurality of content contributor sets defined by the content requester and/or one or more specifically identified content contributors; a content subject matter specification provided via the content subject matter interface, including a request for video and audio content of a content contributor discussing a first specified subject; and response deadline timing information; transmitting, by the content distribution facilitation system, at least a portion of the content request, including the content subject matter specification and deadline timing information, to respective applications installed on mobile communication devices of the selected set of content contributors and/or of the one or more specifically identified content contributors, wherein the respective applications are configured to display the request, and at least partly in response to a given contributor providing a first input, prompt the given contributor to capture the requested video and audio content; providing, via the content distribution facilitation system, the first requester with access to items of content captured by a respective mobile communication device from a camera from one or more content contributors in the selected set of content contributors; and providing a control enabling the first requester to selectively download one or more of the items of content to a system associated with the first requester and a control enabling the first requester to selectively cause one or more of the items of content to be transmitted to a cloud based storage destination specified by the first requester.

An aspect of the disclosure relates to a computer storage system comprising a non-transitory storage device, said computer storage system having stored thereon executable program instructions that when executed by a computer system, cause the computer system to perform operations comprising some or all of the following: maintain a data store comprising: profiles of a plurality of content contributors, including an identification of professions associated with at least a portion of the content contributors, wherein the identified professions for the portion of the content contributors include at least one of the following: athlete, actor, agent, athlete scout, medical expert, or celebrity, and access indicators for the content contributors indicating which content requesters may submit content requests to a given content contributor; provide an interface configured to receive a request to be provided to a given content contributor for video and audio content of the given content contributor; identify a first requester accessing the content management and distribution system; based at least on the identity of the first requester, locate in the data store content contributors that the first requester is permitted access to; provide a user interface comprising a listing of content contributors restricted to those content contributors to whom the first requester is permitted access to and content contributor sets previously defined by the content requester; receive a request for new content from the first requester, the content request comprising: a selection of one or more sets of content contributors and/or one or more specifically identified content contributors from the user interface comprising the listing of content contributors restricted to those content contributors to whom the first requester is permitted access to and the content contributor sets previously defined by the content requester; a content subject matter specification provided via the content subject matter interface, including a request for video and audio content of a content contributor discussing a first specified subject; and response deadline timing information; transmit at least a portion of the content request, including the content subject matter specification and deadline timing information, to respective applications installed on mobile communication devices of the selected set of content contributors and/or of the one or more specifically identified content contributors, wherein the respective applications are configured to display the request, and at least partly in response to a given contributor providing a first input, prompt the given contributor to capture the requested video and audio content; receive an indication from one or more of the mobile communication devices of the selected set of content contributors and/or of the one or more specifically identified content contributors, that video and audio content is being provided; provide the first requester with access to items of content captured by a respective mobile communication device from a camera from one or more content contributors in the selected set of content contributors; and provide a control enabling the first requester to selectively download one or more of the items of content to a system associated with the first requester and a control enabling the first requester to selectively cause one or more of the items of content to be transmitted to a cloud based storage destination specified by the first requester.

In an example embodiment, a data store of profiles of potential content contributors is provided. A request from a first requester for content comprising content criteria is received, the content criteria comprising content contributor characteristics and/or content contributor identifiers, which may be a content contributor name, and content subject matter. Based on the content contributor characteristics, content contributor identifiers, and/or the profiles, at least a first potential content contributor is identified. At least a portion of the content request content criteria is transmitted to the first potential content contributor. Recorded content is received from the first content contributor. The first requester is provided with access to the received recorded content. At least partly in response to acceptance by the first requester of the received recorded content, the first requester is enabled to publish the accepted received recorded content for at least a first period of time. For example, the first requester may optionally download the recorded content, and publish the downloaded recorded content via a website, broadcast television, broadcast radio, software applications, by saving it to a file sharing service, by publishing the content to a social media feed, etc.]

An example aspect provides a method of managing content and content requests, the method comprising: maintaining a data store of profiles of potential content contributors; receiving, at a content distribution facilitation system, a request for new content from a first requester, the content request comprising content criteria, comprising: content contributor characteristics and/or content contributor identifiers; content subject matter; instructions for contributors, duration of request; and/or content length; based at least on the content contributor characteristics and/or content contributor identifiers included in the request and the profiles of potential content contributors, identifying, by the content distribution facilitation system, at least a first plurality of potential content contributors; transmitting, by the content distribution facilitation system, at least a portion of the content request content criteria to the first plurality of potential content contributors; receiving, by the content distribution facilitation system, recorded content from one or more of the first plurality of potential content contributors; providing, via the content distribution facilitation system, the first requester with access to the received recorded content; receiving, by the content distribution facilitation system, acceptance by the first requester of at least one item of the received recorded content, and enabling the first requester to publish the accepted received recorded content. For example, the first requester may optionally download the recorded content, and publish the downloaded recorded content via a website, broadcast television, broadcast radio, software applications, by saving it to a file sharing service, by publishing the content to a social media feed, etc.

An example aspect provides a method of managing content and content requests, the method comprising: maintaining a data store of profiles of potential content contributors; receiving, at a content distribution facilitation system, a request for content from a first requester, the content request comprising content criteria, comprising: content contributor characteristics, and/or content contributor identifiers and/or content subject matter; based at least on the content contributor characteristics and/or content contributor identifiers included in the request and/or the profiles of potential content contributors, identifying, by the content distribution facilitation system, at least a first potential content contributor; transmitting, by the content distribution facilitation system, at least a portion of the content request content criteria to the first potential content contributor; receiving, by the content distribution facilitation system, recorded content from the first content contributor; providing, via the content distribution facilitation system, the first requester with access to the received recorded content; receiving, by the content distribution facilitation system, acceptance by the first requester of the received recorded content, and enabling the first requester to publish the accepted received recorded content. For example, the first requester may optionally download the recorded content, and publish the downloaded recorded content via a website, broadcast television, broadcast radio, software applications, by saving it to a file sharing service, by publishing the content to a social media feed, etc.

An example aspect provides a system, comprising: at least one computing device comprising hardware; non-transitory memory coupled to the at least one computing device that stores instructions that when executed by the at least one computing device cause, at least in part, the system to perform operations comprising: maintaining a data store of profiles of potential content contributors; receiving, at a content distribution facilitation system, a request for content from a first requester, the content request comprising content criteria, comprising: content contributor characteristics and/or content contributor identifiers; content subject matter; based at least on the content contributor characteristics and/or content contributor identifiers included in the request and the profiles of potential content contributors, identifying at least a first potential content contributor; transmitting at least a portion of the content request content criteria to the first potential content contributor; receiving recorded content from the first content contributor; providing, via the content distribution facilitation system, the first requester with access to the received recorded content; receiving acceptance by the first requester of the received recorded content; and enabling the first requester to publish the accepted received recorded content. For example, the first requester may optionally download the recorded content, and publish the downloaded recorded content via a website, broadcast television, broadcast radio, software applications, by saving it to a file sharing service, by publishing the content to a social media feed, etc.

Optionally, the system restricts a given content requester's access to content contributors to a subset of content contributors. The restriction may be defined by a system operator, as specified by respective content contributors, and/or according to defined rules (e.g., a rule may specify that athletes are accessible to all requesters associated with a media publisher).

An example aspect provides a non-transitory memory storing instructions that when executed by a computer system comprising at least one computing device, cause the system to perform operations comprising: maintaining a data store of profiles of potential content contributors; receiving, at a content distribution facilitation system, a request for content from a first requester, the content request comprising content criteria, comprising: content contributor characteristics; content subject matter; based at least on the content contributor characteristics included in the request and the profiles of potential content contributors, identifying at least a first potential content contributor; transmitting at least a portion of the content request content criteria to the first potential content contributor; receiving recorded content from the first content contributor; providing, via the content distribution facilitation system, the first requester with access to the received recorded content; receiving acceptance by the first requester of the received recorded content; and enabling the first requester to publish the accepted received recorded content.

BRIEF DESCRIPTION OF THE DRAWINGS

Embodiments will now be described with reference to the drawings summarized below. These drawings and the associated description are provided to illustrate example embodiments, and not to limit the scope of the invention.

FIGS. 3, 4, 5A, 5B, 6A, 6B, and 7 illustrate example user interfaces.

DETAILED DESCRIPTION

Figure 1:
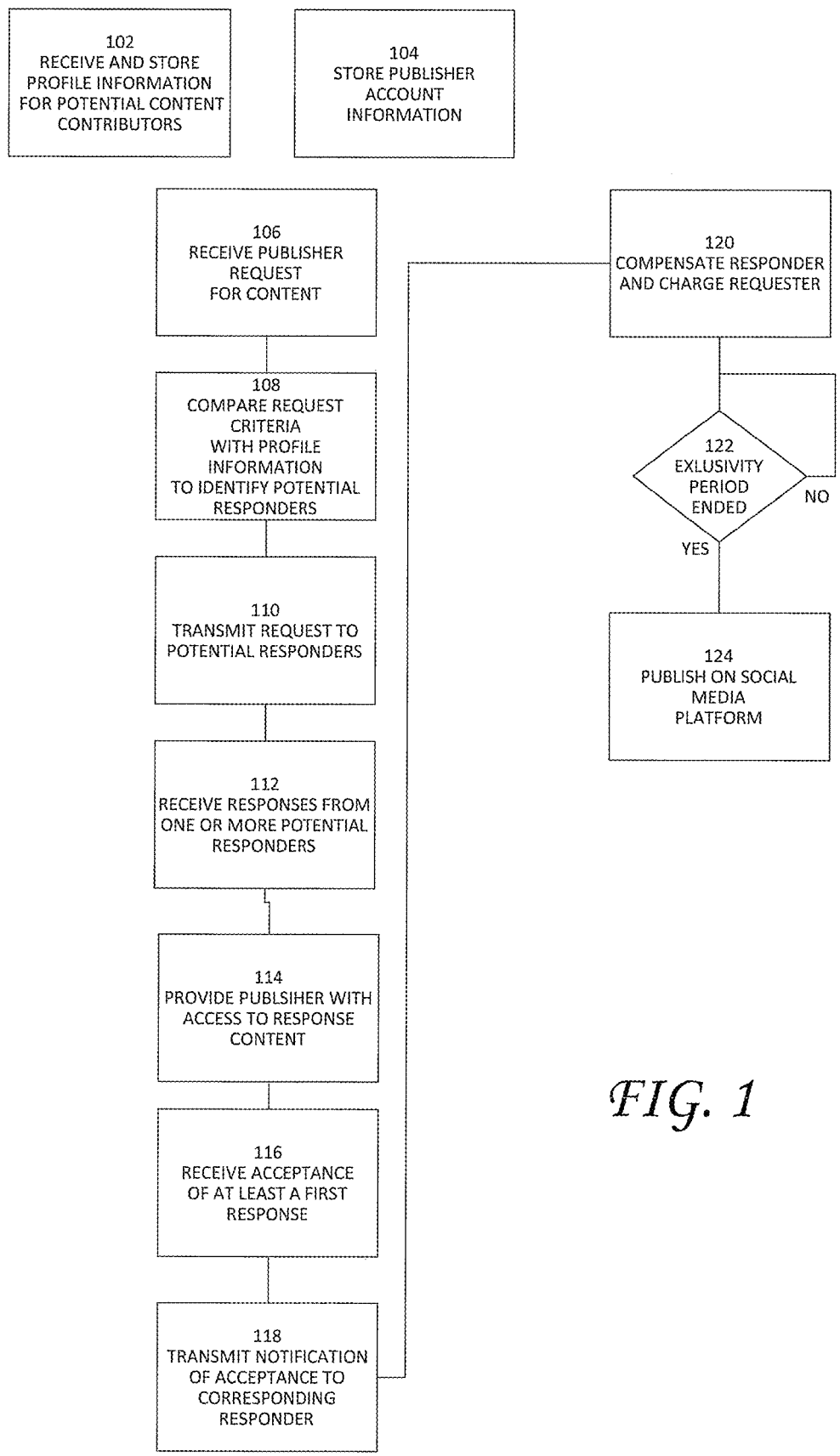
FIG. 1 illustrates an example process.

Systems and methods are described that enable users to share information, content (e.g., audio, video, and/or text content), and items. Such shared information and content may be distributed over one or more distribution channels. For example, certain embodiments enable requests for content to selectively be submitted to a specific target group of potential responders, such as athletes, actors, agents, athlete scouts, medical experts, opinion leaders, industry experts, celebrities, a social or working group, or the like. Optionally, the request may be directed to a specific person or group. Certain embodiments reduce the need for content capture and storage infrastructure, as distributed user devices may be used to capture content, and cloud based systems may be used to store and distribute content captured from the user devices.

For example, certain embodiments provide a system that enables a publisher to submit a request for such content to a content distribution facilitation system, which may then selectively transmit the request to one or more potential respondents. The potential respondents may be identified by the system based at least in part on the request and/or other criteria specified by the requester. The request may specify an expiration date/time, wherein if the request is not satisfied by the specified date/time, the request may expire, and potential respondents may no longer accept and/or respond to the request. By way of example, the publisher may be an entity that needs information, commentary, or other content, such as a producer or distributor of a television program (e.g., a live sports program, such as a game broadcast), a radio program, or an online newspaper. By way of further example, the publisher may be a venue, such as a stadium, where the responder's submission in response to the request may be published on an electronic sign or display (e.g., a large-screen television) within the venue.

The one or more potential respondents may provide content in response to the request. The content may be newly created content, that is created in response to the request or the content may be preexisting, previously recorded content. The system may receive and provide the response, including the content, to the requester, or the responses may be provided directly to the requester without traversing the content distribution facilitation system. The requester may then evaluate the content from some or all of the respondents and accept one or more to use and distribute via one or more avenues of distribution. The acceptance indication may be provided via a user interface presented to the requester (e.g., by activating an acceptance control), and the acceptance indication may be received by the content distribution facilitation system. The respondent(s) whose content was accepted may be notified of the acceptance via the content distribution facilitation system or otherwise (e.g., via email, a short messaging service, an instant message, a dedicated application, a webpage or otherwise). Optionally, the respondent(s) whose content was accepted (sometimes referred to herein as a content contributor) may be compensated directly by the requester and/or by the content distribution facilitation system operator. Optionally, the respondent(s) are not compensated.

Optionally, the requester does not have to actively accept the content in order to use the content and optionally no content acceptance notification is provided to the respondent. For example, the requester (e.g., a publisher) may have pre-negotiated (prior to the content request) an arrangement with the respondent to provide future content for a specified period of time (e.g., a one year contract), for a specific event (e.g., a sports tournament or a specific game or set of games), or for specific subject matter. Hence, the respondent may be under a contractual obligation to provide the content and the requester may have the right to use the content even in the absence of a formal acceptance of the received content. Optionally, even if a formal acceptance notification is not provided to the respondent, the system may provide a notification indicating if the requester utilized the responder's content and may optionally indicate how/where the content was used (e.g., on broadcast television, on an online website, via a streaming television services, etc.). Optionally, the requester may instruct the system to provide such a notification (and may specify how the content was used) or not to provide such a notification. The system will then store and execute the requester's instruction.

Optionally, prior to the content being provided to the requester, the content distribution facilitation system may provide access to the submitted content to a verification entity that automatically and/or manually examines the content and determines if the content violates content rules or guidelines established and/or recorded by the requester or by a third party whose rules or guidelines the content needs to satisfy in order for the content to be published/broadcast by the requester. For example, if the content is being provided by a player for a sports team to a sports broadcasting network, the content may be examined by the verification entity to ensure that the submitted content meets the rules or guidelines of the union to which the player belongs (e.g., to ensure the content will not trigger a grievance). The guidelines or rules may be stored in a data store. The verification can be performed automatically by a verification system (which may be included in the content distribution facilitation system described herein or which may be a separate system operated by a separate entity) that has access to the data store of rules, and that is configured to convert the voice content (if the content includes a sound/voice track) to text using a continuous speech recognition engine, and to compare the text to the rules to detect whether the content violates one or more rules.

For example, the continuous speech recognition engine may utilize natural language processing. Optionally, the natural language processing may utilize a parse tree representing a syntactic structure of a phrase or sentence according to a formal grammar. Optionally, the natural language processing may utilize statistical modeling configured to make soft probabilistic decisions based on attaching real-valued weights to respective input features. Optionally, the natural language processing may utilize semantic indexing.

The verification system may generate a report identifying the rules violated and/or the content that violated the rules. For example, the report may include rule text (e.g., "players are not allowed to criticize the team manager" or "players are not permitted to use the following obscenities: (list of prohibited words)"), a media file (e.g., an audio file or an audio/video file) that includes the content that violates the rule(s), and/or the corresponding transcribed content text (e.g., "the manager is doing a terrible job of hiring key players" or the obscenity) obtained from the speech recognition engine. The report may be provided to the requester, the content submitter, and/or an operator associated with the verification entity. Optionally, the verification process, or portions thereof, may be performed manually by a human, although this may be a more time consuming and less accurate verification method, and a human may not be able to process large numbers of rules or content, or ensure rule consistency. Optionally, the verification system and a human may together perform the verification. For example, the verification system may generate the report, which may be reviewed and or approved or disapproved by a human operator. By way of further example, based on or more rules, certain content may be automatically reviewed and certain content may be flagged for review or for further review by a human operator.

Optionally, with respect to manual verification, those that are not the verification entity are prevented from viewing the content, unless and until the verification entity approves the content. Thus, for example, if the verification entity is a particular user or department (e.g., a legal department or brand management department) at a company that has been designated as a content verifier by the content requester, other users at the company that are not designated as content verifiers are not permitted to view the content until the content verifier verifies the content.

A rules user interface may be provided to the content requester and/or to a third party whose rules or guidelines the content needs to satisfy in order for the content to be broadcast/published by the requester. The rules user interface may enable textual words and/or phrases to be entered that correspond to prohibited phrases comprising one or more words, or to permitted phrases. In addition or instead, the rules user interface may enable a file containing an audio track of prohibited phrases and/or permitted phrases to be loaded by the system. The rules may also indicate to which type of content provider (e.g., based on the role/profession of the content provider) and/or which type of requester the rules are to be applied to. For example, different rules may be specified for players, coaches, managers, and/or team medical personnel. Further, different rules may be applied for print publishing, online distribution, radio, cable and/or over the air television broadcasting. The rules may be evaluated using a rules engine which may be included in the verification system. The rules engine may be configured to register, define, classify, define relationships between rules, and/or manage rules. The rules engine may optionally be configured to verify the consistency of rules definitions.

If an item of submitted content violates a rule, the verification system may inhibit the content from being provided to the requester (e.g., prevent the content from being forwarded or accessed by the content requester), or the content may be provided to requester with an alert/rule violation indication so that the requester is informed of the rules violation. For example the indication may optionally be provided via text (e.g., "this content has violated one or more rules"), an icon, a color, or otherwise. Optionally, the verification system may notify the content submitter of the rule violation (e.g., as discussed above), and enable the content submitter to submit new or corrected content that complies with the violated rule(s) as well as the other rules. The new or corrected content will then be examined to ensure it complies with the rules, as similarly discussed above.

Optionally, the verification entity has a specified period of time to review submitted content (where the time period may be specified by the publisher/requester or the third party). Optionally, if so specified by the requester (e.g., publisher) or authorized third party, if the verification entity does not disapprove the content within the specified period of time, the content is automatically considered approved and an approval indication and optionally access to the content is provided to the requester for publication (e.g., print, broadcast, online, other form of publication). This optional feature may be particularly helpful when the content is to be used in a near-live feed (e.g., for a television or radio broadcast of a game). For example, the if the content submitter has been asked to comment on a play in a game being broadcast, the approval time period may optionally be set to be very short (e.g., less than 15 seconds, less than 10 seconds, or less than 1 second), so that the comment can be broadcast very soon after the play took place. Optionally instead, if so specified by the requester (e.g., publisher) or authorized third party, if the verification entity does not approve the content within the specified period of time, the content is automatically considered disapproved and is not provided to the content requester for publication and/or a disapproval indication is provided to the requester. A countdown timer may optionally be generated and displayed to a verification operator to indicate a remaining time to approve or disapprove the content.

The verification system may maintain a queue of content that is awaiting verification. The verification system may optionally order the queue as a first-in-first-out queue, where the content is ordered so that the oldest (first) entry, is processed first, the next oldest entry is processed second, and so on. The verification system may optionally order the queue based on a priority assigned by the content requester. For example, the content requester may value content from a first content provider more than content from a second content provider, and may specify that the content from the first content provider is to be verified before the content from the second content provider, even if the second provider provided the content first. Optionally, the verification system may present, via a user interface (e.g., to an operator), the current content in the queue and the queue ordering. Once an item of content has been approved or disapproved, the item of content may be removed from the queue of content to be verified.

Optionally, a content provider can specify that his/her content is to be verified prior to the content being provided to a publisher (whether or not the content was specifically requested by the publisher, or the content is being provided without being solicited by the publisher). Thus, for example, the content provider may specify rules as similarly discussed above with respect to the content requester, and the content may be similarly verified by the verification entity. Optionally, the verification system may enable the content provider to specify which verification entity is to perform the verification (e.g., if the content provider is an actor, the verification entity may be a publicist or management entity, who is to ensure that the actor's content is not offensive to the actor's fans). Optionally, those that are not the verification entity are prevented from viewing the content, unless and until the verification entity approves the content. Thus, for example, if the verification entity is a particular user or department (e.g., a legal department or brand management department) at a company that has been designated as a content verifier, other users at the company that are not designated as content verifiers are not permitted to view the content until the content verifier verifies the content.

Optionally, with reference to FIG. 10A, the content requester may specify that responders to a particular request may view the content of other responders (or of other specifically selected responders). The content distribution facilitation system may store such specification in memory. The content distribution facilitation system may then detect when content is received from a given responder (block 1000A), based at least in part on the specification, determine which other responders are permitted to view such content (block 1002A), notify such other responders of the receipt of the content (block 1004A), and enable the other responders to view the content (e.g., using a mobile device application or via a webpage) (block 1006A). Optionally, the other responders are inhibited from downloading the content and may only view the content in streaming mode. Optionally, the other responders are enabled to download the content.

Optionally, a responder reviewing content from another responder can record a comment (e.g., a video recording with an audio track, an audio recording, or a text comment) regarding the viewed content, and the comment may be provided to, and published by the requester (block 1008A). Another responder may in turn record a comment on the original comment and/or on the content, and so on. The content and comments may be linked and displayed in threaded fashion (e.g., visually indicating the parent-child relationship of the content) (block 1010A). The content requester may then select the content and one or more of the comments for publication. For example, the content requester may optionally download the recorded content, and publish the downloaded recorded content via a website, broadcast television, broadcast radio, software applications, by saving it to a file sharing service, by publishing the content to a social media feed, etc.

Optionally, the requester may select a complete thread of content and comments for publication, and a publication system may be configured to then publish the content (e.g., video content, audio content, and/or textual content) in sequential or other order.

Optionally, in the foregoing example, rather than commenting on content submitted by another content provider, an expert/contributor may record a question for another expert/contributor or for multiple experts/contributors (where a given expert may be requested to have already submitted content or where a given expert need not have already submitted content). The question and response(s) may be presented to the content requester in threaded fashion. As similarly discussed above, a publication system may be configured to then publish the content (e.g., video content, audio content, and/or textual content) in sequential, selected, or other order.

A given content contributor may have a profile. The profile may include some or all of the following information and/or other information: how much the content provider charges for different types of content (e.g., editorial content such as news reporting, opinion, or commentary, "commercial" content which may include incidental product placements and/or endorsements, wherein a given item of content may be paid or unpaid content, and/or may be provided under a previously existing contract) and/or different lengths of content, the types of content the content provider is interested in creating, fields of knowledge, job history (e.g., teams played for, positions played), hobbies, personal interests, age, gender, city of residence, shows in which a given personality has been or will be part of the cast, demographics of a given personality's fans, what endorsements deals the personality has (e.g., a sponsorship from an athletic wear or equipment company), etc. The profile may have been created by the content contributor or by a content requester (e.g., a publisher). The profile data may be stored in a searchable content contributor profile data store.

Optionally, a content creator may have created a profile, and a given content requester may add additional information to the content creator profile. Thus, a first content requester may have access to a first version of the content contributor's profile, where the first version includes the profile information provided by the content contributor and the customized information added by the first content requester. A second content requester may have access to a second version of the content contributor's profile, where the second version also includes the profile information provided by the content contributor and includes customized information added by the second content requester. Optionally, a given content requester may be prevented from accessing or viewing the customized portion of a profile entered by another content requester. Thus, different versions of a profile for a given content provider may be presented to different content requesters. Further, the search engine may be configured to limit a content provider profile search of a given content requester to only profile information accessible to all content requesters (e.g., the portion of the profile entered by the content provider) and to profile information entered by the given content requester.

Optionally, a user interface is provided that enables a given content requester to specify whether other content requesters are to be provided with access customized profile information entered by the given content requester for a given content contributor. The sharing specification may be stored and used to determine who is permitted to access the customized portion of the given content contributor's profile.

Thus, for example, optionally, a publisher (e.g., a television network, radio network, web network, newspaper, etc.), may store profiles of their actors/correspondents/personalities (collectively referred to as "personalities" herein, unless the context indicates otherwise). The profiles may indicate the personalities' fields of knowledge, their hobbies, personal interests, age, gender, shows in which a given personality has been or will be part of the cast, demographics of a given personality's fans, what endorsements deals the personality has (e.g., a sponsorship from an athletic wear or equipment company), etc. When an event occurs (e.g., at a sporting event, at a movie preview, a new product release, etc.), the system may identify, using a search engine, appropriate personalities to provide commentary regarding the event.

For example, a publisher may specify one or more desired personality characteristics. The characteristics may be specified in real-time, in response to the event, or the characteristics may have been pre-specified for the type of event, where the specification may be saved as a content submitter search query. For example, if the event is the winning of a baseball game by the Dodgers, and the content is to be presented as part of a news alert on a television program directed to teenagers, a personality search query may specify that the personality is to be between the ages of 13 and 19, be a fan of the Dodgers, be an actor on a comedy series, and be currently viewing the game (e.g., based on the personality checking in via the mobile device application).

By way of further example, if a publisher wishes to find a content contributor that played for a specific sports team or type of a specific college, the publisher query may include the sports team name and/or the sports team type (e.g., women's basketball) and/or the college name.

Optionally, the publisher may specify via the search user interface or via a publisher profile preferences user interface that the search results are to be limited to only those content contributors that the publisher has previously designated as acceptable. For example, the publisher may have entered into a content supply agreement (a contract) with one or more content contributors. The publisher may want to limit the search results to only those content contributors that the publisher has such an active agreement with (where the agreement is still in force). The publisher may be previously indicted, via an uploaded list, via a selection of contributors presented by the system, or otherwise such acceptable personalities.

The search engine may then process the search query and identify, from the stored profiles, personalities or other content contributors that satisfy the query. As noted elsewhere herein, a given profile may include information generally available to all content requesters and may include customized profile information that is only searchable and accessible by the content requester that provided the customized profile information. Thus, the search may be limited to profile information that the publisher is permitted to search. A list of matching personalities or other content contributors may be presented to the publisher (or other authorized entity). Optionally, the search engine may be configured to execute incremental searches as a user enters query characters. For example, the search engine may be configured to detect each character of query as it is being entered by the user and identify in substantially real time matches based on the current query term characters. Such an incremental search technique will often enable the user to find desired matching personalities or other content contributors without having to enter the entire personality query.

Optionally, an interface is provided via which the user (e.g., a publisher or other content requester) can select one or more of the personalities or other content contributors included in the search results and save them as a list, with a list name assigned by the user. For example, if the search was for former Dodgers catchers, the user can select some or all of the personalities or other content contributors returned by the search engine and save the selection in a list entitled "Former Dodgers catchers"). The user can then access and select this list (or a subset of the list personality entries) for future content requests. Optionally, when conducting a search, if the publisher has predefined sets of content contributors the publisher may instruct the system to limit the search to those content contributors in one or more specified predefined sets of content contributors. Optionally, the system restricts a given content requester's access to content contributors to a subset of content contributors. The restriction may be defined by a system operator, as specified by respective content contributors, and/or according to defined rules (e.g., a rule may specify that athletes are accessible to all requesters associated with a media publisher). Thus, results of a search conducted by a content requester may optionally be limited to those content contributors to which the requester is permitted access to by the system, and will not include those content contributors to which the requester is not permitted access to.

The system may then automatically, or in response to a selection by the publisher, transmit the content request to one or more of the matching personalities or other content contributors. Optionally, a content submitter (e.g., a user responding to a content request) is prevented from submitting content during certain specified times of days or from certain specified locations. Optionally, a content submitter is prevented from submitting content recorded during certain specified times of days or recorded at certain specified locations. Optionally, instead, when a content submitter submits content during certain specified times of days or from certain specified locations, an alert indication is stored in association with the content, and such content is subjected to a more thorough verification and/or the content is not automatically approved even if a specified approval period has expired. An operator may specify such time periods and/or locations via a user interface, and the system may store the specification in memory. The operator may also specify one or more rules for how the content is to be processed if the content is being submitted and/or recorded within the specified time period and/or within the specified location (e.g., a geographical and/or named location, such as a stadium or restaurant). For example, the operator may specify that such content be prevented from being submitted and/or published, or that such content be subject to a higher level of scrutiny and verification (e.g., operator verification).

When a content submitter (or other content submitter) attempts to submit content, the system may access the specifications and determine from metadata associated with the content (e.g., time and/or location data, such as GPS data) whether the content is being submitted within and/or recorded within the specified time period and/or location.

For example, it may be determined that content providers submitting content between 12:00 AM and 4:00 AM often appear drowsy or may appear to be inebriated. Therefore, such content may often be undesirable and so may, as a rule, automatically be prevented from being submitted and/or published, or may be subject to a higher level of scrutiny and verification. Optionally, if content being submitted has an associated recording timestamp, the system may determine whether the timestamp falls within the specified period of time, and if so, the content may automatically be prevented from being submitted and/or published, or may be subject to a higher level of scrutiny and verification.

Similarly, certain locations may be considered potentially undesirable. For example, it may be undesirable to have certain types of content recorded in a bar or at an adult entertainment venue, because if the content includes a video track the bar or adult entertainment venue may be viewed in the background, and if the content includes an audio track, inappropriate language may be recorded. By way of further example, it may be undesirable to have content recorded at a venue associated with a competitor of the content requester/publisher. Therefore, such content may be undesirable and so may, as a rule, automatically be prevented from being submitted and/or published, or may be subject to a higher level of scrutiny and verification. Optionally, if content being submitted has an associated recording timestamp, the system may determine whether the timestamp falls within the specified period of time, and if so, the content may automatically be prevented from being submitted and/or published, or may be subject to a higher level of scrutiny and verification.

As discussed above, a content submitter may be compensated for providing content. Optionally, the compensation may be timed/event based. For example, if the content is received during a live sporting event broadcast where the content may be used, the responder may receive a relatively higher level than if the content is received after the live sporting event for use in a news report reporting on the sporting event. Optionally, a responder may receive a relatively lower compensation for providing the content if the content is submitted in response to the request, but is not accepted. Optionally, if the content is not accepted by the requester within a specified period of time, the ability of the requester to accept the content may expire, and the content may be offered to others on an exclusive (or non-exclusive) basis. For example, if the content is not accepted by the requester within a specified period of time, the system may offer the content to other potential users (e.g., media partners), optionally with a designated acceptance period. Once that acceptance period passes without a purchase by such a media partner, or if the responder indicated that they do not want the content offered to other media partners, then the content may be automatically published out to social media (e.g., a microblog, a blog, a social network page, etc.), some or all of which may be hosted by the system or by third party systems. For example, the system may host a website where a given responder/content contributor (e.g., an athlete or celebrity) is provided a page or site, where the content provided in a response, as well as other content (e.g., videos, photos, text, conversations) may be posted in association with ads or sponsorships, enabling richer fan interactions, and generating revenue for such content providers.

Optionally, the requester may specify different amounts of compensation for different response times. For example the requester may specify that the responder will receive $500 if the response is received within 5 minutes of the request being submitted, $300 if the response is received between 6-30 minutes of the request being submitted, and $150 if the response is received between 31 minutes and 4 hours of the request being submitted. In this example, the requester may specify that the offer expires if the content is not received within 4 hours of the request being submitted. In addition to or instead of specifying relative time, the request may specify absolute time periods. For example, requester may specify that the responder will receive $500 if the response is received by 1:15 PM, $300 if the response is received between 1:16 PM-1:45 PM, and $150 if the response is received between 1:46 PM and 5:45 PM.

Optionally, a point system may be used in addition to or instead of the currency payment system described herein. For example, a responder may be awarded a first set of points (e.g., 5 points or other number of points) for submitting a response to a requester (e.g., video, audio, and/or text media), and may be awarded a second number of points (e.g., 3 to 10 times as many points as the first number of points), if the requester uses the submitted response (e.g., by broadcasting it via television, radio, webpage, SMS message, or email). Optionally, the system may enable the responder to convert the points to an item of value, such as currency, a gift card, a product, and/or a service. Optionally, some or all of the items of value may be provisioned by a sponsor seeking to advertise their product and/or service. For example, a golf equipment company may provide golfing equipment which the responder would "purchase" via the system or otherwise using points. The sponsor may obtain the benefit of having a well-known responder (e.g., a well-known athlete) use their product and/or service, and may optionally be entitled to identify, via advertisements or otherwise, that the responder uses the sponsor's products and/or services. Optionally, the sponsor may specify that in order to receive the item of value, the responder needs to include the item in a video response that includes the responder (e.g., for product placement). Optionally, the responder may need to have at least a threshold amount of points in order to exchange the points for an item of value. Optionally, a given point may be assigned a certain currency value (e.g., each point or each 10 points equal one dollar).

The requester may be provided with an exclusive right to utilize the accepted content for a specified time period or indefinitely, number of views, and/or for one or more specified distribution channels (e.g., television, radio, print, etc.). For example, the length of exclusivity may be based on the fee, wherein the relatively larger the fee for a given item of content, the relatively longer the period of exclusivity. Optionally, once the period of exclusivity ends, the content may be automatically published via one or more other publication channels and/or control of the content may be transferred to the system operator or to the content contributor For example, the content, or a portion thereof, may automatically be published on a micro-blogging site, a conventional blog, a social networking site, via email, via short messaging service message, and/or otherwise. Optionally, at least partly in response to the expiration of the exclusivity or a date related thereto, a notification is posted on a social networking site associated with the publisher and/or the content contributor (or elsewhere) regarding the loss of exclusivity and/or indicating (with text, a link, or otherwise) where else the content can now be found (e.g., on the content contributor's social network page). Instead or in addition, the notification may be provided via a microblog, text message, email, or otherwise. Optionally, once the requester has published the content, the content contributor may be enabled to (immediately, or after a specified period of time) repost the content or a link to the content via a micro-blogging site, a conventional blog, a social networking site, via email, via short messaging service message, and/or otherwise. Optionally, the system may enable the content contributor to post the content (e.g., to a social media page associated with the content contributor) whether or not the requester has published the content (e.g., substantially immediately after the content is submitted by the content contributor). Optionally, the system will inhibit the content contributor from posting the content until approval is received from the content requester. For example, the system may automatically (or in response to a content contributor request) transmit an approval request to the content requester in response to receiving content, and upon receiving approval from the content requester, enable the content contributor to post the content.

The publication channels may be associated with the responder and/or the system operator. For example, the content may be published on the contributor's social networking page and/or microblog after the exclusivity expiration. Advertising (e.g., from sponsors that pay a fee) may be provided on such a site, where the revenue may be shared by the responder and the content distribution facilitation system. During the period of exclusivity, the system may ensure that the accepted content is not distributed via the system to other requesters during the period. Optionally, when an exclusivity period expires, a notification may be transmitted by the system to the requester and to the corresponding responder regarding the expiration of the exclusivity.

Optionally, the requester is not granted exclusive rights. Optionally, the requester is assigned ownership of the content.

For example, if during a live sporting event, such as a baseball game, a notable event occurs (e.g., a player hitting four home runs in a game, a record breaking event, an unusual event, a notable statistic, etc.), a broadcaster of the live event may want to request that other players that have achieved the same feat provide commentary regarding the feat while the game is still in progress to enhance the excitement of the game broadcast and to add a social networking aspect to the game broadcast. The broadcaster may submit, via a user interface provided by the system, a request for such commentary during the game (e.g., almost immediately after the event occurred) and may specify that the query is to be directed to athletes, and in particular to other players that have previously achieved the feat. The request may specify the subject that the athlete is to discuss (e.g., how they feel regarding another athlete achieving the feat). The requester may also specify a response deadline, the media type for the response (e.g., video (including an audio track), static images (e.g., photographs), audio only track, text, etc.), and other response criteria via the user interface. For example, the response criteria may specify a response length.

Optionally, potential responders may have an application or application programming interface (API) installed on their devices that detect certain actions being performed by the responders. For example, the application may detect in real time if a responder is viewing a program, such as a sporting event, and may identify which program is being watched, and may transmit such detection to the content distribution facilitation system. Optionally, the application prompts the potential responder to indicate (e.g., by tapping on a corresponding control or otherwise) that he or she is (or is not) watching a specific program, and the application will cause the indication to be transmitted to the content distribution facilitation system. Optionally, with or without being requested by a particular content requester, or by the application, the potential responder may check-in via an application, wherein the check-in indicates which event the potential responder plans on or is currently attending (e.g., a particular baseball game) or viewing. The potential responder may in addition or instead check-in to a particular publisher (e.g., a particular network). The requester may specify that the request is to be provided to potential responders that are currently watching a specified program. For example, the request may specify that the responder is to comment on an event that just took place in the program (e.g., hitting of a home run or a triple play). Optionally, if the request includes a response deadline, one or more reminder notifications may be generated and provided to the potential responder via the application. For example, a reminder may be generated two hours before the deadline expiration, one hour before the deadline expiration, and 30 minutes before the deadline expiration. Optionally, a content submitter can submit content unprompted. For example, optionally the content submitted can submit content for a live-feed.

Optionally, in addition to or instead of requesting a recorded submission, the requester may request that a responder participate in a live interview/discussion, either substantially immediately (e.g., within 1 minute, 5 minutes, 10 minutes, 30 minutes, or 1 hour of the request) or at some specified date/time (e.g., Sep. 30, 2013 at 11:00 AM). One or more responders may agree to the request and the requester may engage one or more of such responders. Optionally, a responder may participate in the interview/discussion using the responder's mobile device (e.g., mobile telephone) camera and/or microphone to capture video and/or voice. Other devices, such as a desktop computer, laptop computer, tablet computer, television, game console, etc. that are coupled to a camera and/or microphone may be used to capture the responder's video and/or voice and to transmit them in substantially real-time (e.g., with less than a second lag) via the system described herein or other system. Likewise, the responder device may be used to receive video and audio from the requester, enabling the requester and responder to engage in an audio-video discussion.

By way of illustration, if the response is to be a video or audio response, the request may specify the minimum and/or maximum time length of the response, and if the response is text, the request may specify minimum and/or maximum number of words and/or characters. By way of further example, if the response is video or a still image, the response criteria may include orientation (e.g., landscape or portrait), which may be selected based at least in part to the target content reproduction device (e.g., television sets, phones, tablet computers, desktop computers, etc.), and/or desired resolution of the video and/or image quality.

The requester may also indicate a desired period of time of exclusivity and/or a desired exclusive form of distribution. Corresponding fees may be specified by the system to the requester for different lengths of exclusivity and/or avenues of distribution. Optionally, the requester may specify the fees the requester is willing to pay for the same, as part of the request criteria. Optionally, no fee is to be paid by the requester. For example, a potential responder may wish to provide content as a form of self-promotion, even in the absence of a fee. Optionally, a requester (e.g., a publisher) may have pre-negotiated an arrangement with one or more content contributors to provide content (e.g., without any fee; with a fixed fee for an event or period of time, with a per item of content fee, and/or a fee for each item of content used) on an exclusive or a non-exclusive basis. For example, a publisher may have retained a content contributor to provide a specified number of items of content over a specified time period or for a specific event on a non-exclusive basis without a fee. By way of further example, a publisher may have retained a content contributor to provide content (without specifying the number of items) over a specified time period on an exclusive basis for a specified fee.

Using the requester criteria, the system may search its database of potential responders, such as athletes, actors, celebrities, experts, designers, artists, musicians, etc., for potential responders whose stored profiles match the requester criteria and that have agreed to receive such requests. For example, the database may include profiles of athletes, such as baseball players, which may include various statistics, events, and achievements from some or all of the games they have played in (including those that result from an aggregation of achievements over multiple games, such as how many games the player has played in a row, or how may games in a row the player has hit a home run). The system may transmit the request to matching potential responders, where the request may include some or all of the requester specified response criteria. By way of example, the request may be transmitted to a potential responder via email, short messaging service (e.g., SMS, MMS, etc.), instant messaging service, an application (sometimes referred to as an "app") downloaded to or otherwise installed on a potential recipient device (e.g. a mobile phone, tablet computer, entertainment device, etc.), and/or otherwise. For example, as noted above, the notification may be provided as an "in-app" notification by an application installed on the responder's mobile phone, tablet computer, or entertainment device.

Optionally, a given potential responder that receives the request may record the content requested via a mobile device, such as a phone. For example, a phone application may be configured to both present the request and enable the recording of the response content, optionally at the same time. By way of illustration, if the request includes a request for video content of the recipient, the application may activate a front facing camera of the phone and present a user interface on the phone display showing the image being captured by the front facing camera, where the request may be displayed at the same time. A record control may be provided. When the recipient activates the record control, a recording of the recipient (e.g., discussing the subject matter included in the request) is initiated. A timer (e.g., a countdown counter) may be presented while the recording is in process which may count down a time corresponding to the requested length of the video content. For example, the request transmitted to the user phone application may include the requested length, and the application may load the timer with a corresponding time. Optionally, once the timer has reached a certain value (e.g., 0), the recording may be automatically halted by the application. Optionally, instead, the recording may continue until the recipient activates a stop or pause control (optionally an indication is provided that the recording has exceeded the requested length). The recorded content may be transmitted to the content distribution facilitation system or the content distribution facilitation system may otherwise access the content.

Optionally, a content item may be divided into subsets or chunks for transmission to reduce the probability of an error occurring during transmission of the content item and having to re-transmit the entire content item again. By way of example, a chunk may be packetized for transmission over a packet network (e.g., an IP network) and may include verification data (e.g., a checksum). If the receiving system detects an error with respect to a chunk (e.g., a failure to receive the corresponding packet or a defect in the received packet) it may transmit a request to the system that sent the packet to resend that packet/chunk.

Optionally, the application may continue transmitting a content item to the content distribution facilitation system even when the application is running in the background after the content contributor has finished interacting with the application and the application is no longer being displayed.

Thus, one or more responses, including requested content or links thereto, may be provided by the requested recipients. The responses may be received by content distribution facilitation system. The content distribution facilitation system may forward the responses to the requester or otherwise notify the requester and enable the requester to access the responses. For example, a user interface provided by the content distribution facilitation system to the requester via a requester terminal may display a listing of responses from which the requester can select. Optionally, a watermark may be embedded in the content provided to the requester for review, to prevent or discourage the use of the content until accepted by the requester and/or paid for by the requester. For example, with respect to video or image content, the watermark may be visual. With respect to audio content, the watermark may be audible. The content may be provided without the watermark once accepted by the requester.

In an example embodiment, the requester may access the responses via a list presented in a web page provided for display by the system, via a dedicated software application, or otherwise. The requester may click on a control, such as a view control, presented in association with a respective response entry, and the corresponding response is presented (e.g., presented as text, video, and/or audio). The requester may then provide, via a user interface, an indication of acceptance of one or more of the responses. The acceptance may be recorded by the system and the system may then charge or invoice the requester for the accepted responses. The accepted response may then be automatically downloaded to the requester system or the accepted response may be downloaded in response to receiving a specific download instruction from the requester (via the requester system).

Optionally, an interface may be provided enabling the requester to specify reasons as to why the requester did not accept a given response (e.g., the video quality was poor, the camera was shaky, the sound quality was poor, the content was uninteresting, the content included objectionable content (e.g., obscene language, racist language, etc.)). A notification may be transmitted to the responders indicating acceptance or non-acceptance of respective responses (optionally including reasons for non-acceptance provided by the requester), and a confirmation of the acceptance may be transmitted to the requester.

Optionally, content not accepted by the requester may then be offered to others for use on an exclusive or non-exclusive basis (e.g., where the requester affirmatively specifies that the content is not accepted or a predetermined period of time elapses without an acceptance by the requester and so the content is designated by the system as "not-accepted"). For example, other potential licensees/purchasers of the content may be provided by the system with a search interface where they can enter search queries to identify content they may be interested in. By way of further example, such interface may include fields enabling a searcher to specify subject matter criteria (e.g., home runs), author criteria (e.g., a pitcher), content specifications (e.g., format, length, type (e.g., audio video, audio only, images, etc.), availability of exclusive rights, and/or other criteria discussed herein with respect to requester-specified criteria. The system may then return matching search results (if any), with an associated control enabling the searcher to specify they want to licensee/purchase a given item of content identified in the search results. Optionally, the responder may correct the issue(s) identified by the requester and may resubmit the corrected content which the requester may or may not accept, as similarly described above After the requester has accepted and received the content (e.g., via a download to the requester system), the requester may publish the accepted content accordingly (e.g., in a television program, radio program, online news program, etc.). Optionally, the requester may inform the system where (e.g., which channel, station, online media, URL, etc.) and when (e.g., time and date) the content will be published, and the system will cause a notification to be presented to potential consumers, indicating where and when they can find and view (and/or listen to) the content. Optionally, such a notification is posted on a social networking site associated with the publisher and/or the content contributor indicating (with text, a link, or otherwise) where and when the content can be found. Instead or in addition, the notification may be provided via a microblog, text message, email, or otherwise by the system, content provider, and/or publisher. Optionally, in addition to or instead of the link, the content itself may be posted.

Optionally, an editing application may be provided to enable manual and/or automatic editing of content via a web-based application or an application hosted on the requester's system. For example, a user interface may be provided via which the requester can requests that specified edits may be to the content. For example, the application may be configured to perform one or more of the following: trim the duration of the video to a specified length by trimming the video on one or both ends; add pre-roll or post-roll bumpers (where a bumper is a short video clip (e.g., 5-15 seconds in duration); and/or adding watermarks overlaid onto an image or video included in the content.

Further non-limiting examples of the type of criteria that may be specified by a requester will now be described. A user interface may be provided enabling the user to specify, by way of example:

region (e.g., city),
sport,
team,
accomplishments (all-star, Cy Young award winner, Heisman trophy winner, specified RBI range, specified stolen base range, specified number of consecutive games in which the responder accomplished a specified act, specified number of singles, doubles, and/or triples per game, specified number of at bats, specified passing, rushing, receiving, punting, kick, touchdown accomplishments, etc.),
age range (athletes over 40),
medical condition or procedure (e.g., having a type of surgery, such as ligament reconstruction surgery, having numbness in a limb),
which years played and/or under what coaches,
which bowl games played,
which positions played,
which and how many season games played in,
which and how many post-season/playoff game(s) played in,
which and how many world series games played in, etc.

By way of further example, for movie or television related content, the criteria may specify:

profession type (e.g., actor, writer, director, editor, composer, set designer, comedian, musician, producer, analyst, anchor, correspondent, reporter, sideline reporter, other, etc.),
award-types won (e.g., Academy Award, People's Choice Award, Critics Award, Emmy Awards etc.),
award category (e.g., Best Actor, Best Actress, Best Supporting Actor, Best Supporting Actress),
movies appeared in or otherwise participated in,
television shows appeared in or otherwise participated in, etc.

By way of further illustration, an online newspaper or other news site may be publishing an article regarding a crime, such as a murder. The publisher may want audio commentary regarding the crime from a psychologist. The publisher may submit a request to the system for audio content, of a specified length, commenting on the subject of the crime, from a psychologist having an expertise in criminal psychology. The system may identify psychologists meeting the publisher's criteria, and transmit the request to some or all of the identified psychologists. Optionally, in addition or instead, the publisher may specify/select a particular content contributor via a user interface to whom the request is to be transmitted. The responses, including audio content, may be received by the system and made available to the publisher (e.g., via a website, dedicated application, or otherwise). The publisher may listen to the audio content from several or all of the responses from the psychologists. The publisher may accept a response. The publisher may then embed in the article a link to the audio content. A user can then read the article and activate the link in order to hear the audio content.

An application programming interface may be provided enabling third party systems to gain access to some or all of the services provided by the content distribution facilitation system. The operator of a third system may pay a licensing fee for such access.

The operator of the system may utilize one or more fee arrangements to obtain compensation for the services provided and to reimburse the fees paid to content providers. By way of example, publishers may pay a periodic subscription fee in order to utilize the system and obtain the right (e.g., the exclusive right for a least a period of time) to utilize content provided by content providers (e.g., athletes, celebrities, medical personal, etc.) and accepted by the requester. Optionally, the subscription service may only enable the requester to issue requests for and/or accept a specified number of items of content within a specified period of time (e.g., the requester may only be permitted to submit 5 requests per month).

Compensation may also be received from sponsors and advertisers. Optionally, a content contributor responding to a request may be compensated in whole or in part via compensation sponsored by a third party (e.g., that wants to advertise its goods, services, or brand name). For example, a contributor may be given a gift card (which may be a new gift card or a recharge of value of a gift card previously distributed to the contributor) for each submission (or for a specified number of submissions), the gift card provided in association with an advertisement from a sponsor that is paying for all or a portion of the gift card value.

Optionally, in addition or instead, the content contributor may be provided with a portion of the revenue from a sponsor sponsoring a show, newspaper, or other medium using and distributing the content. For example, if the content is a 1 minute video of an athlete content contributor being displayed during a broadcast of a live game, the video may be introduced as "this minute of baseball starring John Smith is presented by [sponsor name]". The sponsor may pay to have their brand associated with the video, and the athlete may receive some or all of the sponsorship fees. Optionally, the content contributor may be paid a fixed amount. Optionally, certain requesters (e.g., companies) may request the responder (e.g., a celebrity, such as an athlete or actor) to perform product placement acts and compensate the responder accordingly. For example, a company may request, and pay a fee for certain celebrities to say "Happy Mother's Day" while holding a food product provided by the company. By way of further example, certain requesters (e.g., companies) may request that the responder include the requester's logo (e.g., via a watermark or otherwise) into videos submitted by the responder in response to a request from the requester offering payment for inclusion of the logo and/or to requests from other requesters and/or for videos distributed by one or more specified media partners. The logo may be provided by the requester and inserted by the responder, the system, or otherwise.

Optionally, the amount, if any, the content contributor is paid for his or her contribution may vary and may be determined based on one or more of the following factors and/or other factors:

length/size of content;
type of content (e.g., video, audio, text);
type of use by publisher (e.g., television, radio, printed newspaper, online newspaper, online broadcast, blog, pushed out to users (e.g., via email, SMS, website, microblog, etc.), etc.);
timing of the provision of the content from the contributor (e.g., how long after the content request was submitted the content was received by the publisher);
length of exclusivity;
identity of the contributor (e.g., how famous or popular the contributor is);
etc.

Optionally, a requester can request items other than publishable content. For example, a requester may specify that they want a specific type of item of memorabilia from a specific potential responder and/or from a responder selected from a group of responders that satisfy the requester's criteria. As similarly described above, the criteria may be specified via a user interface provided by the system. For example, the requester may request a signed baseball from a specific baseball player, or the requester may request a signed baseball from any current player on a specified baseball team. The requester may also specify a time frame in which the memorabilia needs to be received by the requester. For example, the requester may want to ensure that the memorabilia is received by a designated gift recipient in time for the gift recipient's birthday.

The system may access its database to identify potential responders that satisfy the requester criteria, and transmit the request to some or all of the identified potential responders. If a potential responder accepts the request, the system may receive the acceptance and notify other potential responders that the request has been taken and is no longer available to service. The responder that accepted the request then provides the requested memorabilia to the requester. A fixed fee may be specified for different types of memorabilia, or the requester may specify in the request how much they are willing to pay for the memorabilia, and the potential responder may determine whether they want to satisfy the request based at least in part on the fee amount. The responder is correspondingly compensated and the requester is correspondingly charged.

The foregoing process may be similarly performed by the system for other types of requests. For example, a requester may request that a specific potential responder (e.g., a specified athlete, musical performer, actor, celebrity, etc.) or a potential responder satisfying criteria specified by the user, provide a recorded video of the potential responder singing happy birthday, wherein the rendition of happy birthday is to include the recitation of a specified recipient of the video (e.g., a boy or girl whose birthday it is). By way of further example, the request may be a request to answer a question by the requester (e.g., regarding a statistic, opinion (e.g., who was the best play at a specified position) or a personal fact of the potential responder. Optionally, the request may include text that the responder is to recite in the response (e.g., where the text may include the name of a host of a show on which the content is to be used, such as "Hello, Joe, let me tell you what I think of the last play.."). Such requests and responses may be processed as similarly discussed above, and the content may be provided to the requester and/or directly to a specified gift recipient (e.g., via a video download file, streaming media, a DVD, or otherwise).

Optionally, the system enables users (e.g., celebrities, athletes, etc.) to create unsolicited content and offer the content to potential content consumers (e.g., publishers, individual end-users, etc.). The user may tag the content with appropriate descriptors. For example, the tags may indicate the media type, the media length, the media content subject matter, the user's credentials and/or resume information (e.g., the user's profession, awards, notable accomplishments, area of expertise, etc.), the use fee, etc. The user may also specify specific users (e.g., producers or broadcasters of specific television shows) and/or specific types of users (e.g., producers or broadcasters of sports programs) to whom the content offer is to be made. The content offer may then be sent out to the potential consumer(s) as specified by the user.

Optionally, the user (content contributor), a requester (e.g., publisher), and/or system operator may be able to specify that a given user is to be accessible only to one requester or to a specified set or classes of requesters Optionally the accessibility restrictions may be limited to one or more specified subject areas (e.g., sports, movies, television, music, medicine, legal matters, etc.), for a specific event (e.g., a particular sports tournament, game, or trial), and/or may be limited to a specific period of time (e.g., one year, a specific sports season, etc.). The system will then store such accessibility information in the user profile information and/or elsewhere. Optionally, the user will be excluded from search results presented to other content requesters during such an exclusivity period or event and/or for requests related to the subject matter for which there is exclusivity. Optionally, if a requester (e.g., publisher) indicates some form of exclusivity with respect to a user (content contributor), the system will transmit a communication (e.g., an email, text message, web page notification, etc.) to the user (content contributor) asking for confirmation. If the user confirms the requester-specified exclusivity, then the system will store the exclusivity information in association with the user profile information with an indication that the exclusivity information is in force. If the user (content contributor) responds with an exclusivity denial, optionally the system will not store the exclusivity indication in association with the user profile information with an indication that the exclusivity information is in force. Optionally, in response to such a denial indication the system will transmit a notification to the requester regarding the exclusivity denial.

Optionally, when a requester submits a search query for content contributors, the system will determine if a given content contributor is exclusive to another requester (e.g., based on time period, event, and/or subject matter). If the system determines that the given content contributor is exclusive to another requester, the system will exclude that content contributor from the search results returned by the system. Optionally, when a requester submits a search query for content contributors, the system will determine if the requester has been granted access to a given content contributor. If the system determines that the requester has not been given access to a given content contributor, the system will exclude that content contributor from the search results returned by the system.

Optionally a requester (e.g., a publisher) may make an arrangement (e.g., with the system operator) to make one or more content contributors exclusive based on content contributor characteristics (e.g., profession, team, player position, player statistics, awards won, location, gender, age, profession, expertise, other characteristics disclosed herein, etc.), rather than based on the identity of the content contributors. For example, a publisher may request exclusivity with respect to all former players of a specified team for a specified game, optionally without specifying specific player names.

Optionally, prior to storing the new exclusivity information with an indication that the exclusivity information is in force in association with the profile information for a given content contributor, the system will inspect and validate that the new exclusivity information specified for the given content provider does not conflict with previously specified exclusivity information that is still in force. For example, the system may compare the previously specified exclusivity information from a first content requester with the newly specified exclusivity information from a second content requester to determine if there is an impermissible overlap in subject areas, events, and/or time period. If there is an overlap, a message may be generated and transmitted to the content requester that provided the new exclusivity information, the message indicating that the new exclusivity information is in conflict with previous, in force exclusivity information, and that the new exclusivity information will not be approved. In the event of such conflicting overlap, the system will not store the new exclusivity information with an indication that the exclusivity information is in force in association with the profile information for the given content contributor.

Optionally, the system may access accounts of potential consumers of the content, and determine if the potential content consumers have requested to be notified when content that meets specified criteria has become available for publishing. The system may compare the specified criteria from one or more potential content consumers with the tags, and if there is a sufficient match (and optionally only if the potential consumers match the user's criteria), notify potential content consumers of the content which they may accept or not accept as similarly described above, and for which compensation may be paid as similarly discussed above.

For example, an athlete may want to make a significant announcement by recording a video offering it via the system to different media partners. Optionally, rather than offering an already recorded video, the athlete offer may state a subject regarding which the athlete is willing to provide content on. For example, if an athlete was recently in an accident which ended his professional playing career, the offer may be an offer to record a video where the athlete would discuss his feelings and health. The offer may specify a price, format (e.g., encoding type (e.g., MP4, AVI, MOV, etc.), number of pixels in the height and width dimensions, etc.) and/or length.

Optionally, the system includes a bidding engine enabling potential content consumers to bid on the content (or the offer to record the content). The auction winner's rights may include exclusive access to the content, time-limited exclusive access, distribution-limited access, and non-exclusive rights.

If the offer is an offer to record content, an accepting media partner may specify a length, format, and content details that the media partner expects or requires with respect to the content to be recorded by the athlete. Optionally, the athlete may refuse the media partner's acceptance if the requirements set forth by the media partner are not acceptable to the athlete.

The system operator may, in certain embodiments, retain or be paid a percentage of a fee paid by requester or a sponsor, or a flat fee, for the use of a given item of content or a certain number of content items. The system operator may, in certain embodiments, be paid a portion of advertising and/or sponsorship fees associated with the use of an item of content. The content contributors may optionally specify charities or other non-profits to which some or all of the compensation due to the contributor may be contributed.

Optionally, the system operator may submit requests to potential responders on its own behalf, where the system operator may act as a publisher. For example, the system operator may submit a question to multiple athletes regarding an event (e.g., "identify and discuss the most satisfying pitch you have thrown") and assemble content from some or all the responses into a single item of content. The system operator may then license the assembled content (and/or the individual responses) to a third party and/or post the assembled content (and/or the individual responses) on a site, such as a publically accessible website.

Certain embodiments may track how many items of content a given user has submitted and/or how many items of submitted content have been accepted. Such contributing users may be ranked based on such tracked information, and the rankings may be published via social media (e.g., social network, blog, etc.), or otherwise. This may incentivize users to increase their content contributions and the quality of their content contributions.

Referring to FIG. 1, an example process is illustrated. At state 102, profile information for potential contributors is received and stored in a database as similarly described above. At state 104, account information for potential content publishers is received and stored (e.g., publisher name, content information, payment related information (e.g., a payment source identifier, such as a credit card or deposit account), etc.). At state 106, a request for content from a content publisher is received at a system. As discussed above, the request may include criteria describing responders and/or may specify particular selected responders that should be targeted with the request (e.g., an athlete that had achieved a specified milestone), and the type of content desired (e.g., a 2 minute video wherein the athlete describes his feels at achieving the milestone). The request may specify a deadline for providing a response, the amount of compensation that will be paid, a desired period of exclusivity, the type of use to which the content will be put, and/or other information. The request may include content, such as a video file or image, or a link to a video file or image, that responders are requested to provide comments on (e.g., in the form of video comments) in their submission. For example, the video file may include a segment from a sporting event (e.g., a knockout in a boxing match) or a television show (e.g., a statement from a guest on a talk show) that the responders are being requested to provide comments on. For example, the system operator may create a channel on a third party site that hosts video content.

By way of example, a media request user interface may be provided to a potential content publisher. The user interface may ask to identify a field of interest (e.g., sports, entertainment, etc.). If, for example, the content publisher selects sports, a menu of sports/sports leagues may be presented to the content publisher from which the content publisher may select. For example, the menu may list MLB, NBA, NFL, NHL, and/or other sports leagues. Based at least in part on the league/sports selection, the system may optionally select a sport attributes user interface to display to the publisher. For example, the sport attributes user interface may list teams corresponding to the selected league, player positions corresponding to the league sport (e.g., baseball player positions, football player positions, etc.), non-player professions (e.g., agent, coach, scout, medical, etc.) from which the publisher may select. The publisher's selections may then be received and stored by the system as request criteria. Optionally, the publisher may also have previously defined a "favorites" list of experts. A user interface may optionally be provided to the publisher listing the favorites that meet some or all of the other request criteria specified by the publisher, where the publisher can select one or more of the favorites to whom the request should be sent to.

At state 108, the system utilizes at least a portion of the requester specified criteria to identify profiles of potential contributors in the database that sufficiently match and/or receives the selection of particular contributors by the requester to access their profiles. At state 110, the content request is transmitted to the identified matching potential contributors and/or the requester-selected contributors. At state 112, responses are received by the system from one or more potential contributors. The content may optionally be stored with tags corresponding to some or all of the request criteria (e.g., sport, position, player, team, etc.), time stamped (e.g., with date/time of receipt), and assigned a state of "pending". At state 114, the publisher is provided access to the response(s), including the content. The content may be watermarked before providing the publisher access to the content. At state 116, the system receives a selection and acceptance of at least one response from the publisher. At state 118, the system optionally transmits a notification acceptance to the corresponding responder and optionally assigns the content a status of "complete". At state 120, the responder whose content was accepted is optionally compensated and the publisher is charged for the content. Optionally, the system operator also receives compensation as similarly described above. The publisher may then be provided the content without the watermark (e.g., as a download file, a link, via streaming media, or otherwise). At state 122, a determination is optionally made as to whether the period of exclusivity has ended. If the period of exclusivity has ended, optionally the content may be published via a social media platform and/or offered to other publishers for publication.

Figure 8:
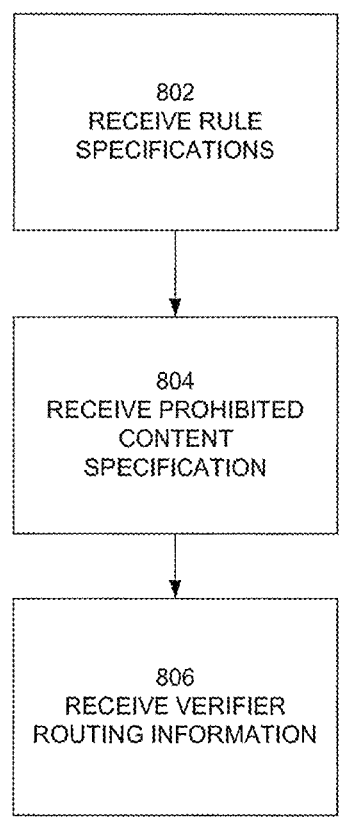
FIGS. 8-12 illustrate additional example processes.

FIG. 8 illustrates an example process for setting up rules for verifying that content submitted by a user meets one or more rules defined by a requester or by a third party whose rules or guidelines the content needs to satisfy in order for the content to be published/broadcast. The process may be performed using the content distribution facilitation system described elsewhere herein (which optionally includes verification system) or by a separate verification system. At block 802, one or more rules specified by a requester and/or by an authorized third party are received at the system. The rules may be provided via an electronic form presented on a device, transmitted over a network to the verification system, and stored in a rules database in association with an account identifier of the requester and/or the authorized third party. By way of example, a given rule may specify that if certain types of content are included in content submitted by a user, the user is to be notified and the content is not to be provided to the requester. At block 804, prohibited content and/or permitted content specifications are received from the requester and/or authorized third party. For example, the prohibited or permitted content may include specified subjects, specified phrases (which may be individual words or strings of words). The prohibited content and/or permitted content specifications may be provided via an electronic form presented on a device, transmitted over a network to the verification system, and may be stored in a subject and phrases database in association with an account identifier of the requester and/or the authorized third party. By way of further example, phrases may be received via text entries and/or audio files that include spoken versions of the phrases.

At block 806, verification routing information is specified. For example, the routing information may specify a verification operator that may review the content or double check the results of an automatic verification process as described herein.

Figure 9:
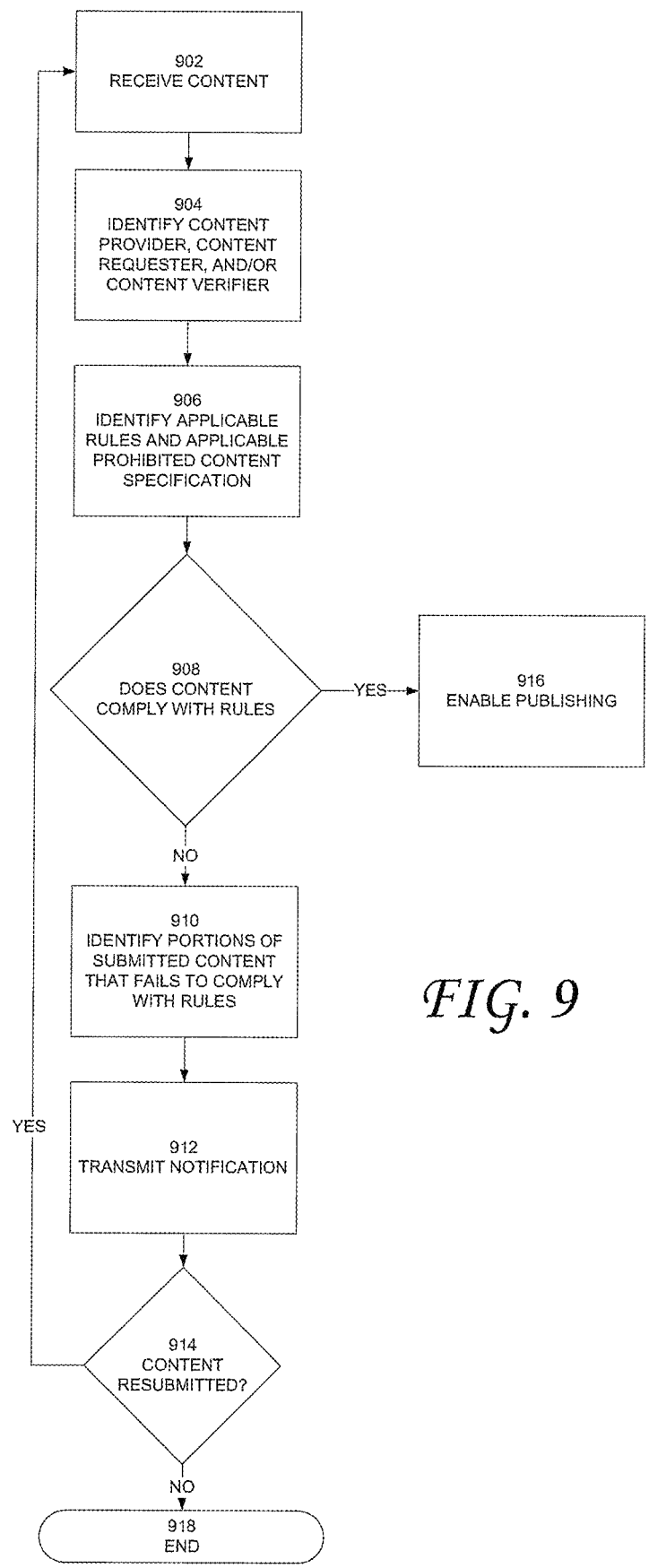

FIG. 9 illustrates an example verification process. The process may be performed using the content distribution facilitation system described elsewhere herein or by a separate verification system. At block 902, content is received from a user device (e.g., from a camera equipped mobile device, such as a phone, from a camera equipped television, from a laptop or desktop computer, from an audio recording device, from a game console, etc.) at the system.

The content may be received indirectly, such as from a cloud-based storage system. Thus, for example, the user device may be equipped with an application configured to upload content to the cloud-based system via an API. The content distribution facilitation system or the content requester system may then download the content from the cloud-based storage system via an API using an application hosted on the content distribution facilitation system or the content requester system. This technique may reduce peak network bandwidth loading and/or local storage requirements. Optionally instead, the content may be received and stored by the content distribution facilitation system and the content distribution facilitation system may provide the content requester with a user interface enabling the content requester to download the content to a content requester system, or may instruct the system to upload the content to a cloud-based storage system in association with an account of the content requester. The content requester may then access the content from the cloud-based system at a later time using a content requester system.

At block 904, the system identifies the user, the content requester, the content verifier (responsible for performing or for double checking the verification), and/or the channel(s) of publication (e.g., print publication, broadcast television, broadcast radio, internet media, cable television, cable radio, satellite radio, etc.). For example, the user may be identified from information transmitted in conjunction with the content, such as the user's email address, metadata transmitted by a dedicated application used to transmit the content, information provided by the user or the user browser (e.g., if the content is uploaded via a browser), or otherwise. The content requester and/or channel(s) of publication may be identified from metadata provided by the system to a dedicated application (e.g., wherein the dedicated application used to transmit the content to the system, along with the metadata (previously received from the system) to the system), from information provided by the user or the user browser (e.g., if the content is uploaded via a browser), or otherwise.

At block 906, the system uses the identification of the user, the content requester, the content verifier, and/or the channels of publication to identify and locate the corresponding applicable rules and prohibited and/or permitted content specifications (e.g., from a data store, such as a rules, subject and phrases database). At block 908, a determination is made as to whether the content complies with the corresponding rules. For example, if the user submitting content is an athlete on a professional sports team, and the requester is a sports network, and the publication channel is cable television, the rules may specify that the content is not to be accepted if it includes subject matter identified as prohibited in the prohibited content specifications. If the content does comply with the rules, then at block 916, the system enables the content requester to publish the content.

If, at block 908, a determination is made that the content does not comply with one or more rules, then the process proceeds to block 910, and a report is generated that identifies the portion(s) of the content that do not comply with respective rules. The report may include content text, text transcribed from an audio track included in the content, images from the content, audio content, video content, bookmarks or time stamps for audio content and/or video content, and/or other information that identifies content that does not comply with the rules. The report may optionally include the entire content, with the non-complying portions identified (e.g., via color, highlighting identifiers in a video or audio scrubber for video or audio content, etc.). The rules which a given portion of content violates may be identified (e.g., via a textual statement of the rule, via a corresponding icon, via a rule alphanumeric identifier, or otherwise). At block 912, a non-compliance notification and/or a copy or a link to the report is provided to one or more recipients (e.g., as specified by the rules). For example, the non-compliance notification and/or access to the report may be provided to the user that submitted the content, to the content requester, and/or to the authorized third party (if such exists).

If the notification and access to the report is provided to the user that submitted the content, then optionally the user may be offered the opportunity of resubmitting the (corrected) content (or new content) in order to attempt to comply with the rules. At block 914, the process determines whether the user resubmitted the content. If the user does resubmit the content, then the content may go through the verification process. Otherwise, the process may end.

Figure 2:
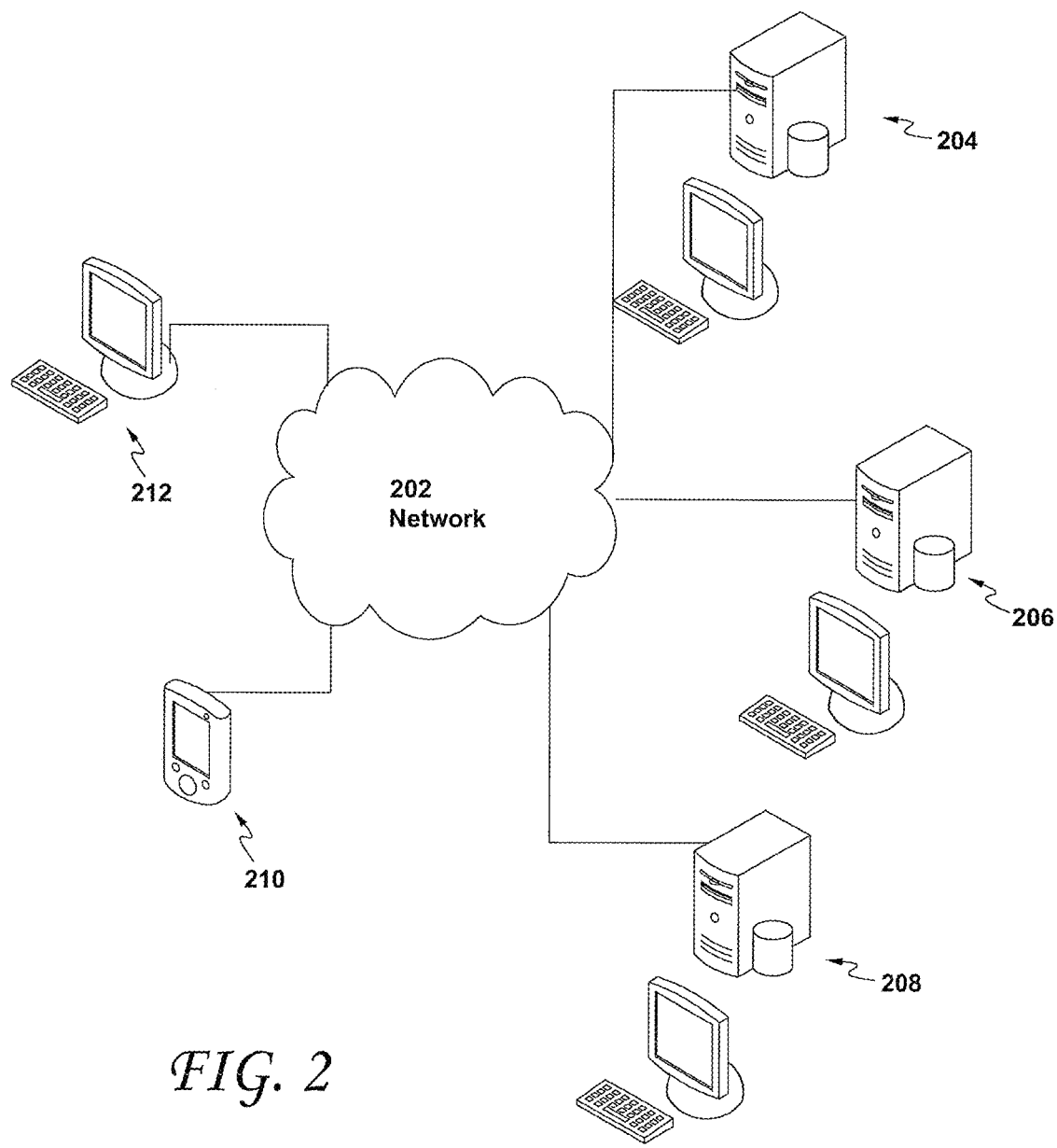
FIG. 2 illustrates an example environment.

Referring to FIG. 2, an example environment and architecture is illustrated. A content distribution facilitation system 204 includes a data store storing profiles of potential content contributors as similarly described above. The content distribution facilitation system 204 may be configured to perform some or all of the functions and processes described above, such as those discussed with respect to FIGS. 1, and 8-10. The content distribution facilitation system 204 may be coupled over a wired and/or wireless network to one or more publisher systems 206 and 208, from which content requests may be received, and to which content responses from content contributors may be provided. The content distribution facilitation system 204 may include or may access a search engine. The search engine may be configured to identify potential content contributions based on their profiles, geographical location, presence at an event, and/or other criteria. The content distribution facilitation system 204 may include or may access a speech recognition engine which may optionally be configured to utilize natural language processing. The speech recognition engine may utilize natural language processing. The content distribution facilitation system 204 may include a content queue for content that is to be reviewed, as similarly discussed elsewhere herein. A content contributor system 210 may be in the form of a mobile phone with a camera and a browser and/or application installed to access the user interfaces discussed above, to record requested content, and to provide the recorded content to the content distribution facilitation system 204. The recorded content may then be published by a publisher system, and viewed by a user, such as a fan, via a user terminal 212, which may be a computer, television, or other terminal type.

Referring now to FIG. 3, an example interface is illustrated enabling a user to register as a potential responder. The user interface includes fields configured to receive some or all of the following: the user's name, email address, mobile phone number, microblog user name (for Twitter® in this example), a preference indication for how the user wants to be contacted (e.g., email, SMS, phone, etc.), the user's profession/expertise (e.g., sports, entertainment, etc.), and location (e.g., where the user can enter high-level location information, such as North America, South America, Europe, etc.). The information received by the user may then be stored by the system. As described elsewhere herein, the location and profession information may be used by the system to determine which users should be sent a given request for content.

Figure 4:
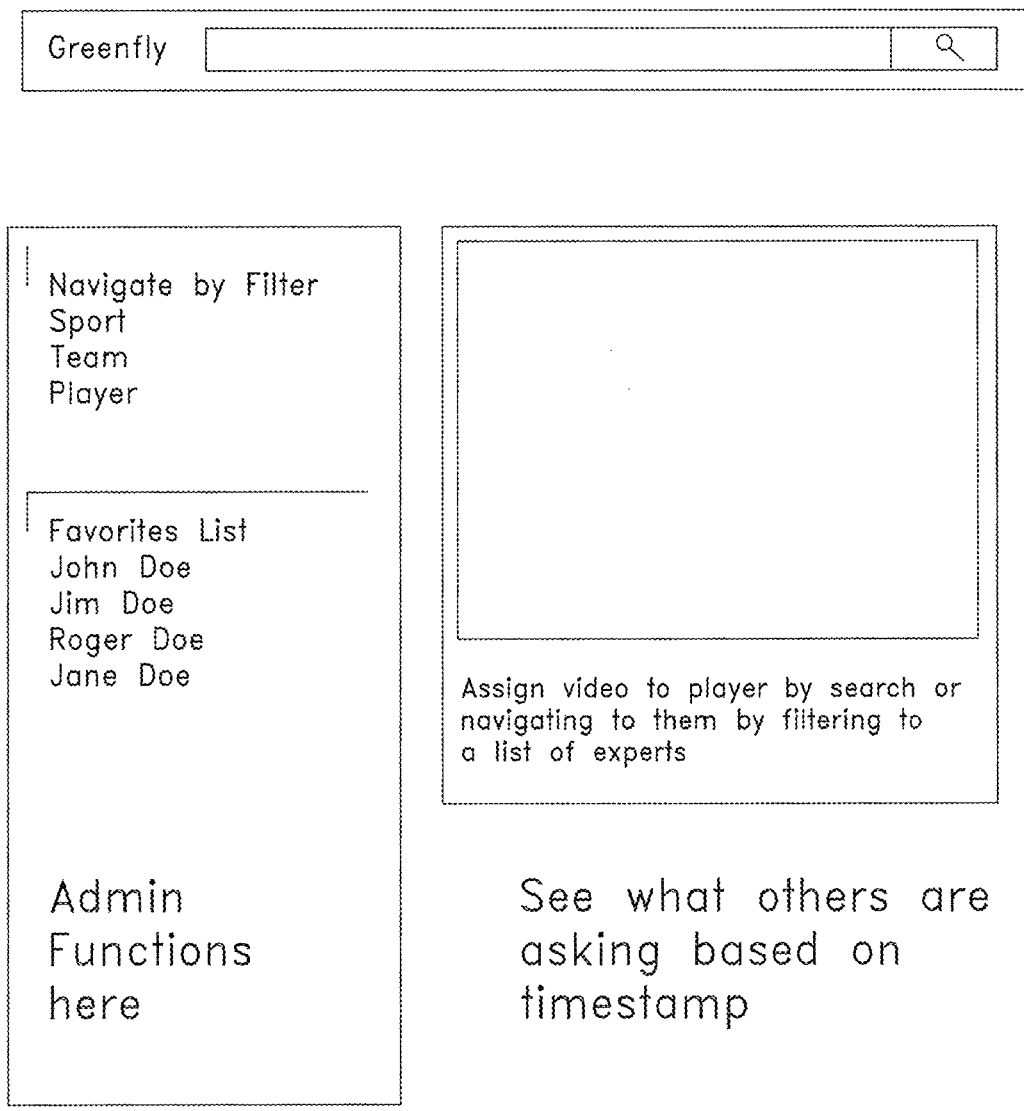

FIG. 4 illustrates an example interface enabling the user to provide more information regarding the user's profession/expertise. In this example, the user indicated via the user interface of FIG. 3, that the user's profession is sports, and so the system selected a sports user interface to be presented to the user to collect additional related information. The example user interface includes an area of expertise field via which the user can indicate whether the user is an athlete or a non-player (e.g., where the user may be a sports agent or scout), location fields to receive more detailed location information (e.g., country, state/region, city, etc.), and profession details (e.g., sport type and team). Optionally, the user interface may provide a menu (e.g., a drop down menu) that presents certain sports and/or sports leagues from which the user may select (e.g., Major League Baseball (MLB), National Basketball Association (NBA), National Football League (NFL), National Hockey League (NHL), etc.). In this example, the system may select and provide a menu of sports team choices via which the user can select a team, where the menu of choices is based on the user's sport selection. For example, if the user selects MLB, the sports menu may present a list of MLB teams from which to select. Optionally, the user interface may enable the user to select several teams that the user has been associated with. The information received by the user may then be stored by the system.

If the user indicated via the user interface illustrated in FIG. 3 that the user is an non-player (but is involved in the sports field), then a user interface may be provided asking the user to select a sport, as similarly described above with respect to FIG. 4. For example a menu may be provided that presents certain sports and/or sports leagues from which the user may select. A user interface may be provided asking the user to identify a non-player profession (e.g., by selected from a dropdown menu from a set of professions, such as official, agent, medical, coach, scout, management, family, journalist, celebrity fan (e.g., a movie star), analyst, family, grounds crew, owner, referee/umpire, scout, etc.), and optionally in what years for one or more of the teams selected via the user interface illustrated in FIG. 3.

If the user indicated via the user interface of FIG. 3, that the user's profession is entertainment, the system may select an entertainment user interface to be presented to the user to collect additional information. For example, a menu may be presented asking the user to indicate what type of entertainer the user is (e.g., actor, musician, comedian, singer, director, producer, agent, etc.). The information received by the user may then be stored by the system.

FIG. 5A illustrates an example content request submittal user interface. The example user interface may include fields via which the user can specify a sport, team, and/or player as part of the request criteria, may include a list of experts previously designated as favorites or preferred by the user, a field for receiving a request (e.g., a request for content related to a specified subject matter), and/or a list of content (e.g., video content) provided in response to a previous request. The user may select an item of content to view, and may accept or reject the content. Optionally, a list of requests submitted by other users may be presented, optionally with timestamps, enabling the user to determine what subjects may be of high interest for a given time period.

FIG. 5B illustrates another example content request creation user interface. The illustrated example user interface may include one or more of the following: a field via which the user can specify the content request, instructions for recording the video, a field via which the user can specify the request type (e.g., a timed request, a request without a deadline, etc.), a field via which the user can specify the deadline to respond to the request (e.g., within 24 hours of the request, by Mar. 1, 2016, or the like), a field via which the user can attach a link or video to the request (e.g., a video or link to content that the content provider is to comment on), a desired content orientation (e.g., landscape or portrait), an indication as to whether the content may be uploaded by the content provider from a camera roll or provided via a silo, etc.

FIG. 6A illustrates an example user interface as it may be displayed on a device (e.g., a mobile telecommunications device) of a potential responder, optionally via a dedicated application as similarly discussed elsewhere herein, via a web page, or otherwise. In this example, a content request inbox is provided which visually lists content requests transmitted to the potential responder device by a remote system, such as that discussed above. In this example, a requester field is provided via which the requester is identified, optionally by name and/or icon (e.g., a trademark of the requester). Optionally, all or a portion of the content request is displayed is a request subject field. The date and/or time the request is received and/or the date and/or the time set by the requester for the request response may optionally be displayed in date field. Optionally, the status of the request may be displayed. For example, the status may indicate that the potential responder has submitted a response, and an indication as to whether the response was accepted (e.g., via a checkmark or other indicator), is pending (not accepted or rejected) e.g., via a circular arrow or other indicator), or has been rejected (e.g., via an "X" or other indicator). The status may optionally be tracked and transmitted to the device by the remote system. Optionally, a status indication may be provided indicating that the deadline for submitting a response has passed and/or that a response from another responder has already been accepted by the requester for a given content request. Optionally, the application or the system filters out requests where the deadline for submitting a response has passed so that such requests are no longer displayed in the content request inbox. The list of requests may be ordered automatically or in response to a potential responder instruction (e.g., provided by activating a sort control) by the date/time request was received, by date/time the request response is due, by requester name, or by subject. An indicator may be provided to indicate whether or not the potential responder has opened a given request. For example, bolding, underlining, and icon, or lack thereof may be used to indicate that a request has or has not been viewed.

Figure 6B:

FIG. 6B illustrates another example user interface as it may be displayed on a device (e.g., a mobile telecommunications device, such as a phone) of a potential responder, optionally via a dedicated application as similarly discussed elsewhere herein, via a web page, or otherwise. In this example, a content request inbox is provided which visually lists content requests transmitted to the potential responder device by a remote system, such as that discussed above. In this example, a requester for a given request is identified, optionally by name and/or icon (e.g., a trademark of the requester). The desired length of the requested content is also specified (e.g., 30 seconds, 2 minutes, etc.). Optionally, all or a portion of a given content request is displayed in association with the content requester identifier. Optionally, the number of content request answers received may also be displayed. A chat user interface is optionally provided that enables the potential responder to textually chat with the content requester.

Figure 7:

FIG. 7 illustrates an example user interface that may be displayed when the potential responder selects an item from the request inbox, such as that illustrated in FIG. 6A. The user interface may display the full content request text and optionally other content request criteria (e.g., length, type, format, and/or other criteria discussed herein). The user interface may also provide compensation information (e.g., an accepted response is worth 50 points, $50 dollars, or other type or amount of compensation). A record control may be provided, which when activated by the responder may initiate recording (e.g., voice and/or video) by the responder's device. The user interface may also access and present instructions specified by the requester (e.g., "Hold the phone level and speak clearly", "Look serious while speaking", "look amused while speaking", etc.). The user interface may optionally also provide status information with respect to the content request, as similarly discussed above with respect to FIG. 6.

Optionally, when the responder activates the record button to initiate a video recording, the request question and/or text that the request instructs the responder to recite, is positioned, sized, and/or segmented by the application to be positioned near the responder device's camera lens. This will cause the responder's eyes to be looking at the lens region when reading questions and/or text, resulting in a better video. Optionally, the application will only display one or two lines of text at a time (the question text and/or the text the responder is asked to recite) adjacent to the lens (e.g., just below the lens), to better ensure that the responder's eyes are continuously directed to the camera lens area during the video recording. If the text is too long to display on one line (or two lines) adjacent to the lens, the application may advance the text by scrolling the next portion of the text onto the device's display and scrolling off the previous portion of the text, to ensure the next displayed text is also displayed adjacent to the lens. The scrolling or other technique for changing the text may be performed in response to detecting a responder text advance command, automatically based on a desired pace of reading, or otherwise. Optionally, the responder may specify whether scrolling is to be enabled or disabled.

Optionally, a marketplace of content providers may be generated and maintained by the system. Users, such as potential contributors, may provide an indication (e.g., via a webpage or dedicated application) that they are currently available to provide content, that they will be available at one or more specified future time periods, how long they will be available, their current activity (e.g., watching a particular sporting event, show, or network), their planned activity at one or more future time periods, etc. Such users may be identified by the system in response to a query from a requester (e.g., a publisher or other content requester).

A publisher/content requester may view such information and select one or more of the users. The publisher/content requester may generate a request for content and instruct the system to transmit the request to the selected users (e.g., those watching a particular sporting event, show, or network associated with the publisher/content requester). The offer may specify the type of content requested, as similarly discussed elsewhere herein. For example, the publisher/content requester may create a request/offer to ten selected users to be a correspondent for particular game. The offer may include an endorsement arrangement. For example, the offer may specify that an accepting user will be paid a specified amount if the submits content of the user talking about a specific product in the context of discussing a particular game event, and if the user's content is accepted by the publisher/content requester. Upon detecting that a given user's content was accepted (e.g., by detecting that the publisher/content requester has activated an accept control presented via a webpage or a dedicated application), the system may process the payment to the user whose content was accepted on behalf of the publisher/content requester. The payment may be in the form of an electronic payment transfer from an account of the publisher/content requester to an account of the user or may be in the form of a physical payment instrument (e.g., a check, a gift card, a funded debit card, etc.).

Figure 10:
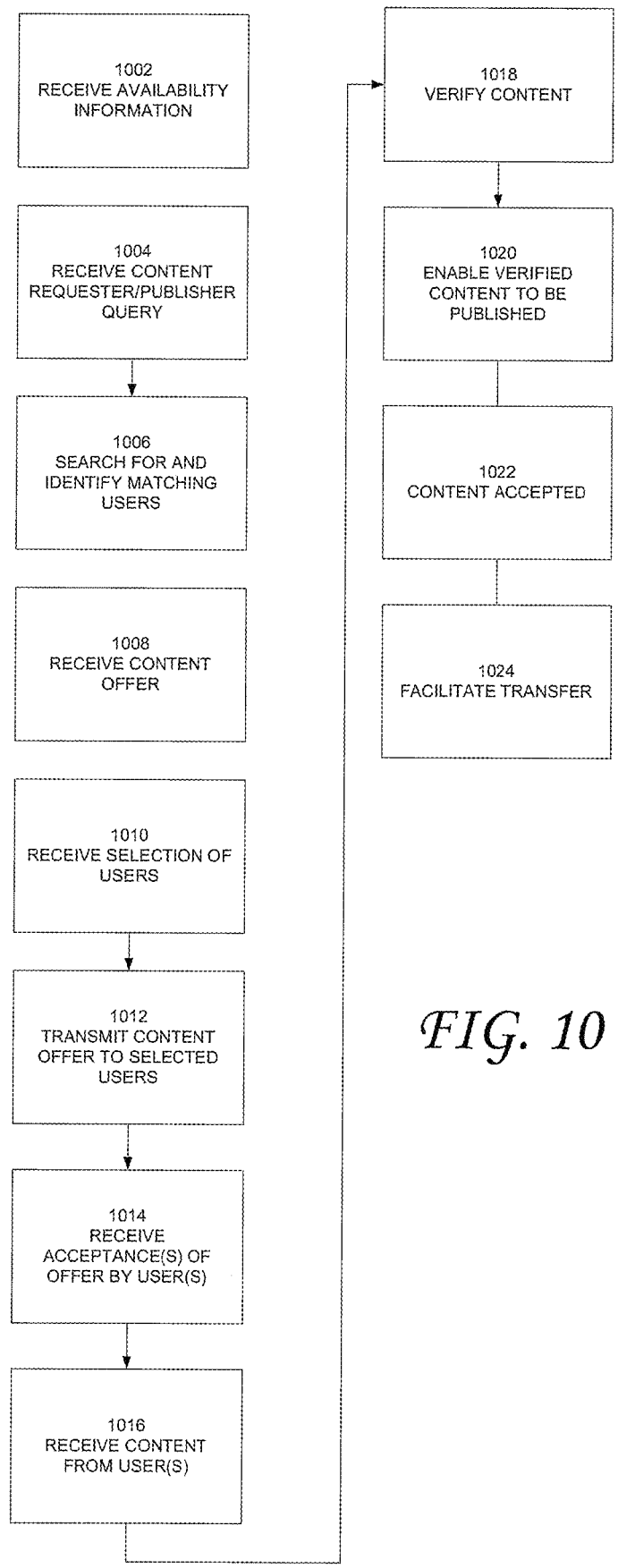

FIG. 10 illustrates an example process of managing a content request marketplace. At block 1002, a system, such as the example content distribution facilitation system discussed elsewhere herein, may receive availability information from one or more users. The availability information may specify that they are currently available to provide content of a specified type (e.g., text, audio, and/or video), that they will be available at one or more specified future time periods, how long they will be available, their current activity (e.g., watching a particular sporting event, show, or network), their current or future location, their planned activity at one or more future time periods, the type of recording/transmission device that they have (e.g., mobile phone, mobile tablet, brand name of device, model number of device, etc.) etc.

At block 1004, a query is received from a content requester (which may be a content publisher), specifying criteria for potential content submitters. For example, the criteria may specify some or all of the following: the desired profession, expertise, current availability to provide content of a specified type (e.g., text, audio, and/or video), future availability at one or more specified future time periods, how long they will be available, their current activity (e.g., watching a particular sporting event, show, or network), their current or future location, their planned activity at one or more future time periods, the type of desired recording/transmission device (e.g., mobile phone, mobile tablet, brand name of device, model number of device, etc.), etc.

At block 1006, a search engine may be used to search for and identify potential content contributors that meet the specified criteria or that match a name or other identification information specified by (e.g., selected by) the requester. A list of matching potential content submitters may be generated and provided to the content requester. At block 1008, offer details are received from the content requester. For example, the offer details may specify the content that the potential submitter is to submit (e.g., how they feel regarding a win by a home team, comments regarding a specific show or event, etc.). The requester may also specify a time period is which the potential content contributor is to be available, a response deadline, a response length (e.g., in terms of time length or number of words), the media type for the response (e.g., video (including an audio track), static images (e.g., photographs), audio only track, text, etc.), and/or other response criteria via a user interface. The requester may also specify compensation. The requester may optionally also specify that it will only accept a specified number of content submissions (e.g., the first content submission, the first five content submissions, three content submissions (which may or may not be the first three content submissions, etc.).

At block 1010, a selection of potential content contributors (e.g., selected from the list generated at block 1006) is received from the content requester. At block 1012, the offer is transmitted to the selected potential content contributors. At block 1014, acceptance of the offer may be received from one or more potential content submitters. For example, a potential content submitter may activate an accept offer control to indicate acceptance (or in some instances, submission of the requested content may act as an acceptance of the offer). At block 1016, content or a link to content is received from one or more potential content submitters that accepted the offer. For example, the content may be recorded and transmitted over a wireless network by a mobile device of the content submitter and received and stored at the system.

At block 1018, the content is verified (e.g., as similarly discussed above). At block 1020, if the content is successfully verified, the content is enabled to be published (e.g., access to the content is provided to the content requester or an indication that the verification was successful is transmitted to the content requester). If the content is accepted by the content requester at block 1022, then at block 1024 the system optionally causes the compensation set forth in the offer to be transferred from the content requester to the content provider.

Figure 11:
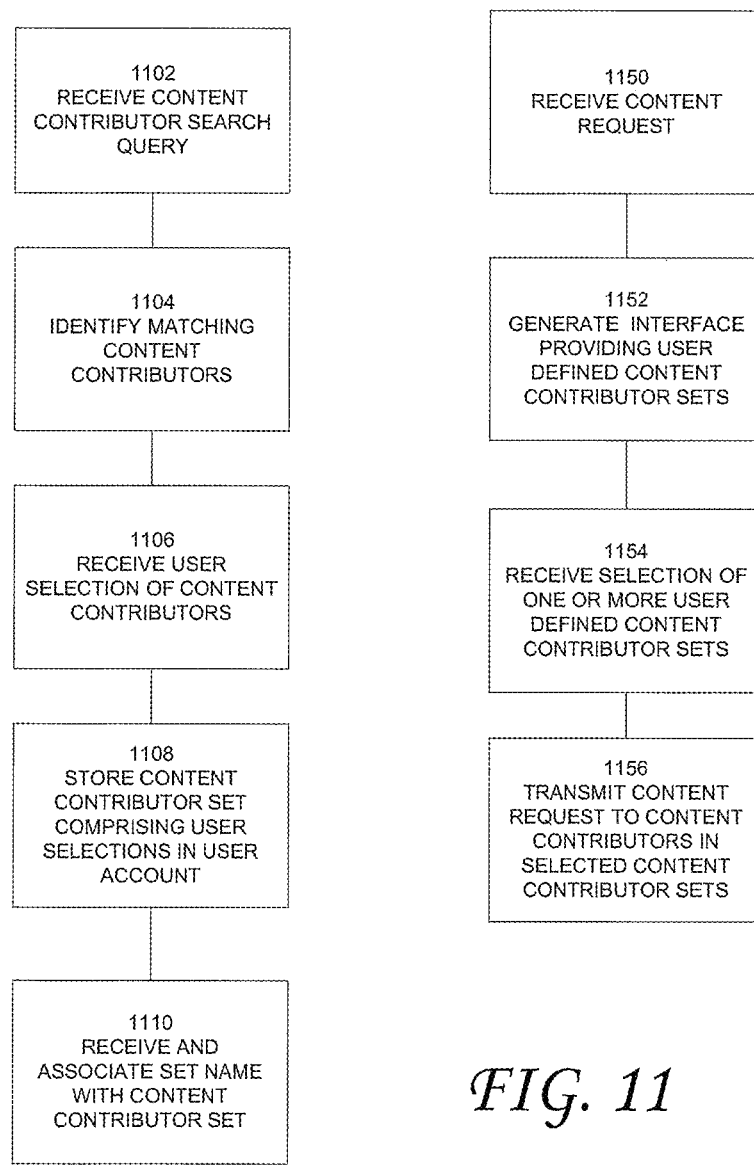

FIG. 11 illustrates an example process of defining content contributor sets and an example process of utilizing the defined content contributor sets to issue content requests. At block 1102, a content contributor search query is received via a search query interface from a user (e.g., a publisher). For example, the request may include text including desired content contributor characteristics (e.g., profession, team, player position, player statistics, awards won, location, gender, age, profession, expertise, etc.). At block 1104, a search engine searches a database of content contributor to determine which stored content contributor profiles match the search criteria. For example, as similarly discussed elsewhere herein, the database may include profiles of athletes, and may include various statistics, events, and achievements from some or all of the games they have played in (including those that result from an aggregation of achievements over multiple games, such as how many games the player has played in a row, how may games in a row the player has hit a home run, how many points the player scored in a game, etc.). By way of further example, the database may include profiles of personalities or celebrities identifying shows or movies they have appeared in, awards or other recognition they have received, their ages, gender, past significant others, where they live, what teams they are fans of, etc. The search engine returns the matching content contributors in search results presented to the user. Optionally, the search results will be in ranked order, with the closet match rated first, the second closet match rated second, etc.

At block 1106, the process detects user selections of one or more content contributors included in the search results. The selection may be performed by the user clicking on one or more content contributors included in the search results or otherwise. At block 1108, the process detects that the user has activated a control indicating that a set is to be created that includes the selected content contributors (where the set may include a single content contributor). The process then generates a corresponding file that defines the set and the process stores the content contributor set file in association with the user's account (which may be an account of the company employing the user). It is understood that the stored content contributor set file may, but need not include the actual names of the content contributors or pointers or other identifiers associated with the selected content contributors. At block 1110, the process receives an identifier from the user for the content contributor and stores the identifier in association with the content contributor set. For example, the identifier may be a text name that describes the content contributor set in human understandable language.

An example process for processing a content request will now be described. At block 1150, a content request is received from a user (e.g., a publisher). For example, the content request may include content criteria provided via a content specification interface, including content subject matter, a content length, a content form (e.g., video and audio), when the content is needed by, and/or other criteria. At block 1152, a user interface is generated that presents a user with a listing of content contributor sets that the user has previously predefined and/or that have been defined by another user where appropriate permissions have been granted to the current user (e.g. where both users work for the same publisher). For example, the content contributor sets listing may be presented at least partly in response to the user logging in to the system and the user selecting an appropriate control. In addition or instead, a search interface may be provided enabling a user to search for content contributor sets, previously defined by the user or by another user where appropriate permissions have been granted, by entering a content contributor sets query. The process will then search for content contributor sets that have identifiers and/or metadata matching the query (e.g., matching one or more words of the query or a variation of a word in the query).

At block 1154, the process detects a user selection of one or more content contributor sets. At block 1156, the process transmits the content request to content contributors included in the selected content contributor sets. The content provided in response to the request may then be received from one or more content contributors and processed and/or distributed as described elsewhere herein or otherwise. The content may be received indirectly, such as from a cloud-based storage system. Thus, for example, the user device may be equipped with an application configured to upload content to the cloud-based system via an API. The content distribution facilitation system or the content requester system may then download the content from the cloud-based storage system via an API using an application hosted on the content distribution facilitation system or the content requester system. This technique may reduce peak network bandwidth loading and/or local storage requirements. The process may automatically, or in response to activation of social share control, prompt the content requester to transmit a request to the content contributor to post the content, or a link to the content on one or more specified social networking sites (which may include one or more microblogging sites). The prompt may be provided in response to the content requester downloading or otherwise accessing the content. Optionally, the prompt may be provide in response to determining that the content requester has published the content (e.g., on the content requester's website, television program, or other content distribution platform). The determination may be made based on a publication indication provided by the content requester.

Figure 12:
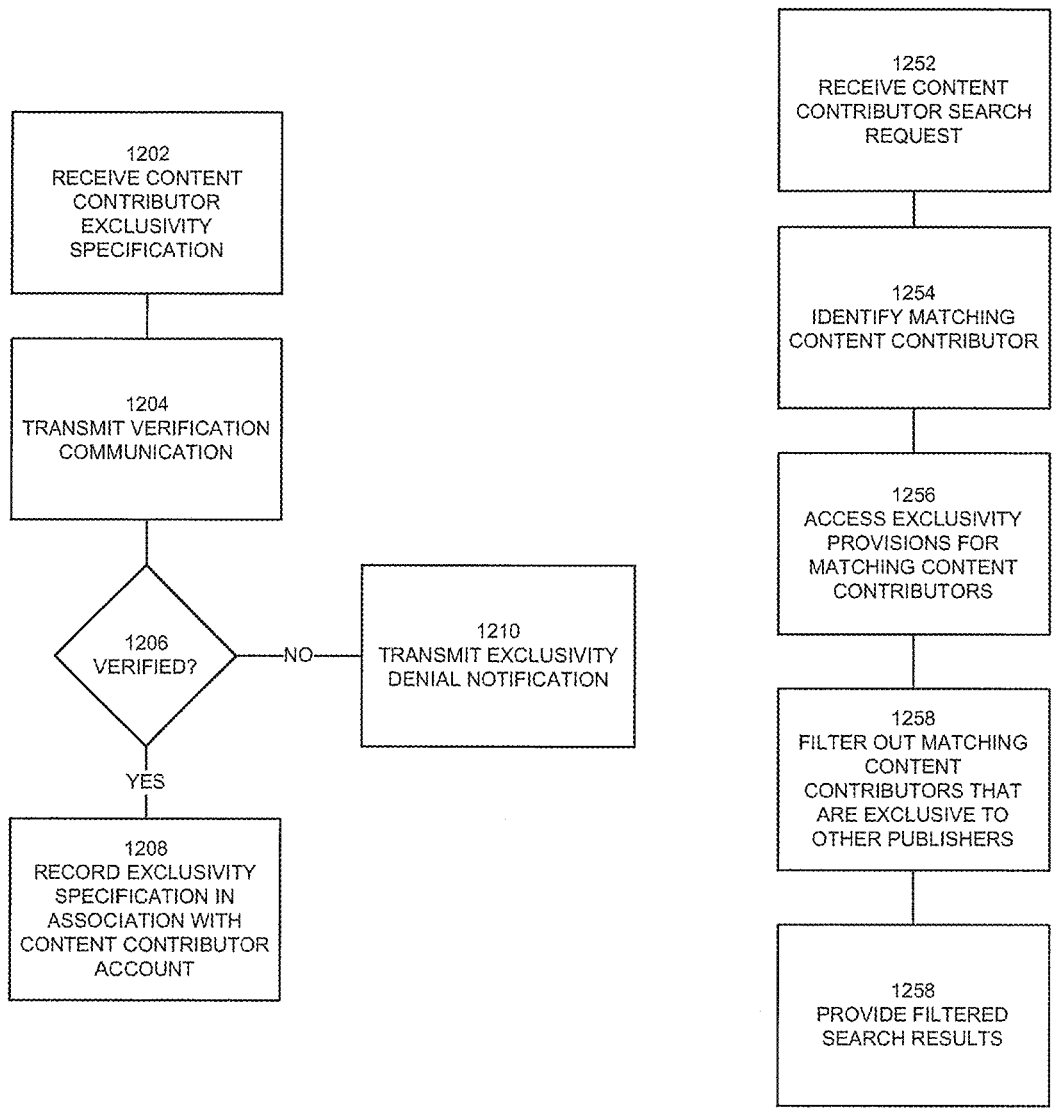

FIG. 12 illustrates an example process of defining exclusivity for a content contributor and an example of filtering search results based on content contributor exclusivity. At block 1202 a content contributor exclusivity specification is received that identifies one or more content contributors that have profiles stored on the system or that will have profiles created and stored on the system. For example, the content contributor exclusivity specification may be received from a publisher or from the content contributor. The content contributor exclusivity specification may specify one or more forms of exclusivity with respect to an identified publisher. For example, the content contributor exclusivity specification may specify one or more of the following:

an exclusivity time period (e.g., a time length from the day the specification was provided, a start date and end date, a sports season, a television season, etc.);

an event (e.g., a sports tournament; a specific game; an awards ceremony; a premiere of a movie, play, or television show; the release of a music album, the release of a video game, etc.);

a subject matter (e.g., sports, television, movies, music, national news, international news, medicine, law, celebrities, etc.).

At block 1204, optionally a verification request is transmitted to verify that the exclusivity specification is correct. For example, if the exclusivity specification was received from the publisher, the verification request may be transmitted to the content contributor (directly or via a representative, such as an agent). By way of further example, if the exclusivity specification was received from the content contributor, the verification request may be transmitted to the publisher (directly or via a representative). The verification request may include the content contributor exclusivity specification. At block 1206, the process determines whether the content contributor exclusivity specification was verified by the recipient of the content contributor exclusivity specification verification request. For example, the request may include a verification control and a decline verification control. The request recipient may then activate one of the controls, and the activation is detected and recorded by the process. Optionally, if the recipient does not respond or does not respond within a specified period of time, the process treats the lack of response as if the recipient declined verification.

Optionally, an exclusivity analysis engine may examine the exclusivity specification to determine whether it conflicts with a preexisting in-force exclusivity specification of another content requester for the content contributor. For example, the process may compare a preexisting in-force exclusivity specification from a first content requester with the new exclusivity specification to determine if there is an impermissible overlap in subject areas, events, and/or time period.

If the recipient verified the content contributor exclusivity specification and/or the exclusivity analysis engine determined there was no conflict with an existing exclusivity specification, at block 1208, the process records the content contributor exclusivity specification in association with the content contributor's account/profile. If the recipient does not verify or declines to verify the content contributor exclusivity specification, and/or if there is a conflict with a preexisting content specification, at block 1210, the process generates a message and transmits it to the exclusivity specification provider indicating the verification failure.

An example search process that analyzes content contributor profiles with respect to exclusivity specifications will now be described. The process may utilize the search engine discussed elsewhere herein. At block 1252 a content contributor search query is received. For example, as similarly discussed elsewhere herein, the content contributor search query may be received via a search query interface from a first user (e.g., a publisher). For example, the request may include text including desired content contributor characteristics (e.g., profession, team, player position, player statistics, awards won, location, gender, age, profession, expertise, etc.). In addition, a content request may be received. The content request may include content criteria provided via a content specification interface, including content subject matter, a content length, a content form (e.g., video and audio), when the content is needed by, and/or other criteria.

At block 1254, the process, optionally utilizing the search engine described herein, searches a database of content contributors to determine which stored content contributor profiles match the search criteria. For example, as similarly discussed elsewhere herein, the database may include profiles of athletes that may include various statistics, events, and achievements from some or all of the games they have played in. By way of further example, the database may include profiles of personalities or celebrities identifying shows or movies they have appeared in, awards or other recognition they have received, their ages, gender, past significant others, etc.

At block 1256, the process accesses from memory exclusivity provisions (e.g., the content contributor exclusivity specification, including an identifier of the publisher associated with a given content contributor exclusivity specification) for the matching content contributors. At block 1258, the process analyzes the exclusivity provisions to identify those matching content contributors that are prohibited from providing requested content to the first user (e.g., the publisher). For example, the process may determine if a given content contributor exclusivity specification for a given matching content contributor is associated with the first user or with a different user (e.g., a different publisher). If a content contributor exclusivity specification for a given content contributor is associated with the first user, then the process may determine that the first user may request content from the given content contributor. If a content contributor exclusivity specification for a given content contributor is not associated with the first user (e.g., it is instead associated with another publisher), then the process may determine that the content contributor exclusivity specification prohibits the content contributor from providing content to the first user.

Optionally, if a content contributor exclusivity specification for a given content contributor is not associated with the first user, the process further analyzes the content contributor exclusivity specification to determine if the specific exclusivity provisions of the content contributor exclusivity specification prohibit the content contributor from providing the requested content to the first user. For example, the process may determine if the content contributor exclusivity specification indicates that the current date or needed by date for the requested content is within an exclusivity date period specified by the content contributor exclusivity specification. By way of further example, the process may determine if the content request subject matter is covered by a subject matter exclusivity provision of the content contributor exclusivity specification. By way of yet further example, the process may determine if an event corresponding to the content request is covered by an event exclusivity provision of the content contributor exclusivity specification. If the analysis indicates that the content request would violate one or more exclusivity provisions, then the process may determine that the content contributor exclusivity specification prohibits the content contributor from providing content to the first user.

The process generates content contributor search results, filtering out those content contributors that are exclusive to other users (e.g., other publishers). At block 1258, the filtered list is provided for display to the first user. The process returns the filtered matching content contributors in search results presented to the first user. Optionally, the search results will be in ranked order, with the closet match rated first, the second closet match rated second, etc.

FIGS. 13A-15H illustrate additional example user interfaces that may be presented to a user (e.g., by a program or browser hosted on a user device). The user interfaces may be configured to enable the user device program and/or the remote system to provide information and instructions to users and to receiving information and instructions from users. The information received via the user interfaces may be received and stored, and the instructions received via the user interfaces may be carried out.

Figure 13A:
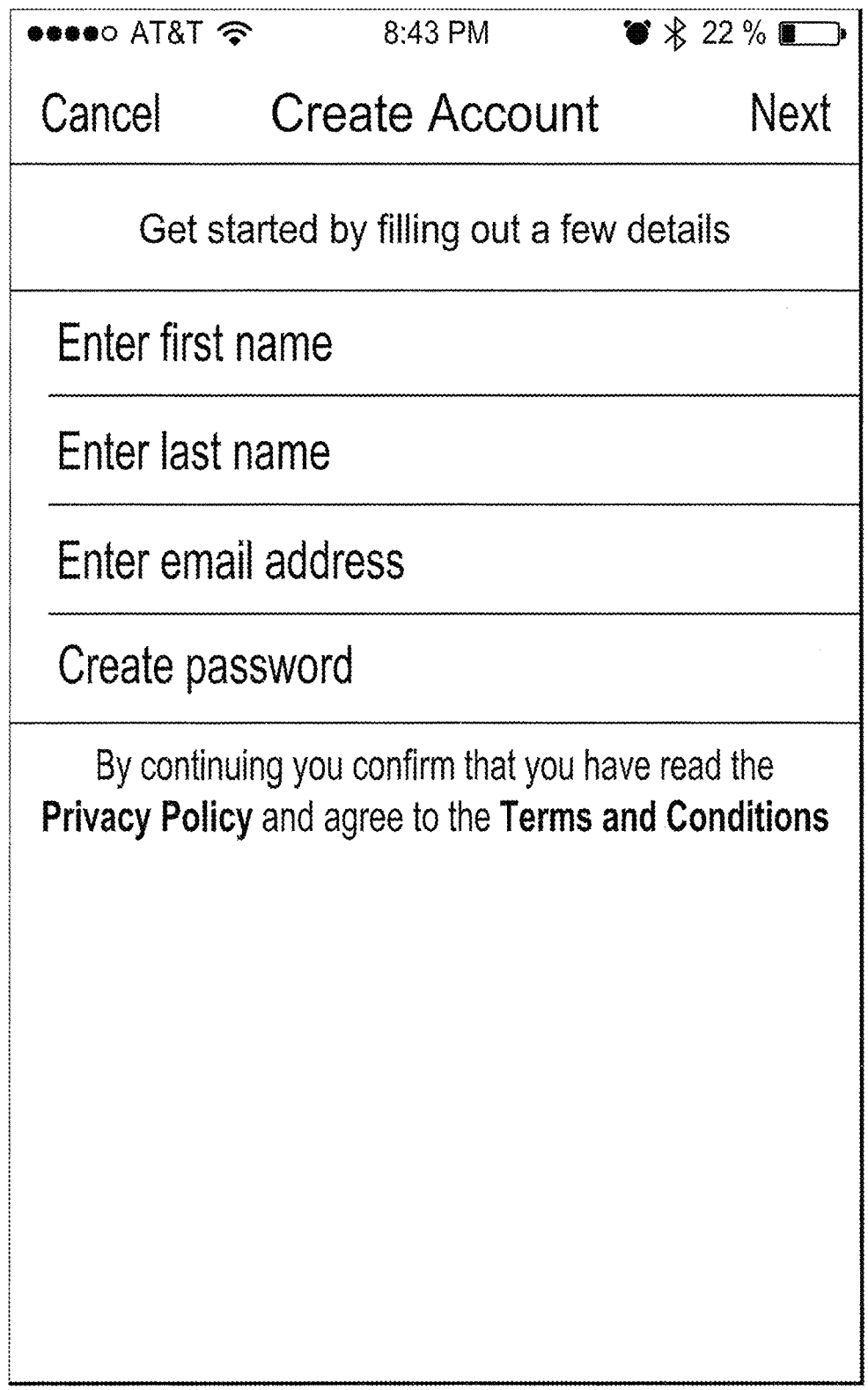
FIGS. 13A-17C illustrates additional example user interfaces.
Figure 13B:
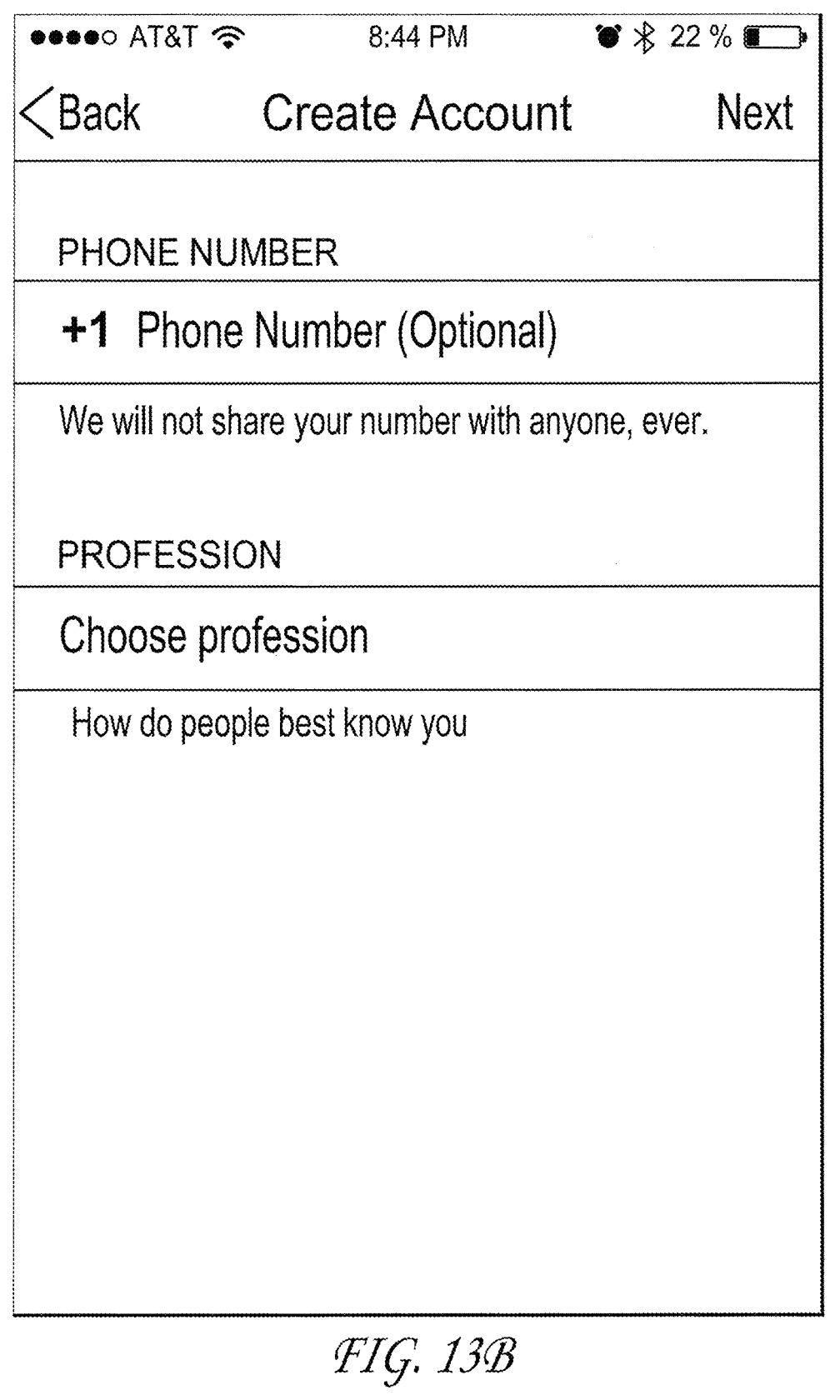
Figure 13C:
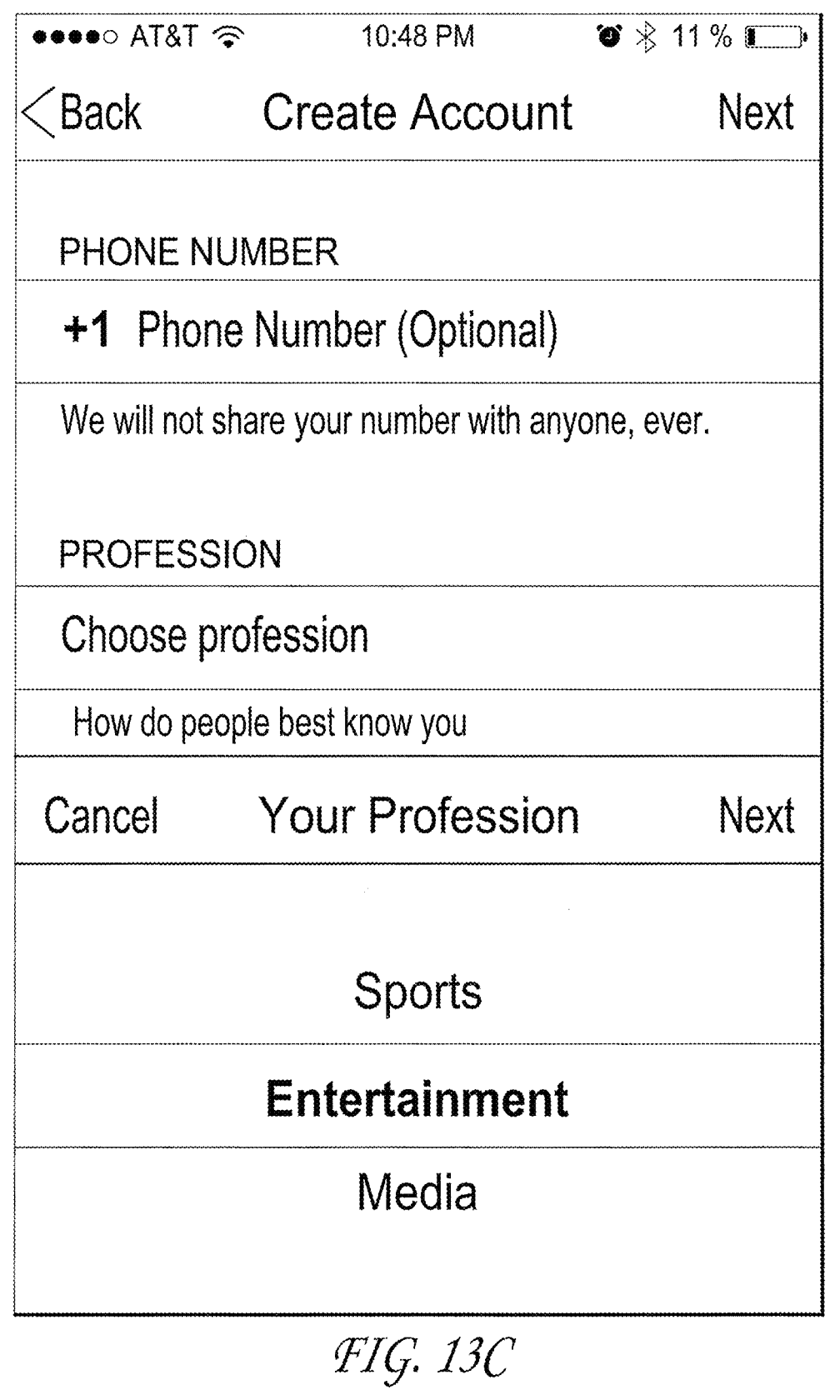

FIGS. 13A-13G illustrate example account creation related user interfaces. Information received via the user interfaces may be used to create a content provider account for a user and to generate a user profile. FIG. 13A illustrates an example first account creation user interface for a content contributor. The illustrated account creation user interface may be configured to be presented on a mobile device with a touch sensitive screen (e.g., via a dedicated application or via a mobile device webpage), such as a smart phone or tablet computer. Optionally, the account creation user interface may be configured to be presented on a desktop computer display or other terminal type. This example user interface includes field for receiving the content contributor's first and last names, email address, and password. FIG. 13B illustrates another example first account creation user interface including fields for receiving a phone address (e.g., a phone number), a profession field, and a field via which the user can submit information on how people best know the user (e.g., what the content provider is famous or well known for). If the user selects the profession field, the example profession menu illustrated in FIG. 13C may be presented. The user may select a profession from the menu (e.g., by touching the correct profession), select the "done" control, and the user's selection will be received and stored by the system.

Figure 13D:
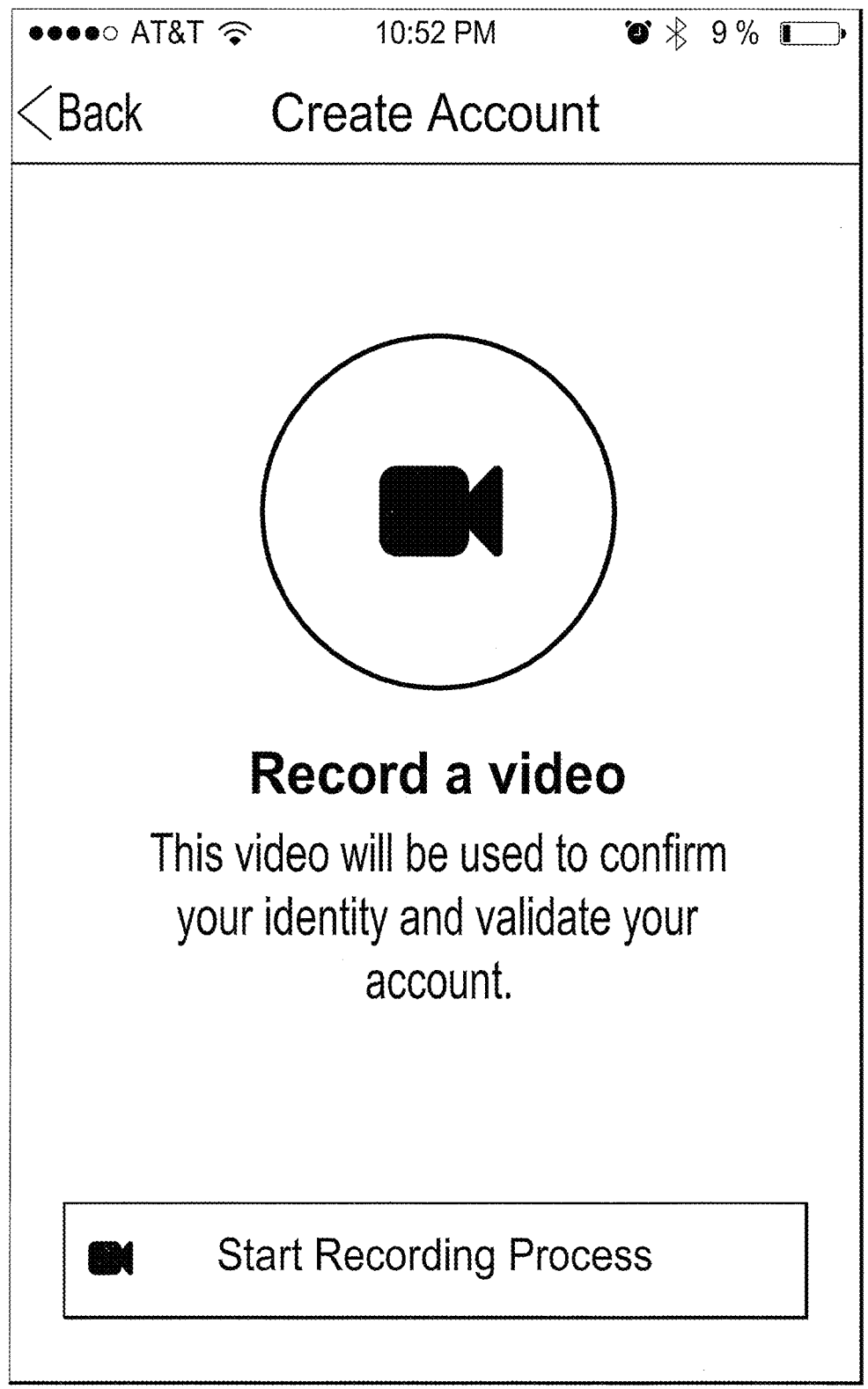

FIG. 13D illustrates an example user interface prompting the user to record a video of the user, which will be used to confirm the user's identity and to validate the user's account. When the user is ready to begin the recording process, the user may activate a start recording process control.

Figures 2, 13E:
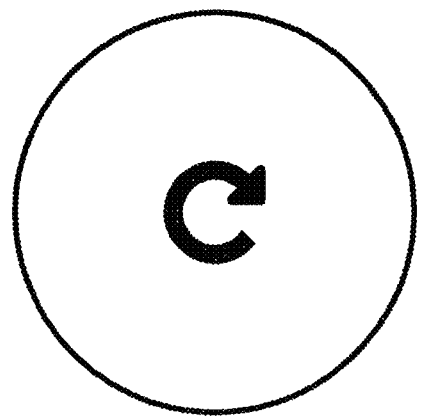

If the user activates the start recording process control illustrated in FIG. 13D, the example help user interface illustrated in FIGS. 13E1-13E2 may be presented to the user. In this example, the help user interface instructs the user to speak clearly and loudly, make sure the user has good lighting for the video recording, and to hold the phone steady at eye level.

The orientation of the portable device and/or the portable device camera may be detected (e.g., by the dedicated application or by a remote system). If the orientation is improper, a user interface, such as the example illustrated in FIG. 13E2, may be presented instructing the user to rotate the mobile device so it is oriented in a desired orientation, and the user interface may instruct the user as to the vertical positioning of the mobile device (e.g., eye level).

Figure 13F:
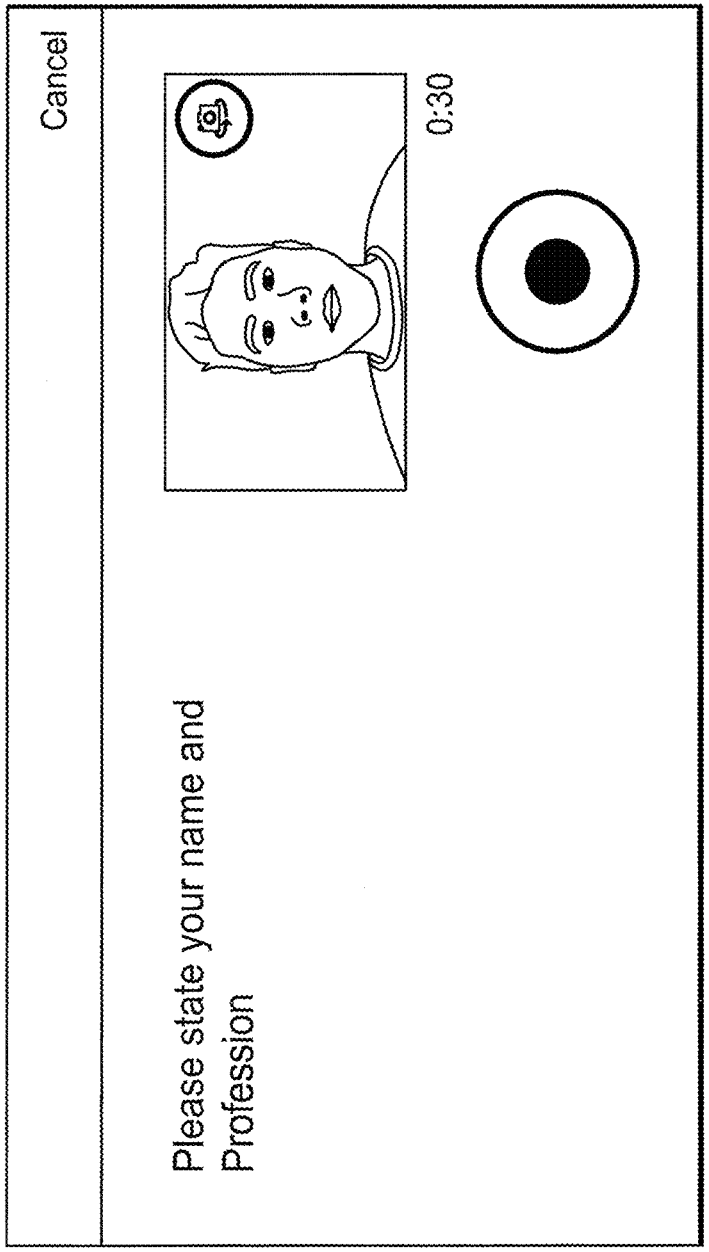

Once the mobile device is correctly oriented, the example user interface illustrated in FIG. 13F may be presented. The user interface may include a video record control, text that prompts the user to activate the video record control, wait for a countdown interface (e.g., counting down 3-2-1), then state the user's name and profession, and activate the record control again to stop the video recording. The recording of the user may be displayed in an area of the user interface as the recording is being performed. The recording may be performed using a front facing camera of the user mobile device.

Figure 13G:
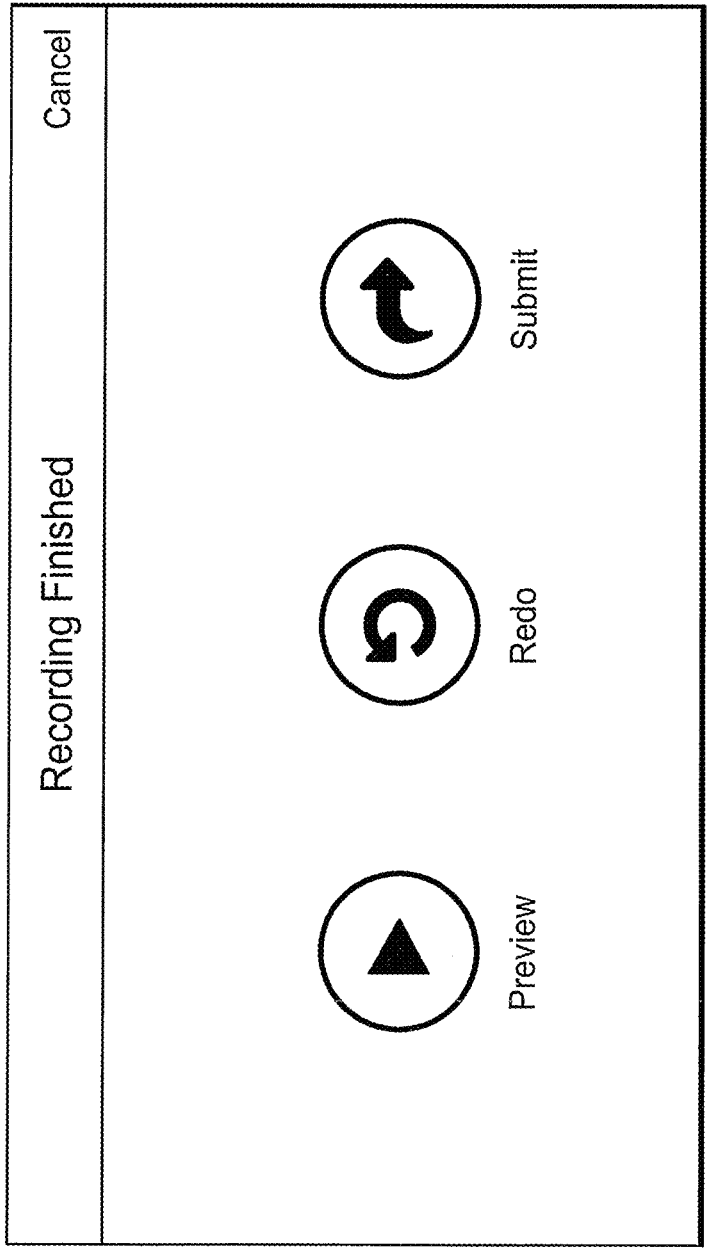

The example user interface illustrated in FIG. 13G may be presented in response to the user activating the video record control a second time (to stop the video recording). The example user interface illustrated in FIG. 13G includes a preview control, a redo control, and a submit control. In response to detecting that the user has activated the preview control, the video recording of the user may be played back to the user on the mobile device. If the user is unhappy with the recording, the user may activate the redo control, and the example user interfaces illustrated in FIG. 13D, 13E, 13F, or 13G may be presented again so that the user can re-record the video. If the user is ready to submit the video recording for verification, the user can activate the submit control.

For example, a video recording of the user made utilizing the foregoing user interfaces may be transmitted to the remote system. The remote system may enable an operator to playback and manually inspect the video recording to verify that the person in the video is the person that corresponds to the name and/or other profile information provided by the user. Optionally, face recognition technology embodiment in a facial recognition engine may be used in addition or instead to compare the person in the video with a known image of the person that the user is claiming to be. For example, a face recognition system may compare facial features (e.g., shape, size, and/or relative position of eyes, ears, nose, jaw, cheekbone, skin color, skin texture, etc.) and/or other features of the person in the video recording with the facial features of the person that the user is claiming to be from a known still image or video image of that person. Example algorithms that may be used include PCA (Principal Component Analysis), Independent Component Analysis (ICA), EBGM (Elastic Bunch Graph Matching), LDA (Linear Discriminate Analysis), Trace transform, 3-D morphable face model, HMM (Hidden Markov model), MSL (Multilinear Subspace Learning), etc. Optionally in addition or instead of using facial recognition, voice authentication may be performed using a voice recording (which may be a voice track included in the video recording). For example, the system may include a voice biometrics analysis engine to determine if the user's voice matches that of a known voice recording of the person the user claims to be. The voice engine may use one or more of the following algorithms and/or other algorithms: Hidden Markov models, neural networks, Gaussian mixture models, frequency estimation, pattern matching algorithms, matrix representation, vector quantization, etc.

If the user is not validated to be the person the user claims to be, optionally, the system will not create an operable account to the user and may optionally inform the user of the validation failure and of the account denial.

Figure 14A:
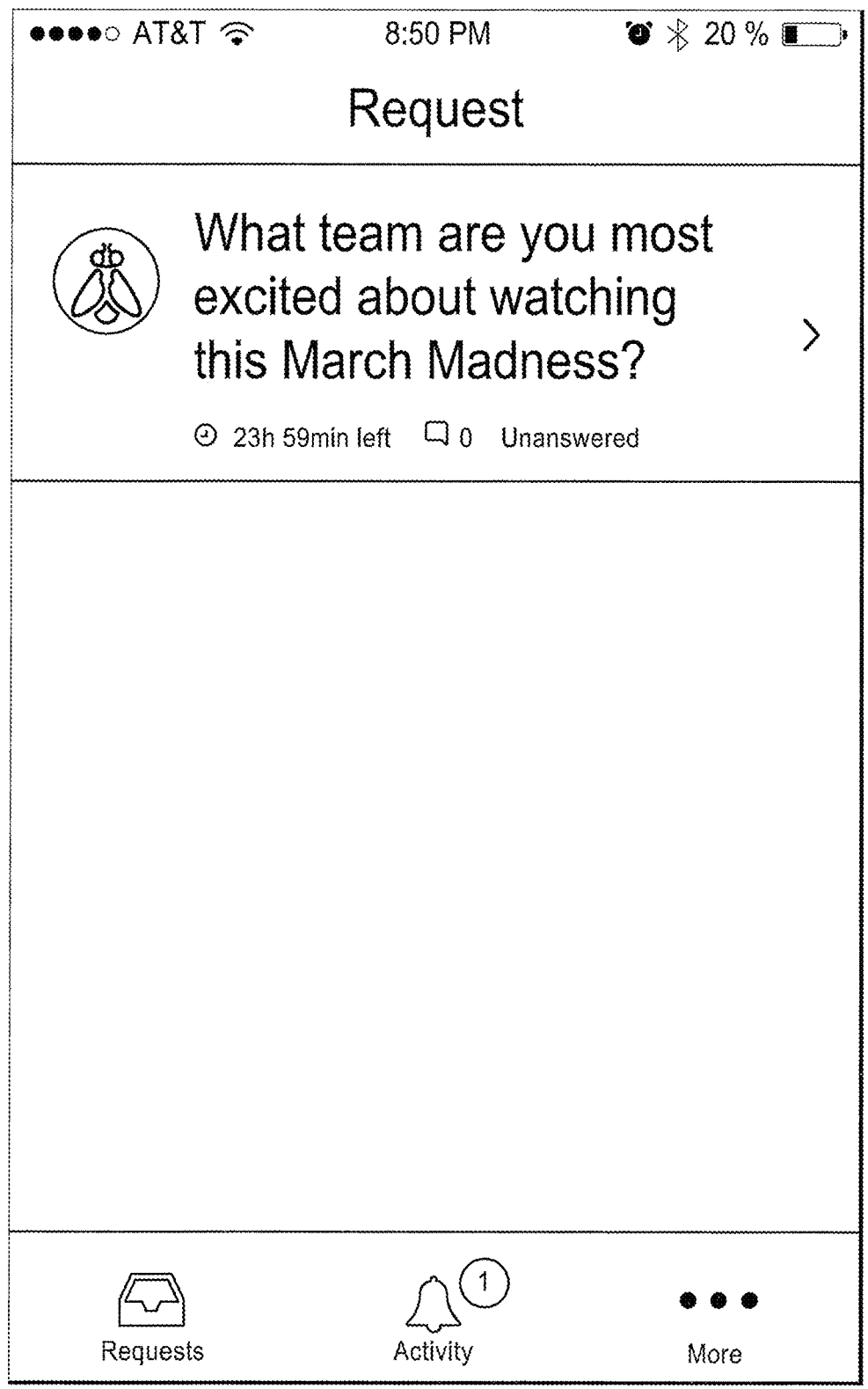
Figure 14B:
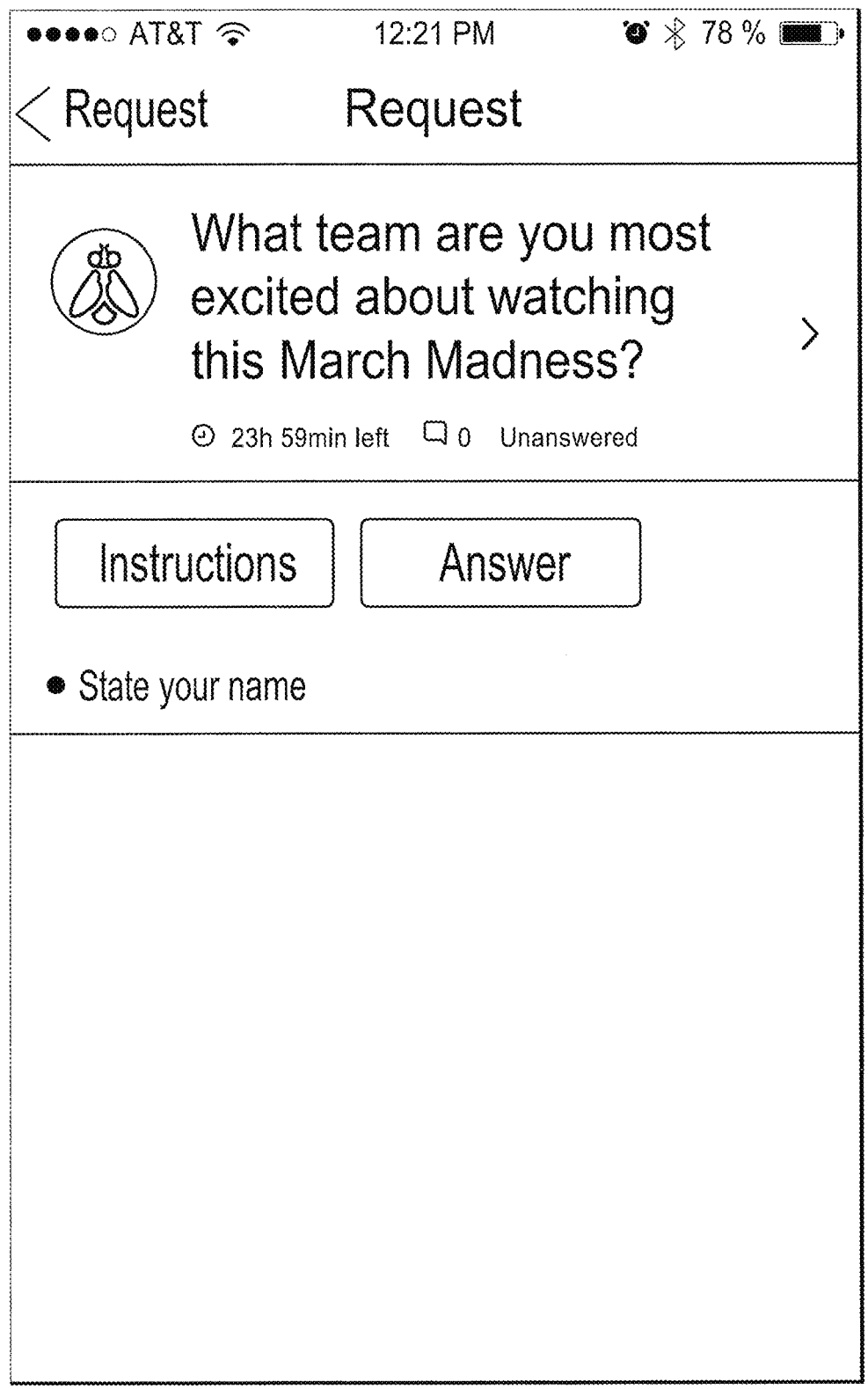

FIGS. 14A-14D illustrate example user interfaces related to a content request. FIG. 14A illustrates an example content request configured to be presented on a user mobile device. The content request and associated criteria may have been received at the user mobile device from the remote content distribution facilitation system. For example, the content request may include a subject matter, a response deadline, the number of other users that have responded to the content request and/or other information, such as that discussed elsewhere herein. In this example, the user is prompted to respond to a question regarding a sports tournament ("What team are you most excited about watching this March Madness?"). The example user interface also has an optional countdown timer indicating how long the user has to respond to the content request (e.g., "23 hours, 59 minutes left" in this example). The example user interface also includes an optional indication as to how many other users have already responded to the same request. In this example, no one has responded to the request, and so the user interface indicates that the request is unanswered.

Referring again to FIG. 14A, an example dashboard is provided towards the bottom of the user interface (although it could be positioned elsewhere), indicating how many content requests are still pending for the user, the user activity (e.g., the number of submissions by the user), and device settings, user preferences, terms of service, an administrative information. If the user activates a "next" control (which may be in the form of an arrow or other graphic and/or in the form of text), the example user interface illustrated in FIG. 14B may be presented. The example user interface illustrated in FIG. 14B repeats the request question, includes the countdown timer, and the indication as to how many other users have already responded to the same question (which may have been updated). The example user interface indicates that the user will be asked to state the user's name at the beginning of the recording and then answer the question. Once the user is ready to answer the question, the user can activate the "answer" control, which will cause the example user interface illustrated in FIG. 14C to be presented. Optionally, additional instructional user interfaces, similar to those illustrated in FIGS. 13E and 13F may be first presented.

Figure 14C:
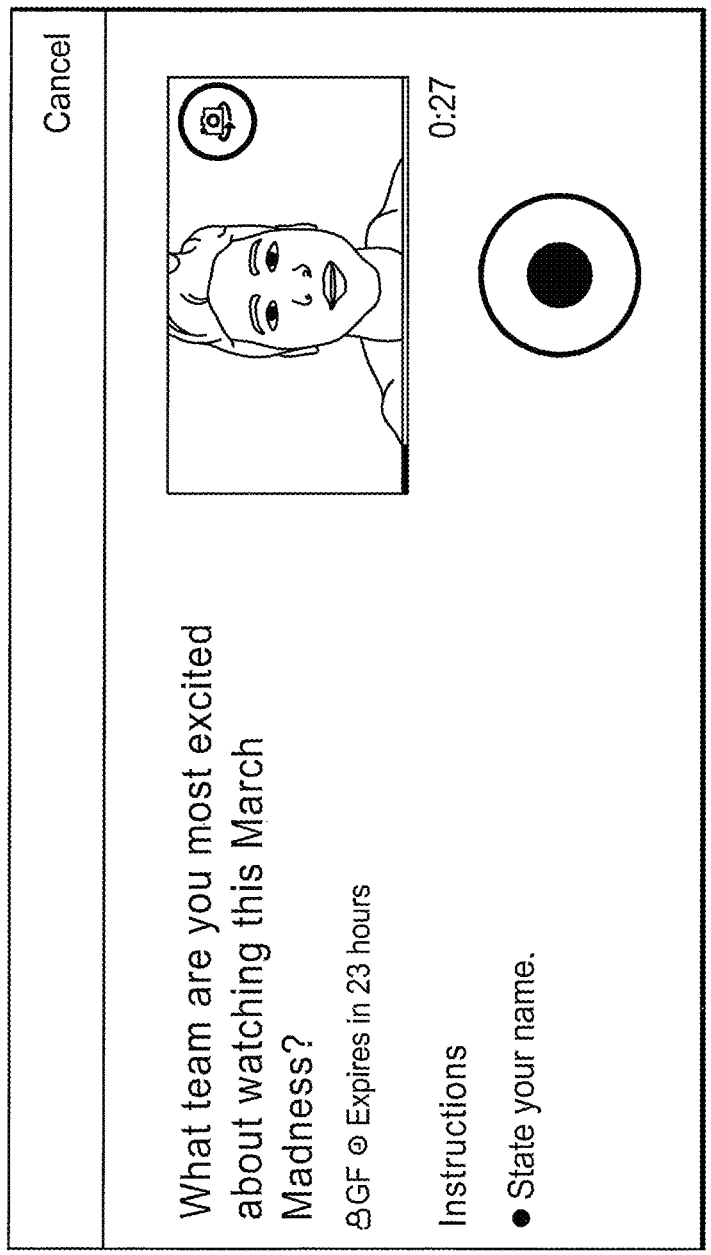

The example user interface illustrated in FIG. 14C repeats the prompt to state the user's name, the content subject matter question, and the deadline for submitting the content. The user interface includes a video record control, text that prompts the user to activate the video record control, wait for a countdown interface to reach a certain number (e.g., 1 or 0) to begin stating the user's name and answer, and to activate the record control again to stop the video recording. Once the user activates the record control presented via the user interface, the user's mobile device will begin recording the user's statement of name and answer to the question (e.g., using a front facing camera of the mobile device). The recording of the user made using the front facing camera may be displayed in an area of the user interface as the recording is being performed so that the user may view the recording in real time.

Figure 14D:
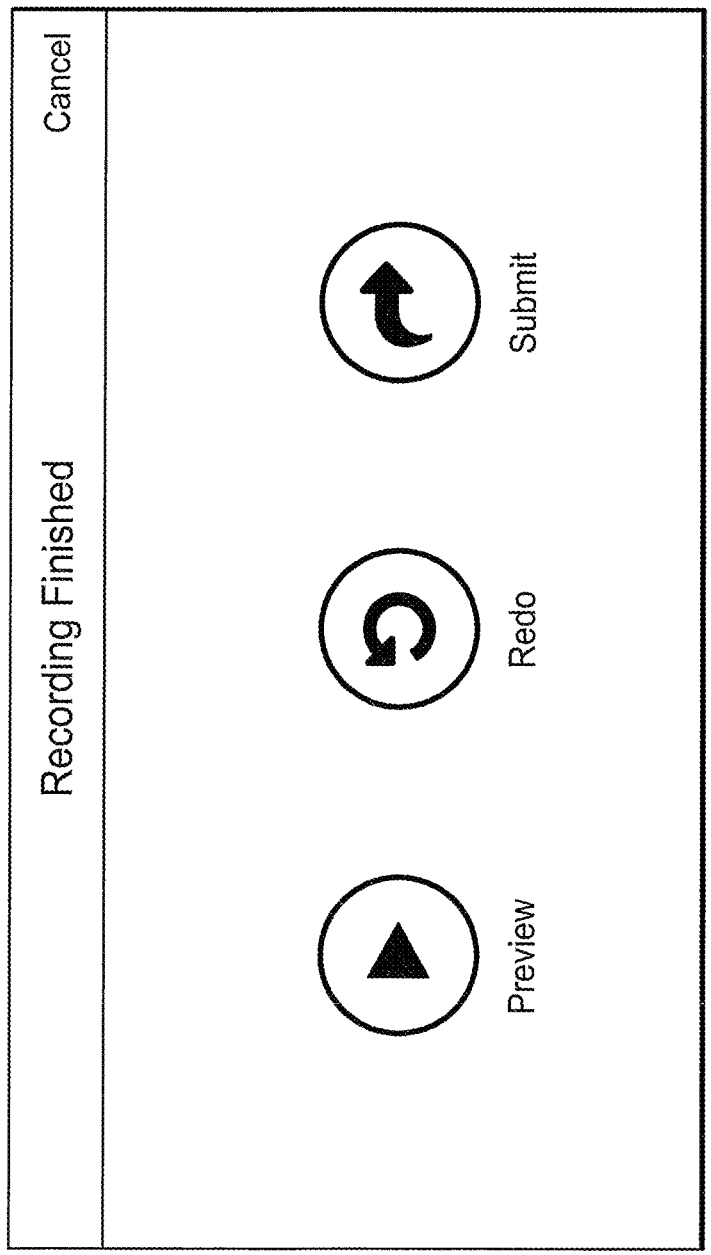

The example user interface illustrated in FIG. 14D may be presented in response to the user activating the video record control a second time (to stop the video recording). The example user interface illustrated in FIG. 14D includes a preview control, a redo control, and a submit control. In response to detecting that the user has activated the preview control, the video recording of the user may be played back to the user on the mobile device via a playback user interface and associated content player. The playback user interface may be used to playback content, such as video content (including an audio track) and may include some or all of the following: a play control, a pause control, a rewind control, a fast rewind control, a fast forward control, a scrubber bar, and a volume control. If the user is unhappy with the recording, the user may activate the redo control, and the example user interface illustrated in FIG. 14B or 14C may be presented again so that the user can re-record the video. If the user is ready to submit the video recording, the user can activate the submit control.

Figure 15A:
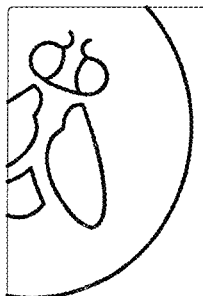

FIGS. 15A-15H illustrate example user interfaces for a content requester, such as a user associated with a publisher. FIG. 15A illustrates an example log-in user interface including fields for a user email address or other user ID and a password. If the user enters in the correct login information, the system may grant the user access to the user's and/or the publisher's account and may generate and provide user interfaces customized for the user and/or the publisher.

Figure 15B:
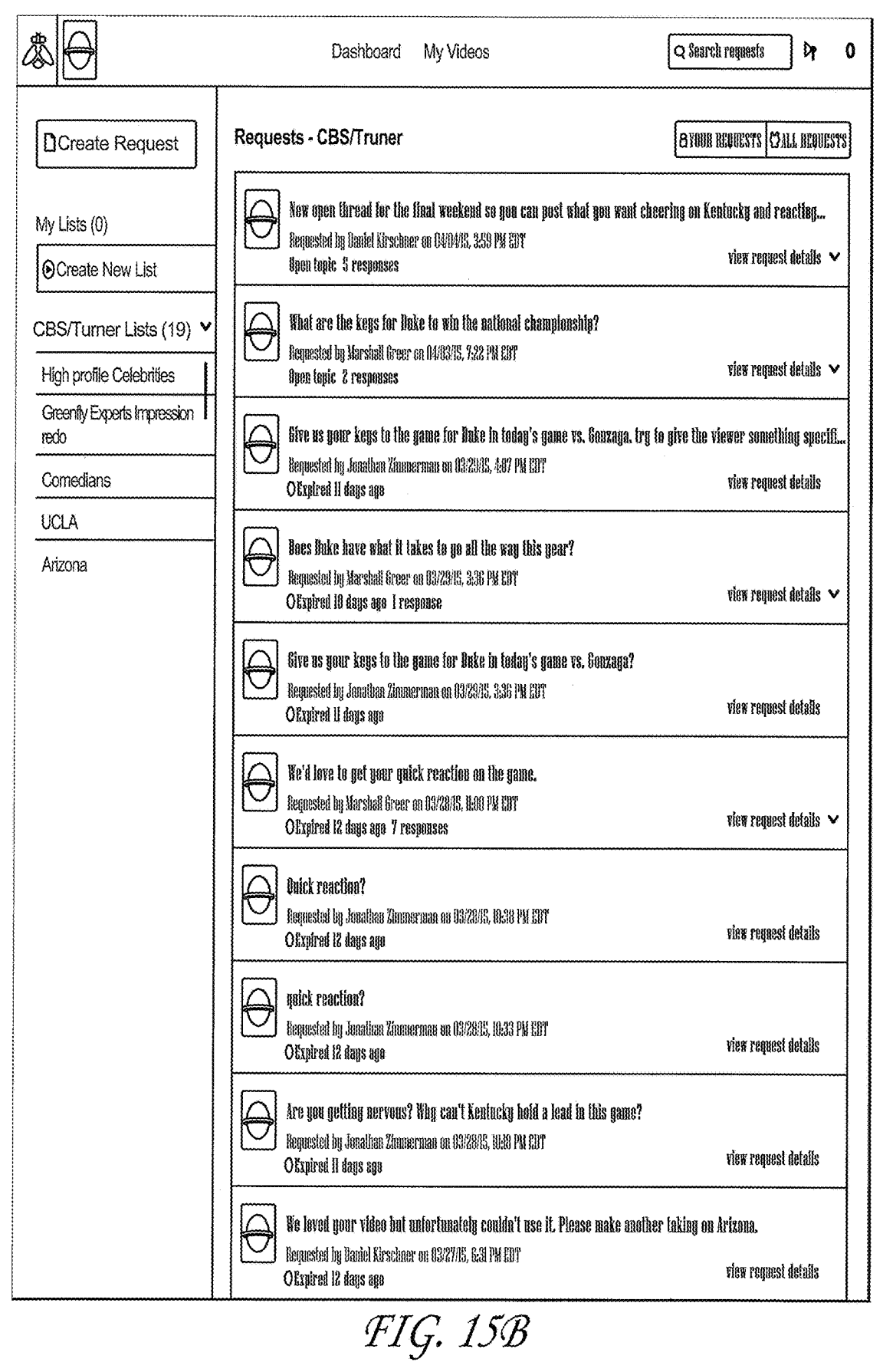

FIG. 15B illustrates an example user interface including a dashboard listing content requests that have been sent. A control ("all requests") is provided which when activated by the user causes the system to generate and present a listing of all pending (and/or no longer pending) content requests of the publisher. Another control is provided ("your requests") which when activated by the user causes the system to generate and present a listing of all pending (and/or no longer pending) content requests of the user. A given listed request may include a content request summary, including the subject matter (e.g., a question regarding a sporting event), the identity of the user that issued the request, the date and time the request was issued, an indication as to whether the request is still pending/open (an optionally, how long the request is still open) or if the request has expired (and optionally how long ago the request expired), and/or a control to access additional request details and/or content contributors to whom the request was sent. The example user interface also includes a listing of sets of content contributors previously defined by other publisher users and includes a separate listing of the sets of content contributors previously defined by the user ("My lists"). Optionally, the foregoing lists may be combined into a single list. The system also calculates and displays via the user interface the number of lists in each category. A create request control is provided, which when selected by the user, causes a content request user interface form to be displayed via which the user can specify a new content request, such as described elsewhere herein.

Figure 15C:
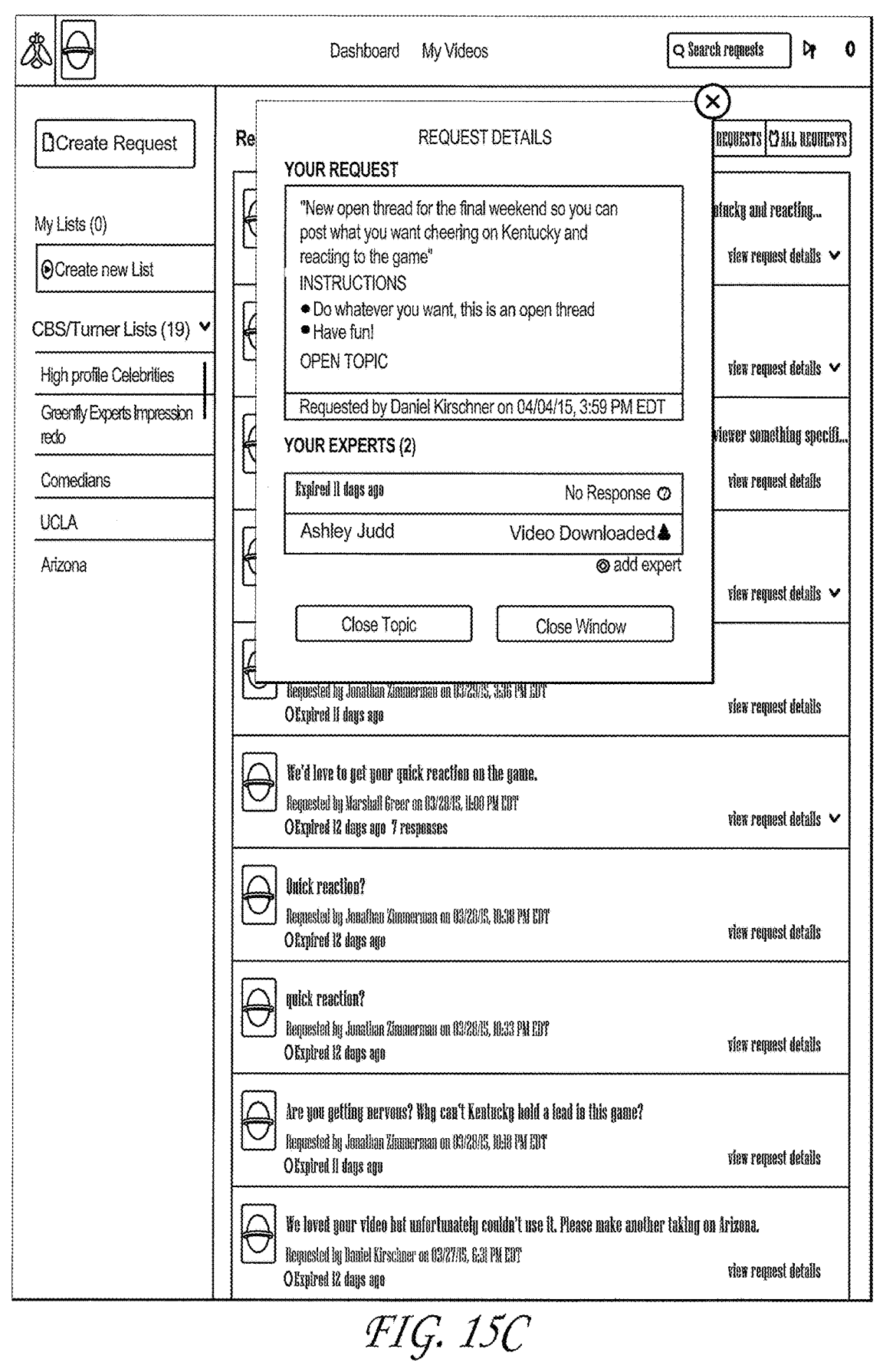

FIG. 15C illustrates an example content request details user interface which may be presented in response to a user selecting a request details control displayed in association with request summary, such as is illustrated in FIG. 15B. The content request details user interface may be presented as a pop-up window over the user interface illustrated in FIG. 15B, in a separate pane, or otherwise. The content request details user interface may present some of all of the following information and/or other information: the full text of the request provided to content providers, instructions for the content providers, an indication as to whether there is a fixed deadline for responses from content providers or whether the response deadline is open, the identity of the person who submitted the content request, the number of content providers the request was sent to ("Your Experts (number of content providers)"), the names of the content providers the request was sent to, an indication so to whether those content providers provided content in response to the request, and links (e.g., "videos downloaded") to content provided by the content providers. A control is provided via which the user can add additional content providers to receive the content request ("add expert"). A control is provided ("Close Topic") via which the user can close the request to make the request expire so that content providers may be informed that no further request responses are needed and/or will be accepted.

Figure 15D:
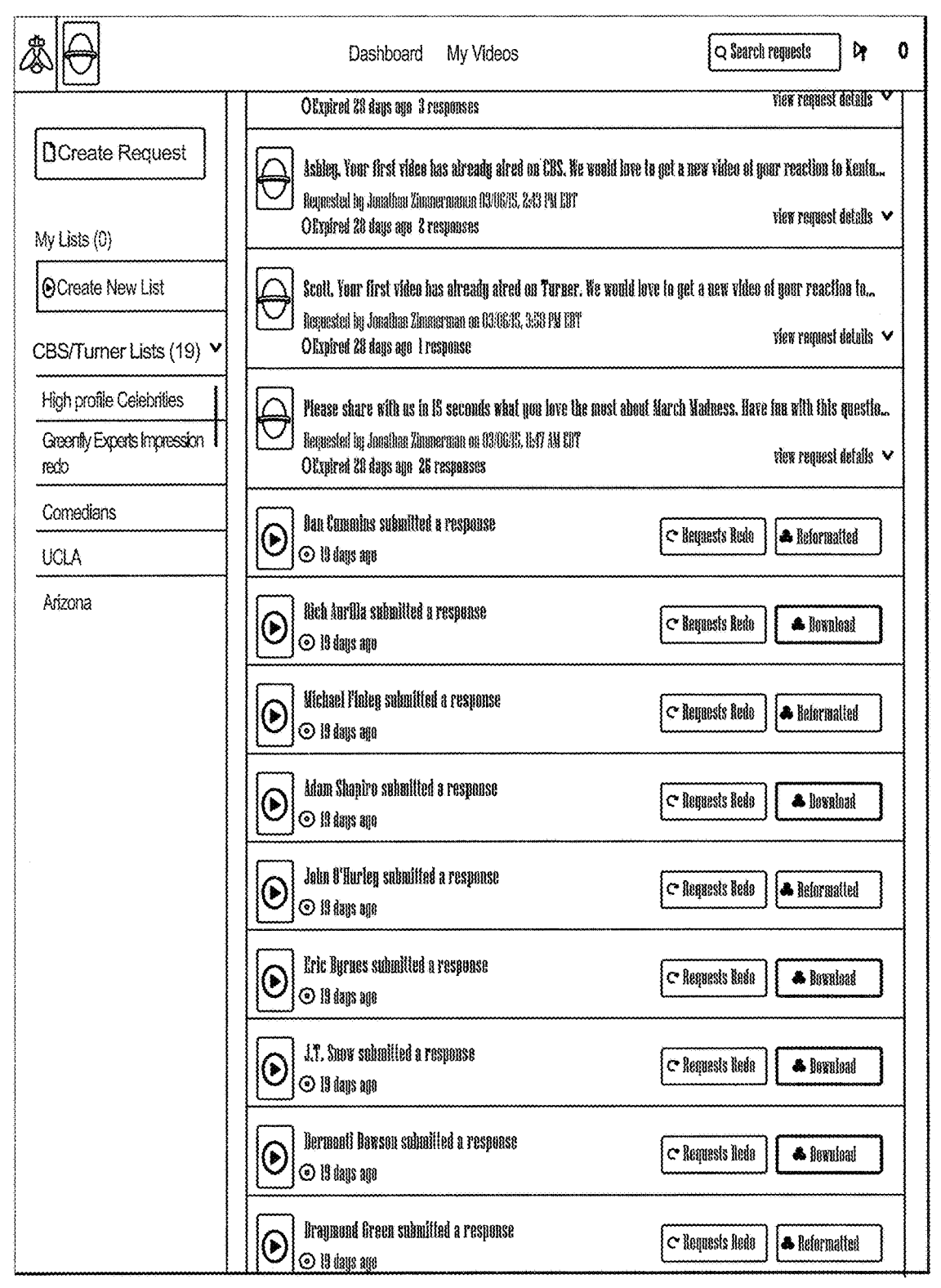

FIG. 15D illustrates an example expanded view of the user interface illustrated in FIG. 15B. In addition to the user interfaces and information discussed above with respect to FIG. 15B, the expanded view includes a listing of responses received from content providers to whom requests were provided. A given response entry may include the name of the content provider that submitted the response, timing information as to when the response was received (e.g., a specified number of days ago, an exact date, etc.), and/or an indication as to whether the received content (if any) has been downloaded. Optionally, the download indicator may also be used to instruct the system to download the item of content if it has not yet been downloaded. A play control may be provided enabling the user to initiate playback of the received, downloaded content. A redo request control is provided, where, in response to the user activating the redo request control, a message is transmitted to the content provider asking the content provider to re-record the response to the content request. Optionally, a redo request user interface is provided via which the user may enter a message to be included in the redo request. For example, the message may indicate what the user did not like in the original content submission and/or provide instructions as what the user would like with respect to the re-recorded content.

Figure 15E:
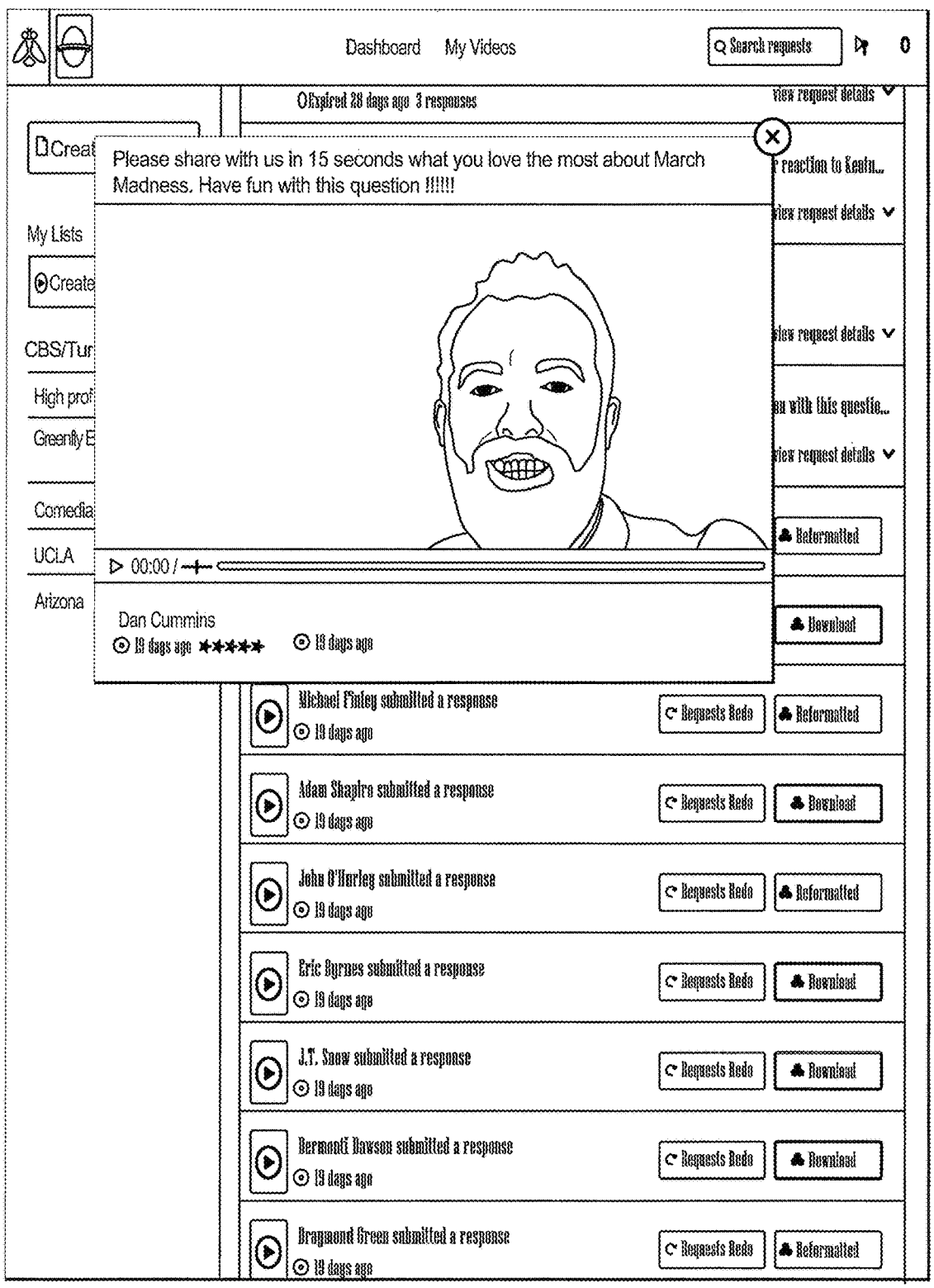

FIG. 15E illustrates an example content playback user interface for playback of an item of content associated with a response listing in the user interface illustrated in FIG. 15D. The example playback user interface may be presented in a popup window, in a separate pane, or otherwise in response to user activation of a playback control displayed in the corresponding response listing. The playback user interface may be used to play back content, such as video content (including an audio track) and may include some or all of the following: a play control, a pause control, a rewind control, a fast rewind control, a fast forward control, a scrubber bar, and a volume control. The playback user interface may be generated to include the time length of the content, the request text to which the content provider is responding to, the name of the content provider, how long ago the content was received, and a rating of the content (e.g., previously provided by the user or other person associated with the publisher that requested the content) and/or a rating of the content provider (e.g., where the ratings may have been previously provided by the user or other person associated with the publisher that requested the content).

Figure 15F:
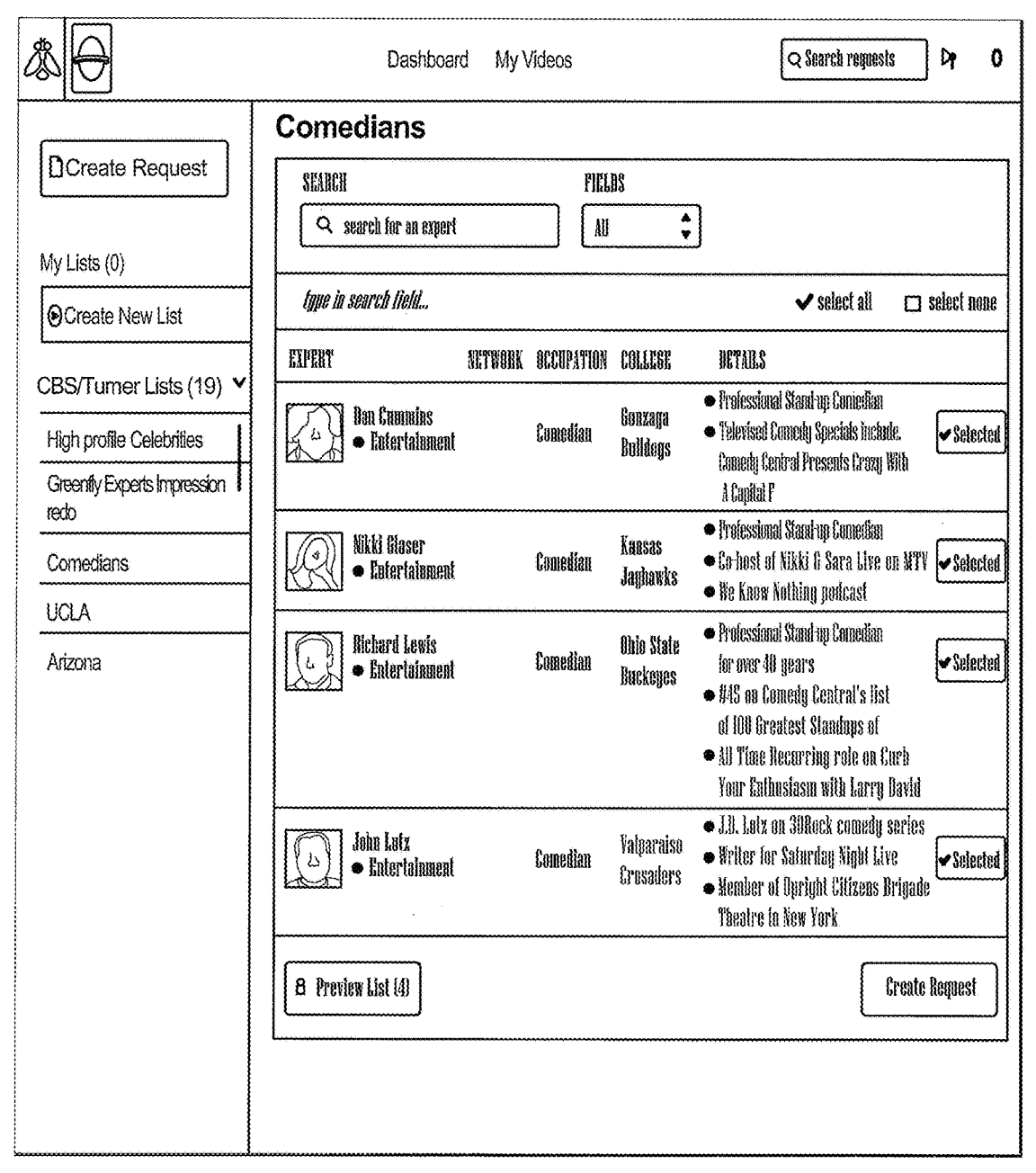

FIG. 15F illustrates an example content provider set user interface. The content provider set user interface lists the members of a selected pre-defined set of content providers. For example, a user may have defined a set of comedians, and named the set "Comedians". When the user later selects the set(s) from a presented list of sets, the user interface is dynamically updated to include a listing of content contributor members of the selected set or sets, including details on the members. For example, a given content contributor listing entry may include a photograph, name, field (e.g., entertainment, sports, law, medicine, celebrities, etc.), occupation, educational institutions and/or other details (e.g., a brief biography/work history) of the content contributor.

Referring again to FIG. 15F, each content contributor listing entry may include a select control. When the user wants to submit a content request to one or more members of the displayed set, the user may activate the corresponding select control of the members to whom the content request is to be transmitted. A "select all" control may be provided to enable the user to select all members of the set with a single activation. A "select none" control may be provided to enable the user to unselect all members of the set with a single activation. A create request control is provided, which when activated, will cause a content request user interface to be presented via which the user can specify the content request that is to be sent to the selected members. Examples of the content request user interface are described elsewhere herein. The example content provider set user interface includes a content contributor search field configured to receive a text query. A "fields" drop down menu may be provided enabling the user to limit the search to matches in particular metadata (e.g., name, occupation, educational institution, prior or current employer, etc.). A search engine will then search for corresponding matching content providers and provide the search results for display as discussed elsewhere herein in greater detail.

FIG. 15G illustrates an example content provider set creation user interface. The user interface in this example lists content contributors identified as a result of a user query submitted using a search user interface. A name field is configured to receive a set name provided by the user (e.g., a descriptive name). As similarly discussed above with respect to FIG. 15E, a given content contributor entry may include a photograph, name, field (e.g., entertainment, sports, law, medicine, celebrities, etc.), occupation, educational institutions and/or other details (e.g., a brief biography/work history) of the content contributor. Each content contributor listing entry may include a select control. When the user wants to include content contributor in the set, the user may activate the corresponding select control. A "select all" control may be provided to enable the user to select all the listed content contributors for inclusion in the set. A "select none" control may be provided to enable the user to unselect all the listed content contributors with a single activation. A save control is provided, which when activated, will cause the selected content contributors to be saved as part of the set, where the set is associated with the user provided name.

Figure 15H:
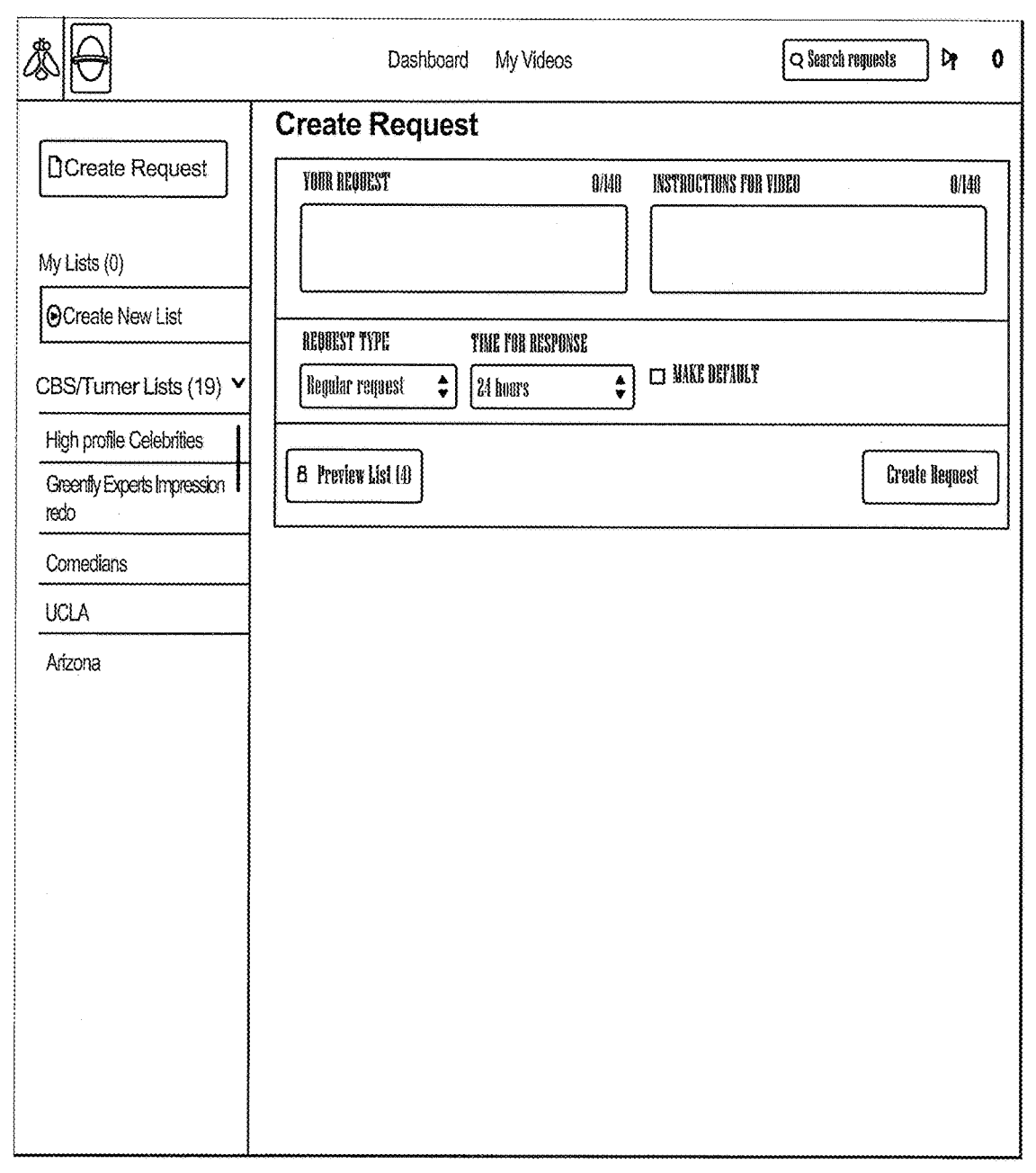

FIG. 15H illustrates an example content request creation user interface. The content request creation user interface may include some or all of the following fields:
- a text field configured to receive request text specifying what the user wants the content provider to speak about in the requested content;
- a video instructions field configured to receive request text specifying compositional needs for the requested content (e.g., describing the desired lighting, location, positioning of the camera, clothing, etc.);
- a request type field includes a selectable menu of request types (e.g., open (no response deadline) or deadline for requests with a set response deadline);
- a time for response field via which the user can specify the response deadline (e.g., in days, hours, or minutes) if any;
- a "make default" field which causes the specified request type and the specified time for response to be used as default values for future content requests from the user.

A send control is provided, which when activated, will cause the content request to be transmitted to the content contributors selected by the user.

Figure 15I:
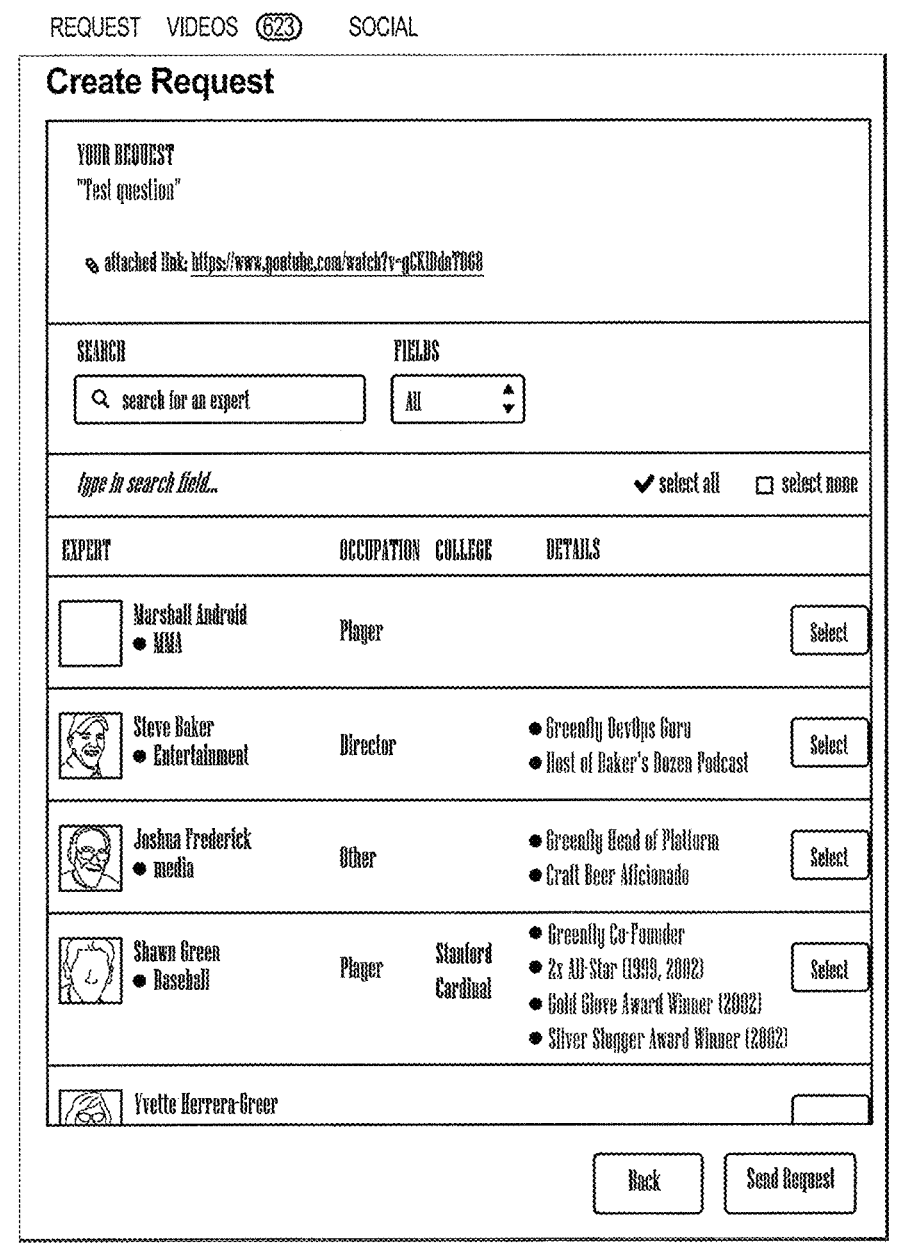

FIG. 15I illustrates an example content contributor selection user interface that enables the user to select individual content contributors and/or contributor lists. The example user interface may include the text of the content request, a link to content (or a copy of the content itself) that the content contributor is to comment on, a contributor search field configured to receive a search query for contributors, and a "fields" menu via which the user can specify the data store fields the request is to be limited to (e.g., expertise, occupation, name, details, etc.). The list of content contributors may optionally include fields for some or all of the following: a photograph or video of a given content contributor, a name, a subject area of expertise (e.g., media, baseball, mergers, entertainment, other, etc.), an occupation, a college, and details (e.g., details on the contributors current job function, hobbies, awards, etc.).

Figure 16A:
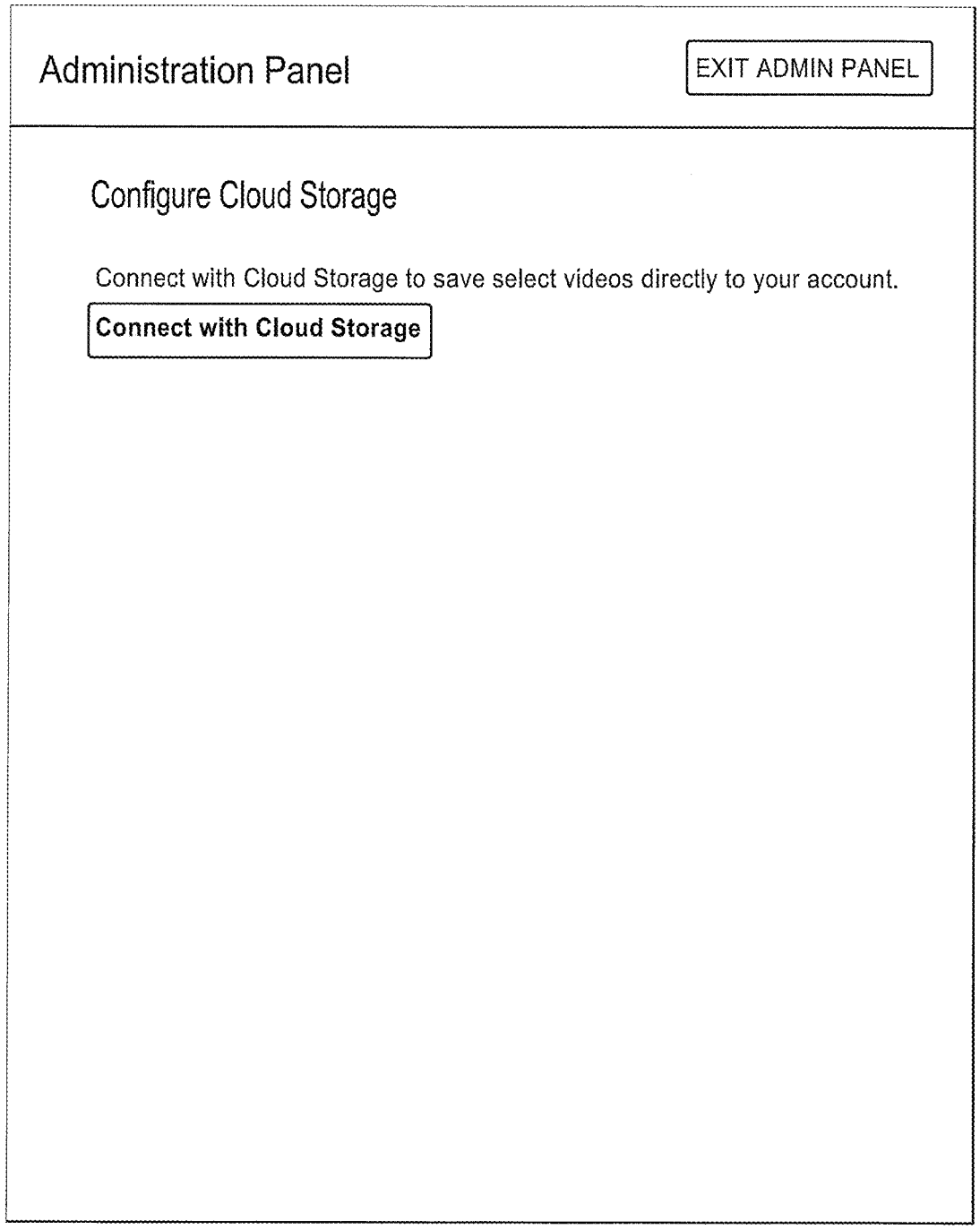
Figure 16B:
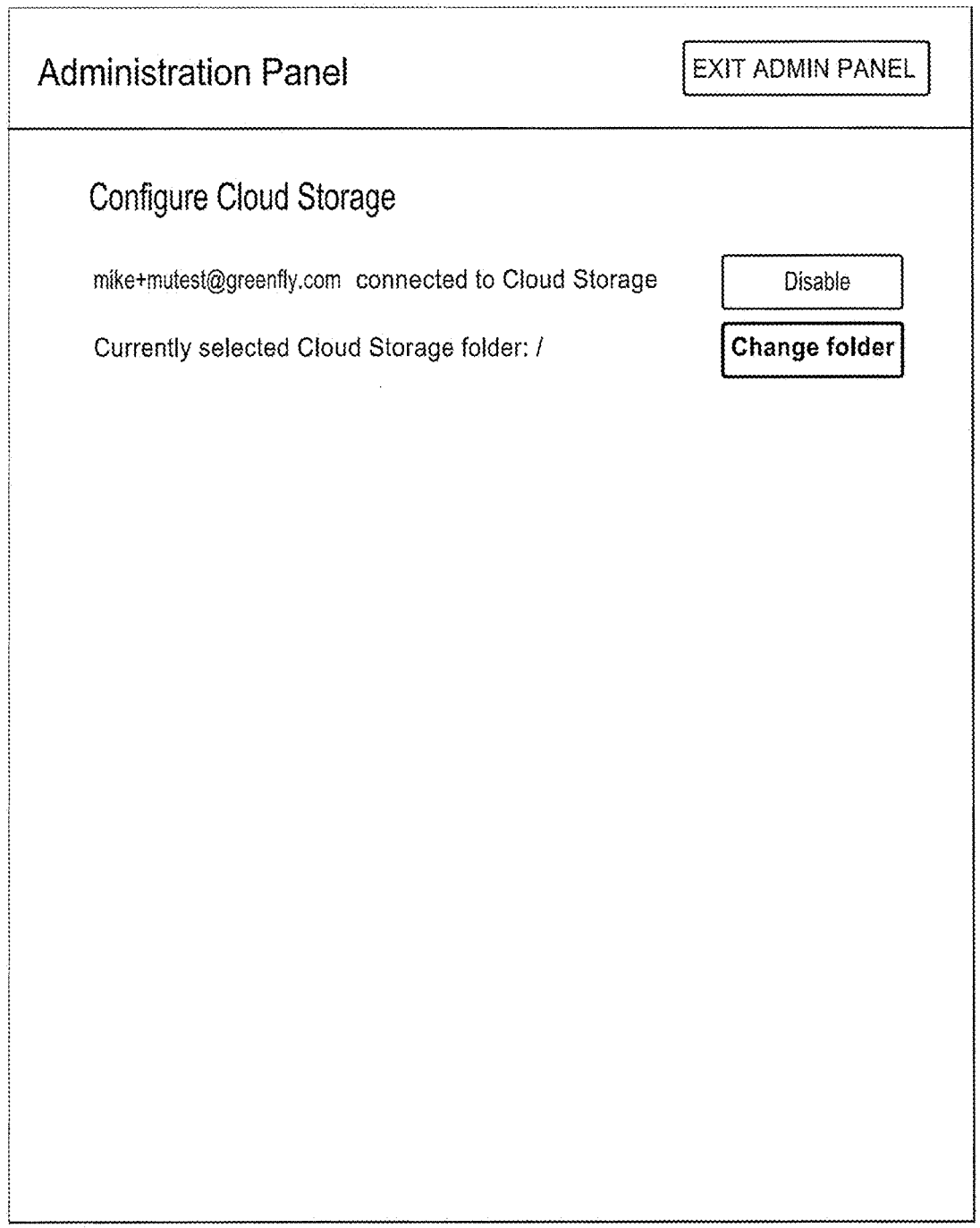
Figure 16C:
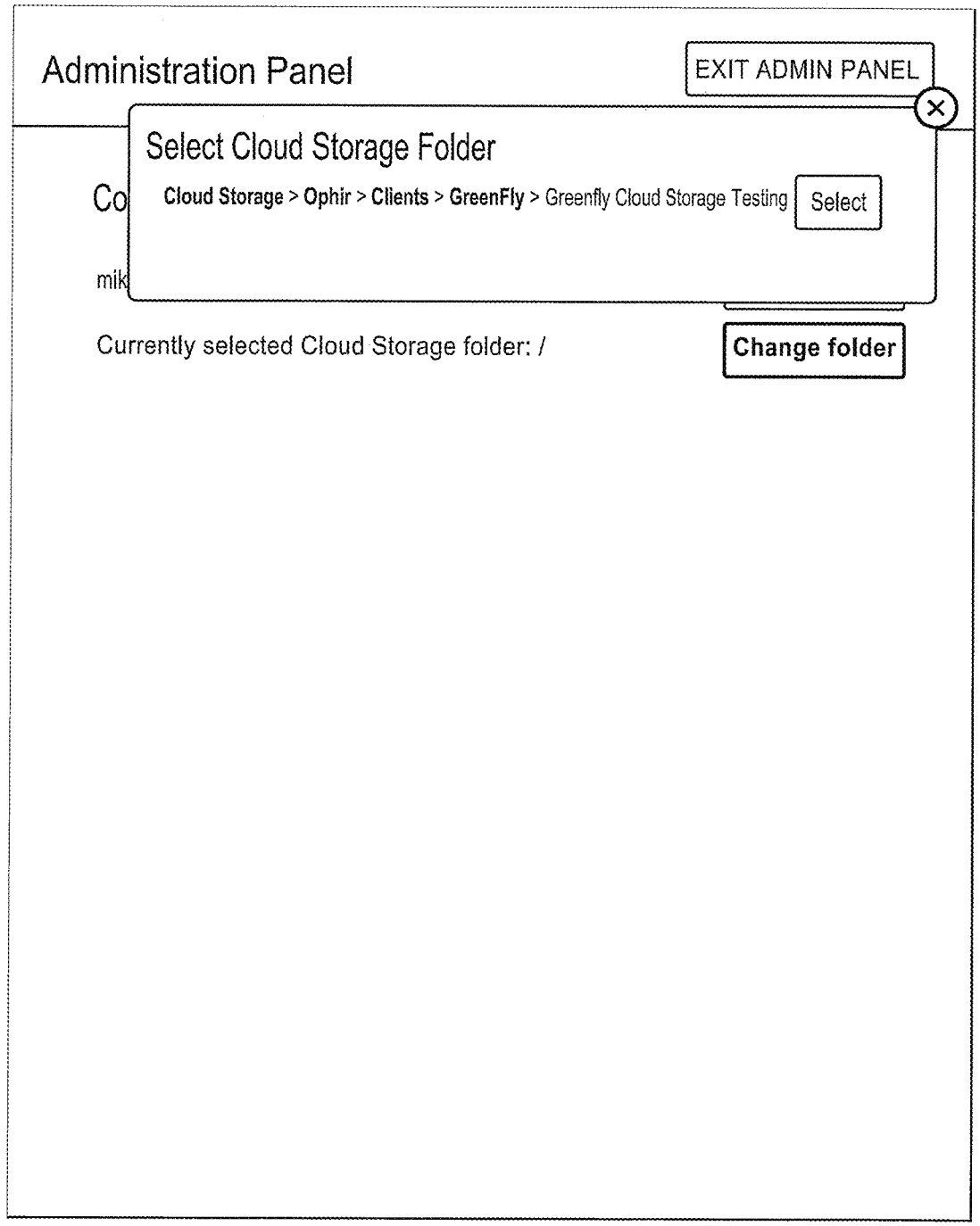
Figure 16D:
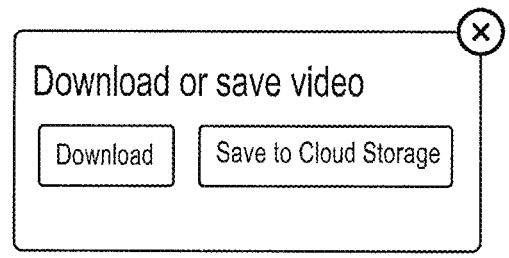

FIG. 16A-16D illustrate various example user interfaces related to the cloud-based storage of content. FIG. 16A illustrates an example user interface providing controls that enables a content requester to enable the content distribution facilitation system to access a cloud-based storage system account of the content requester. FIG. 16B illustrations a user interface that identifies which account folder is configured to interface with the content distribution facilitation system for receiving content. A change folder control is provided, enabling the user to cause content to be uploaded to a different cloud-based storage folder. FIG. 16C illustrates an interface enabling the content requester to select a content distribution facilitation system folder for receiving and storing content. FIG. 16D illustrates a list of content received from content contributors. FIG. 16D further illustrates controls enabling the content requester to instruct the content distribution facilitation system to download content selected from the list of content contributor content or to upload the selected content to the designated cloud-based storage filter.

Figure 17A:
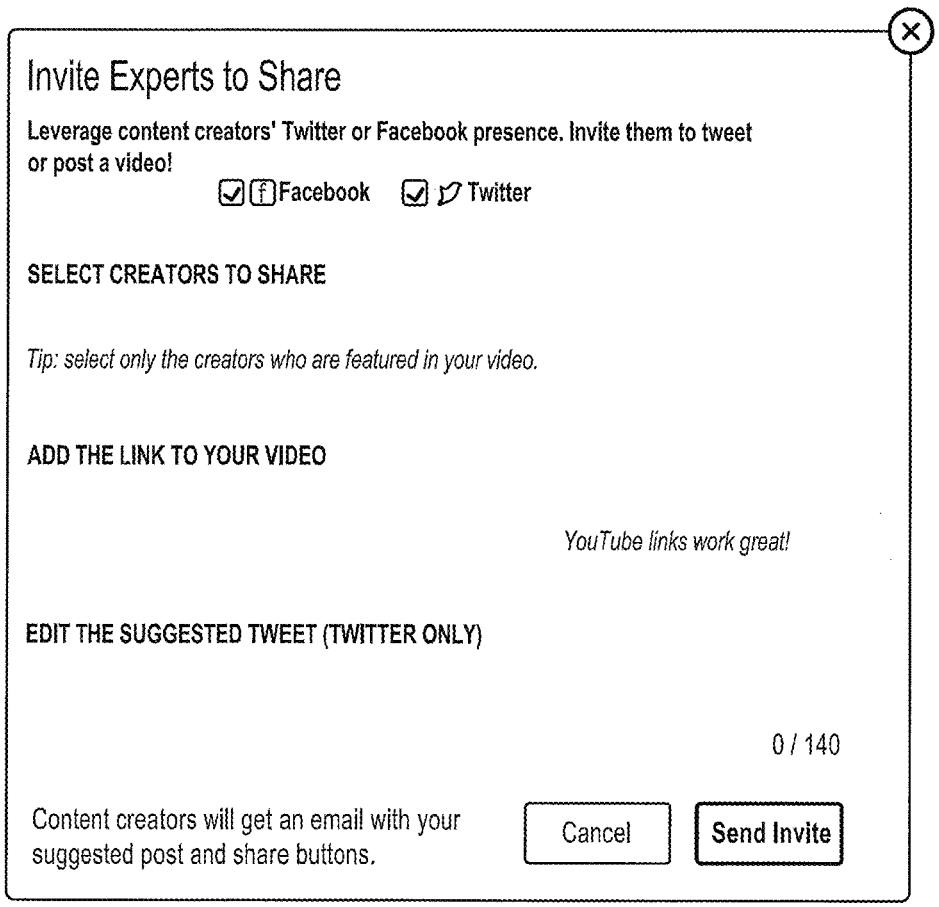
Figure 17B:

FIG. 17A illustrates an automatically generated user interface presented to the content requester in response to the content requester activating the download control or the cloud-based storage upload control, or in response to activation of social share control. The user interface is configured to enable the content requester to invite content contributors to share content via one or more social media platforms (e.g., microblogs or other social networking platforms). A first field is configured to receive a name of a content creator. A second field is configured to receive a link to the content contributor's content. A third field is configured to receive microblog edit suggestions (e.g., "what may video online at [URL]). A control is provided via which the content requester can issue the invitation to the designated content creator. FIG. 17B illustrates a user interface enabling the content requester to instruct the system to provide a preview of the request and to send the microblog communication.

Figure 17C:
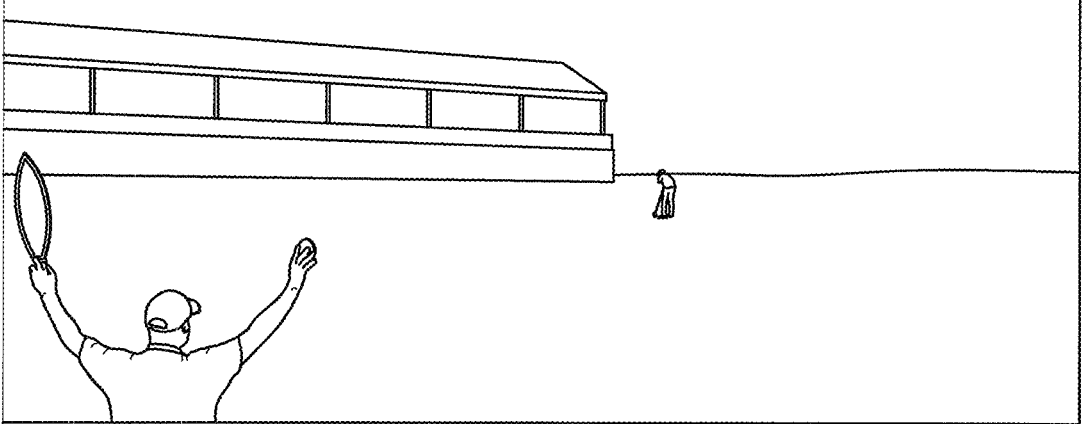

FIG. 17C illustrates an example user interface that enables a user (e.g., the content requester) to edit content. The example illustrated user interface enables the user to trim the duration of the video to a specified length by trimming the video on one or both ends, add pre-roll or post-roll bumpers, (where a bumper is a short video clip (e.g., 5-15 seconds in duration), select a branding package, and/or add watermarks overlaid onto an image or video included in the content. The example user interface includes a video player enabling the user to play the edited and/or unedited video content. The video player includes a play control and may include a scrubber bar that enables a user to view the relative position of the current frame being shown with respect to the complete video file. A content trim user interface may be provided over the scrubber bar (or elsewhere) that enables the user to click on a trim starting point and a trim ending point in the scrubber. The user interface (or underlying editing program) calculates the length of content being trimmed and the total length of the content after trimming. The user interface may also include the content request text (e.g., "Share some footage from the Acme sporting event at Beta Stadium"), the name of the content provider, when the content was received, etc. A save control may be provided enabling the user to save edits to the content.

Thus, certain embodiments enable requests for content to selectively be submitted to a specific target group of potential responders, such as athletes, actors, opinion leaders, industry experts, celebrities, a social or working group, or the like, and/or individually-selected or specified content contributors, and further enable information and content received from responders to be distributed over one or more distribution channels.

Certain embodiments may be implemented via hardware, software stored on media, or a combination of hardware and software. For example, certain embodiments may include software/program instructions/modules stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, Wi-Fi, Bluetooth, T1, DSL, cable, optical, or other interface(s) which may be coupled to the Internet), content databases, customer account databases, etc.). Data stores (e.g., comprising databases) may be used to store some or all of the information discussed herein in memory.

By way of example, a given computing device may optionally include user interface devices, such as some or all of the following: one or more displays, keyboards, touch screens, speakers, microphones, mice, track balls, touch pads, tilt sensors, accelerometers, biometric sensors (e.g., fingerprint or face recognition sensors for authenticating a user) printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box coupled to a display, etc. Certain embodiments may be able to conduct hundreds (or more) of transactions and processes described herein within a second.

While certain embodiments may be illustrated or discussed as having certain example components, additional, fewer, or different components may be used. Processes described as being performed by a given system may be performed by a user terminal or other system or systems. Processes described as being performed by a user terminal may be performed by another system. Data described as being accessed from a given source may be stored by and accessed from other sources. Transmissions described herein may be via a wired and/or wireless network or other communications link. Further, with respect to the processes discussed herein, various states may be performed in a different order, not all states are required to be reached, and fewer, additional, or different states may be utilized.

User interfaces described herein are optionally presented (and user instructions may be received) via a user computing device using a browser, other network resource viewer, or otherwise. For example, the user interfaces may be presented (and user optionally instructions received) via an application (sometimes referred to as an "app"), such as a dedicated app configured specifically for social networking and/or communications activities, installed on the user's mobile phone, laptop, pad, desktop, television, set top box, phone, or other terminal. For example, an app may be downloaded to a user mobile device, such as a smart phone. Various features described or illustrated as being present in different embodiments or user interfaces may be combined into the same embodiment or user interface.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A content management and distribution system, comprising:
    a computer system comprising one or more computing devices;
    a network interface; and
    a computer storage system comprising a non-transitory storage device, said computer storage system having stored thereon executable program instructions that direct the computer system to at least:
        provide for display on a user device of a first entity a user interface that enables the first entity to specify a content request;
        in response to a content request provided by the first entity via the user interface that enables the first entity to specify a content request, transmit a notification to one or more content providers regarding the content request;
        enable one or more content providers, who received the content request provided by the first entity, to wirelessly transmit images, captured by a device of a respective content provider, to a cloud-based storage system via a content sharing application hosted on respective camera-equipped devices of the one or more content providers, wherein the one or more images comprise video content;
        in response to one or more images being wirelessly transmitted to the cloud-based storage system via the content sharing application hosted on respective camera-equipped devices of the one or more content providers, provide a notification to the first entity that one or more images have been transmitted to the cloud-based storage system by a content provider user device;
        enable the first entity to edit at least one image transmitted to the cloud-based storage system by a corresponding content provider user device;
        provide for display on the user device of the first entity a user interface that enables the first entity to specify a request that one or more images be shared on one or more social media platforms;
        transmit to one or more recipients a request provided via the user interface that enables the first entity to specify a request that one or more images be shared on one or more social media platforms;
        enable a recipient of the request provided via the user interface that enables the first entity to specify a request that one or more images be shared on one or more social networking platforms to selectively publish, on one or more social media platforms, the one or more images; and
        provide content submission activity for at least a first content provider to at least one remote device configured to display the provide content submission activity; and
        overlay a mark on a first image transmitted by a content provider to whom the content request was transmitted to so that the mark is displayed as an overlay on the first image.

2. The content management and distribution system as defined in claim 1, wherein the program instructions further direct the computer system to:

use a voice biometrics analysis engine to determine if a voice associated with an item of transmitted media belongs to a content provider to whom the content request was transmitted to, wherein the voice biometrics analysis engine uses one or more of: a Hidden Markov model, a neural network, a Gaussian mixture model, or frequency estimation, and in response to a determination by the voice biometrics analysis engine that the voice does not belong to the content provider to whom the content request was transmitted to, perform a verification failure action.

3. The content management and distribution system as defined in claim 1, wherein the program instructions further direct the computer system to:
enable the first entity to conduct a chat interaction with one or more content providers via the content sharing applications hosted on respective camera-equipped user devices.

4. The content management and distribution system as defined in claim 1, wherein the program instructions further direct the computer system to:
use a face recognition system to compare facial features of a first face in a given transmitted image to reference facial features of a content provider to whom the content request was transmitted to, to determine if the first face belongs to the content provider to whom the content request was transmitted to whom the content request was transmitted to, wherein the face recognition system uses one or more of: PCA (Principal Component Analysis), Independent Component Analysis (ICA), EBGM (Elastic Bunch Graph Matching), LDA (Linear Discriminate Analysis), Trace transform, 3-D morphable face model, HMM (Hidden Markov model), or MSL (Multilinear Subspace Learning), and in response to a determination by the face recognition system that the first face does not belong to the content provider to whom the content request was transmitted to, perform a verification failure action.

5. The content management and distribution system as defined in claim 1, wherein the one or more social media platforms comprise a microblog platform and a social network platform.

6. The content management and distribution system as defined in claim 1, wherein the program instructions further direct the computer system to cause a preview of the content request to be displayed to the first entity.

7. The content management and distribution system as defined in claim 1, wherein a content request transmitted to a first content provider is accessible to the first content provider via an inbox provided via the content sharing application hosted on a device of the first content provider, the inbox configured to visually list content requests transmitted to the first content provider, including at least a portion of respective request text and an identifier associated with an entity that submitted the content request.

8. A computer-implemented method, the method comprising:
providing, via a computing device, for display on a user device of a first entity a user interface that enables the first entity to specify a content request;
in response to a content request provided by the first entity via the user interface that enables the first entity to specify a content request, transmitting a notification to one or more users regarding the content request;
enabling one or more users to wirelessly transmit images to a storage system via a content sharing application hosted on respective camera-equipped devices of the one or more users;
in response to one or more images, captured by a device of a respective user, being wirelessly transmitted to the storage system via the content sharing application hosted on respective camera-equipped devices of the one or more users, providing a notification to the first entity that one or more images have been transmitted to the storage system, wherein the one or more images comprise video content;
enabling the first entity to edit and/or download at least one image transmitted to the storage system;
enabling the first entity to specify, via an interface, a request that one or more images be shared on one or more social media platforms;
enabling a recipient of the request from the first entity that one or more images be shared on one or more social networking platforms to selectively publish, on one or more social media platforms, the one or more images;
providing content submission activity for at least a first content provider; and
overlaying a mark on a first image transmitted by a content provider to whom the content request was transmitted to so that the mark is displayed as an overlay on the first image.

9. The computer-implemented method as defined in claim 8, the method further comprising:
using a voice biometrics analysis engine to determine if a voice associated with an item of transmitted media belongs to a content provider to whom the content request was transmitted to, wherein the voice biometrics analysis engine uses one or more of: a Hidden Markov model, a neural network, a Gaussian mixture model, or frequency estimation, and in response to a determination by the voice biometrics analysis engine that the voice does not belong to the content provider to whom the content request was transmitted to, perform a verification failure action.

10. The computer-implemented method as defined in claim 8, the method further comprising:
using a face recognition system to compare facial features of a first face in a given transmitted image to reference facial features of a content provider to whom the content request was transmitted to, to determine if the first face belongs to the content provider to whom the content request was transmitted to whom the content request was transmitted to, wherein the face recognition system uses one or more of: PCA (Principal Component Analysis), Independent Component Analysis (ICA), EBGM (Elastic Bunch Graph Matching), LDA (Linear Discriminate Analysis), Trace transform, 3-D morphable face model, HMM (Hidden Markov model), or MSL (Multilinear Subspace Learning), and in response to a determination by the face recognition system that the first face does not belong to the content provider to whom the content request was transmitted to, perform a verification failure action.

11. The computer-implemented method as defined in claim 8, the method further comprising:
enabling the first entity to conduct a chat interaction with one or more users via the content sharing applications hosted on respective camera-equipped user devices.

12. The computer-implemented method as defined in claim 8, wherein the one or more social media platforms comprise a microblog platform and a social network platform.

13. The computer-implemented method as defined in claim 8, the method further comprising: causing a preview of the content request to be displayed to the first entity.

14. The computer-implemented method as defined in claim 8, the method further comprising:
  identifying content requests initiated by the first entity;
  generating a listing of content requests initiated by the first entity, the listing comprising an indication as to respective subject matters of the content requests, respective dates and times corresponding to when the respective requests were issued, and indications as to whether respective requests are open; and
  enabling the listing of content requests to be presented on a device of the first entity.

15. The computer-implemented method as defined in claim 8, wherein content requests transmitted to a first user is accessible to the first user via an inbox provided via the content sharing application hosted on a device of the first user, the inbox configured to visually list content requests transmitted to the first user, including at least a portion of respective request text and an identifier associated with an entity that submitted the content request.

16. A system, comprising:
  a computer system comprising one or more computing devices;
  a network interface; and
  a computer storage system comprising a non-transitory storage device, said computer storage system having stored thereon executable program instructions that direct the computer system to at least:
    provide for display on a user device of a first entity a user interface that enables the first entity to specify a content request;
    in response to a content request provided by the first entity via the user interface that enables the first entity to specify a content request, transmit a notification to one or more content providers regarding the content request;
    enable one or more content providers, who received the content request provided by the first entity, to wirelessly transmit images, captured by a device of a respective content provider, to a cloud-based storage system via a content sharing application hosted on respective camera-equipped devices of the one or more content providers, wherein the one or more images comprise video content;
    in response to one or more images being wirelessly transmitted to the cloud-based storage system via the content sharing application hosted on respective camera-equipped devices of the one or more content providers, provide a notification to the first entity that one or more images have been transmitted to the cloud-based storage system by a content provider user device;
    enable the first entity to edit at least one image transmitted to the cloud-based storage system by a corresponding content provider user device;
    provide for display on the user device of the first entity a user interface that enables the first entity to specify a request that one or more images be shared on one or more social media platforms;
    transmit to one or more recipients a request provided via the user interface that enables the first entity to specify a request that one or more images be shared on one or more social media platforms;
    enable a recipient of the request provided via the user interface that enables the first entity to specify a request that one or more images be shared on one or more social networking platforms to selectively publish, on one or more social media platforms, the one or more images;
    enable the first entity to conduct a chat interaction with one or more content providers via the content sharing applications hosted on respective camera-equipped user devices; and
    overlay a mark on a first image transmitted by a content provider to whom the content request was transmitted to so that the mark is displayed together with the first image.

17. The system as defined in claim 16, wherein the program instructions further direct the computer system to:
  use a face recognition system to compare facial features of a first face in a given transmitted image to reference facial features of a content provider to whom the content request was transmitted to, to determine if the first face belongs to the content provider to whom the content request was transmitted to whom the content request was transmitted to, wherein the face recognition system uses one or more of: PCA (Principal Component Analysis), Independent Component Analysis (ICA), EBGM (Elastic Bunch Graph Matching), LDA (Linear Discriminate Analysis), Trace transform, 3-D morphable face model, HMM (Hidden Markov model), or MSL (Multilinear Subspace Learning), and in response to a determination by the face recognition system that the first face does not belong to the content provider to whom the content request was transmitted to, perform a verification failure action.

* * * * *

UNITED STATES PATENT AND TRADEMARK OFFICE
CERTIFICATE OF CORRECTION

PATENT NO. : 11,870,749 B2
APPLICATION NO. : 17/818870
DATED : January 9, 2024
INVENTOR(S) : Shawn David Green It is certified that error appears in the above-identified patent and that said Letters Patent is hereby corrected as shown below:

In the Drawings

On Sheet 1 of 43, (Reference Numeral 114), (FIG. 1), Line 1: Delete "PUBLSIHER" and insert -- PUBLISHER --.

On Sheet 1 of 43, (Reference Numeral 122), (FIG. 1), Line 1: Delete "EXLUSIVITY" and insert -- EXCLUSIVITY --.

On Sheet 13 of 43, (Reference Numeral 1004A), (FIG. 10A), Line 2: Delete "RECIEPT" and insert -- RECEIPT --.

On Sheet 21 of 43, (FIG. 13E-2), Line 4 (Approx.): Delete "13E-2" and insert -- 13E2 --.

In the Specification

On Column 2, Line 24: Delete "etc.]" and insert -- etc. --.

On Column 9, Line 21: Delete "and or" and insert -- and/or --.

On Column 16, Lines 13-14: Delete "contributor" and insert -- contributor. --.

On Column 17, Line 44: Delete "the a" and insert -- the --.

On Column 20, Line 37: Delete "above" and insert -- above. --.

On Column 23, Line 65: Delete "contributor)." and insert -- contributor), --.

On Column 24, Line 1: Delete "requesters" and insert -- requesters. --.

On Column 43, Line 57: Delete "FIG." and insert -- FIGS. --.

Signed and Sealed this
Twelfth Day of March, 2024

*Katherine Kelly Vidal*
Katherine Kelly Vidal
*Director of the United States Patent and Trademark Office*

CERTIFICATE OF CORRECTION (continued)
U.S. Pat. No. 11,870,749 B2

On Column 44, Line 21: Delete ""what" and insert -- what --.

In the Claims

On Column 46, Line 56: In Claim 1, after "images;" delete "and".